(12) United States Patent
Newell et al.

(10) Patent No.: US 9,712,862 B2
(45) Date of Patent: Jul. 18, 2017

(54) APPARATUS, SYSTEMS AND METHODS FOR A CONTENT COMMENTARY COMMUNITY

(71) Applicant: EchoStar Technologies L.L.C., Englewood, CO (US)

(72) Inventors: Nicholas Newell, Centennial, CO (US); Adam Lawson, Rapid City, SD (US); Prakash Subramanian, Littleton, CO (US); Kayhan Karatekeli, Rapid City, SD (US); Omar Khan, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 76 days.

(21) Appl. No.: 15/070,918

(22) Filed: Mar. 15, 2016

(65) Prior Publication Data

US 2016/0330508 A1 Nov. 10, 2016

Related U.S. Application Data

(60) Provisional application No. 62/157,575, filed on May 6, 2015.

(51) Int. Cl.
*H04N 21/43* (2011.01)
*H04N 21/431* (2011.01)
*H04N 21/84* (2011.01)
*H04N 21/482* (2011.01)
*G06T 19/00* (2011.01)
*H04N 21/434* (2011.01)
*H04N 21/4788* (2011.01)
*H04N 21/254* (2011.01)
*H04N 21/4627* (2011.01)
*G02B 27/01* (2006.01)

(52) U.S. Cl.
CPC ..... *H04N 21/4312* (2013.01); *G02B 27/0172* (2013.01); *G06T 19/006* (2013.01); *H04N 21/2541* (2013.01); *H04N 21/4345* (2013.01); *H04N 21/4627* (2013.01); *H04N 21/4788* (2013.01); *H04N 21/482* (2013.01); *H04N 21/84* (2013.01); *G02B 2027/014* (2013.01); *G02B 2027/0134* (2013.01); *G06T 2200/04* (2013.01)

(58) Field of Classification Search
None
See application file for complete search history.

(56) References Cited

U.S. PATENT DOCUMENTS 6,774,926 B1* 8/2004 Ellis ............... H04N 5/44543
348/14.01
2007/0288987 A1* 12/2007 Kim ............... H04N 5/4401
725/136

* cited by examiner

*Primary Examiner* — Cai Chen
(74) *Attorney, Agent, or Firm* — Lowe Graham Jones PLLC

(57) ABSTRACT

Systems and methods of graphically presented virtual DVDs are disclosed. An exemplary embodiment receives a request from an electronic device of one of an owner or a guest. In response, data corresponding to the owner's personal virtual DVD collection is communicated to the electronic device, wherein the communicated data is used to present a first image corresponding to a graphical representation of a virtual bookshelf case to the owner and to present a plurality of second images each corresponding to a graphical representation of one of a plurality of virtual DVDs in the owner's personal virtual DVD collection.

21 Claims, 14 Drawing Sheets

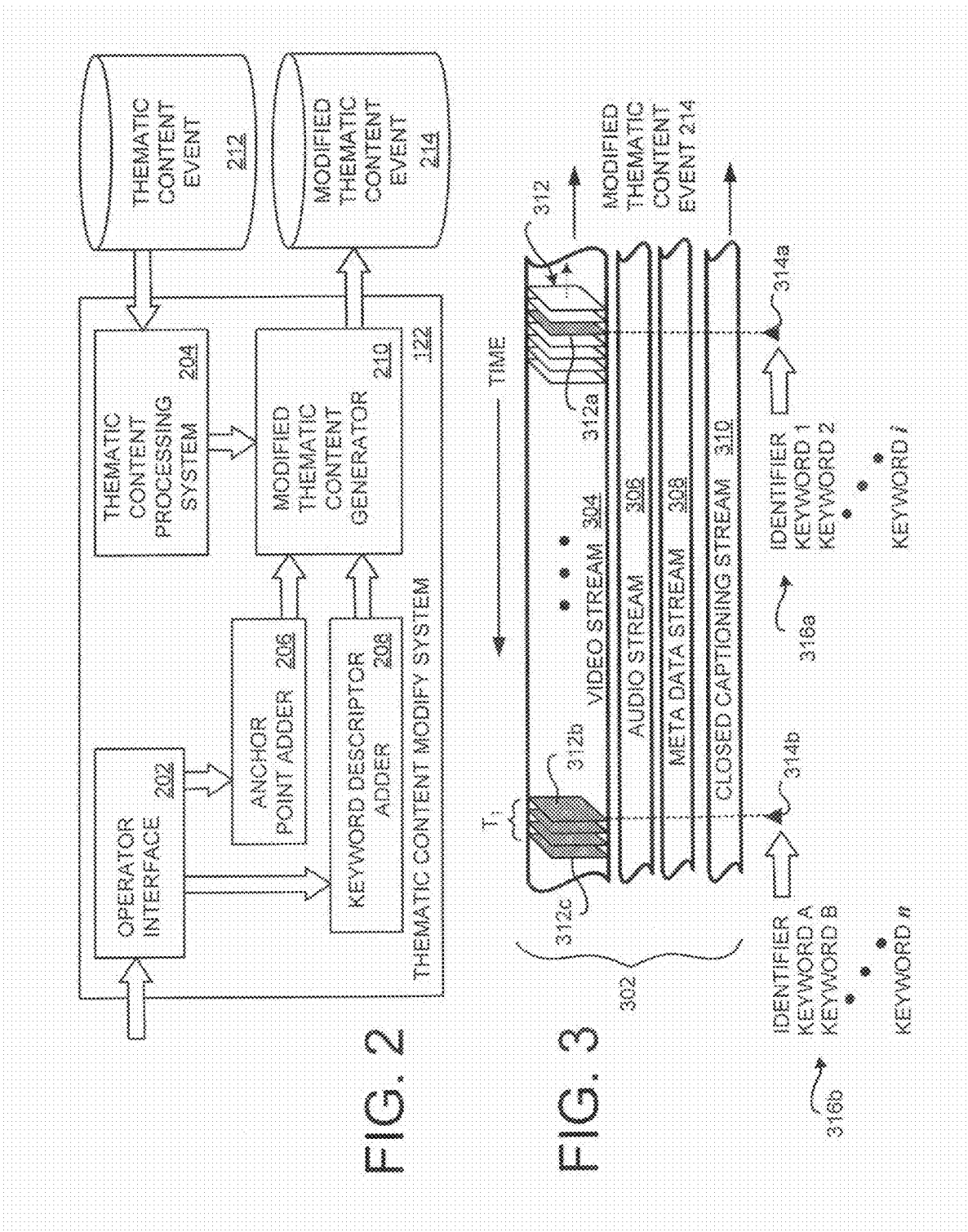

APPARATUS, SYSTEMS AND METHODS FOR A CONTENT COMMENTARY COMMUNITY

APPLICATION PRIORITY

This application claims the benefit of and priority to co-pending U.S. utility application entitled, "APPARATUS, SYSTEMS AND METHODS FOR A CONTENT COMMENTARY COMMUNITY," having application Ser. No. 62/157,575, filed May 6, 2015, and which is entirely incorporated herein by reference.

BACKGROUND

Thematic content presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically.

Thematic content is readily available for presentation to the user (i.e., viewing and listening to by the user) at a user's home. Thematic content may even be presentable to a user on their mobile devices. Such thematic content, if in the form of a feature movie or film, may also be available at a public location, such as a movie theatre or the like. Other public places, such as bars, restaurants, office lobbies, libraries, or the like, may include televisions or other presentation devices for viewing thematic content by their patrons.

Thematic content may be provided for user presentation using a variety of content delivery methods. For example, the thematic content may be provided to a user's home entertainment system (e.g., their television or the like) via a broadcast system or by an on-demand system. Other devices, such as the user's portable smart phone, tablet, notebook computer, or the like may be used to access thematic content from a remote website or the like via the Internet or other suitable communication system. Alternatively, thematic content may be provided to the user on a portable memory medium, such as a digital video disk (DVD), flash memory device, or the like.

In some situations, a group of friends may go to a public theatre or the like to view a feature film or other thematic content. Afterwards, the group may go to a coffee shop or other location wherein a lively and interesting conversation about the recently viewed thematic content ensues. Many individuals find such group conversations about the thematic content enjoyable and highly desirable.

In other situations, thematic content may be presented to the user when the user is alone or with a limited number of other individuals. In such situations, it may be difficult for the user to have a lively and interesting conversation about the presented thematic content with a group of other individuals because the other individuals may have not yet seen the thematic content, the other users may have previously seen the thematic content a relatively long time ago (and have therefore forgotten the thematic content at least to some extent), or the other users may simply not be available to carry on a conversation about the thematic content.

With the advent of the Internet and other communication media, a variety of social networking systems have been devised wherein individuals may input their commentary about a particular thematic content event that they have seen. Other users may access such social media facilitated commentary. Accordingly, the user may read and/or listen to the one-sided commentary provided by other individuals. However, the user viewing such commentary is not going to have an experience that is comparable to the above-described group of friends who are together to discuss a particular thematic content event.

Accordingly, there is a need in the arts to provide a user experience that is comparable to, emulates, or at least approximates, the above-described group of friends who are together to discuss a particular thematic content event.

SUMMARY

Systems and methods of graphically presented virtual DVDs are disclosed. An exemplary embodiment receives a request from an electronic device of one of an owner or a guest. In response, data corresponding to the owner's personal virtual DVD collection is communicated the electronic device, wherein the communicated data is used to present a first image corresponding to a graphical representation of a virtual bookshelf case to the owner and to present a plurality of second images each corresponding to a graphical representation of one of a plurality of virtual DVDs in the owner's personal virtual DVD collection.

BRIEF DESCRIPTION OF THE DRAWINGS

Preferred and alternative embodiments are described in detail below with reference to the following drawings:

FIG. 2 is a block diagram of an example thematic content modify system that is configured to generate a modified thematic content event;

FIG. 3 conceptually illustrates a portion of the modified thematic content event that has been generated by the modified thematic content generator;

DETAILED DESCRIPTION

A. Topology Overview

Figure 1:
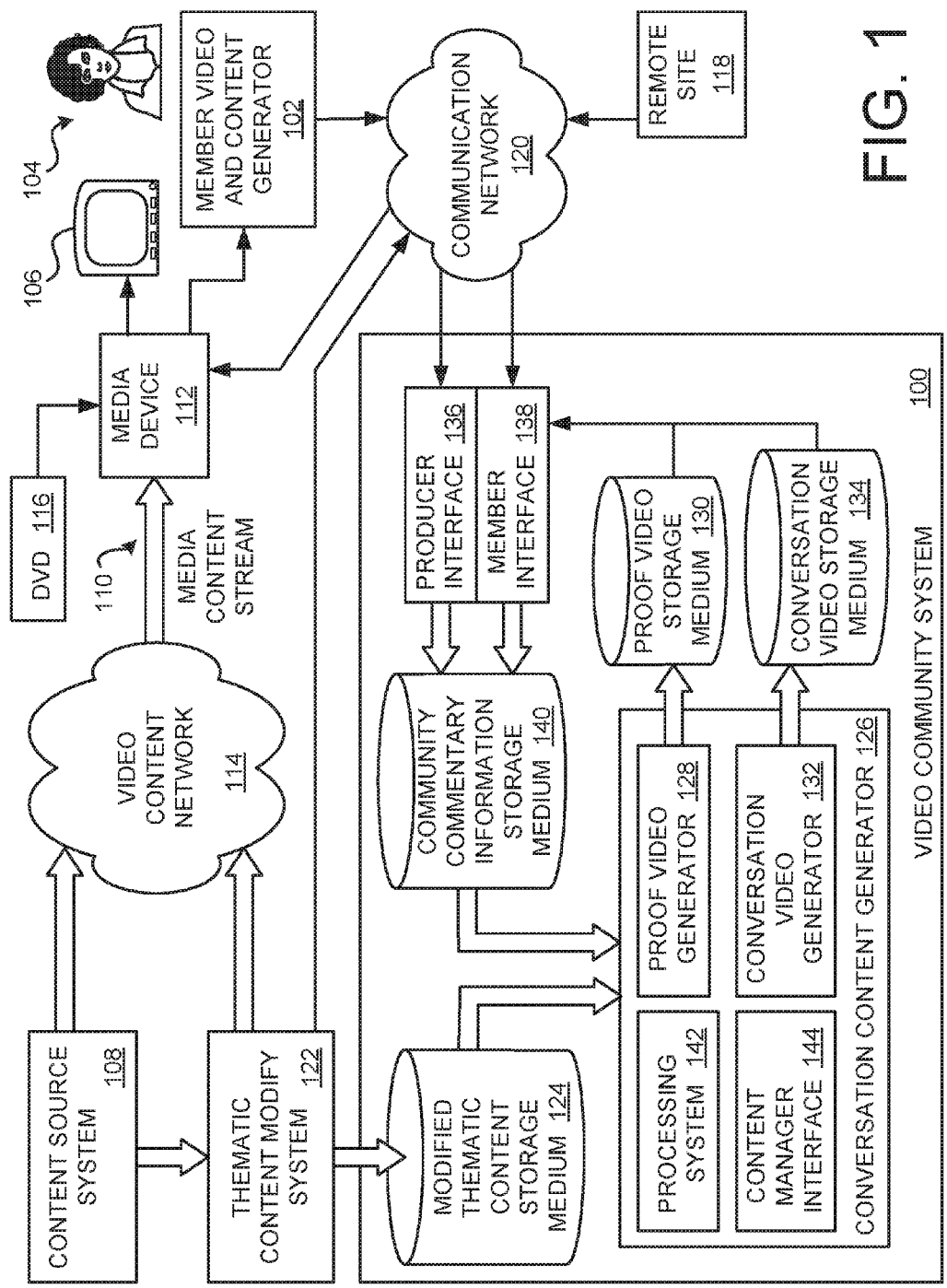
FIG. 1 is a block diagram of an embodiment of a video community system operating in a content presentation and communication environment.

FIG. 1 is a block diagram of an embodiment of a video community system 100 operating in a media content presentation and communication environment. Conceptually illustrated is a user 104 who is viewing a thematic content event (interchangeably referred to herein as a video) that is being presented on a media presentation system 106, conceptually illustrated as a television (TV).

Embodiments of the video community system 100 are configured to receive video and/or audio commentary from community members from a member video and content generator 102, such as the user 104 or a plurality of other users (not shown), who have viewed the thematic content event. The received video and/or audio commentary is preferably self-recorded by the community member and is referred to herein as a member dialogue video. The member dialogue video includes video and audio information that expresses the personal opinions and/or personal viewpoint of the community member about a particular thematic content event. Additionally, other individuals (not shown) that are knowledgeable about the thematic content event may provide video and/or audio commentary, referred to herein as producer dialogue videos.

Based on the received member dialogue videos and/or producer dialogue videos about a particular thematic content event, embodiments of the video community system 100 then generate a conversation video that incorporates selected ones of the received member dialogue videos and/or producer dialogue videos (or portions thereof). The conversation video may optionally include selected portions of that particular thematic content event.

The generated conversation video emulates a conversation about the thematic content event between the user 104 and other community members and/or knowledgeable individuals. The conversation video is a presentation of selected member dialogue videos (or portions thereof), thereby presenting the personal opinions and/or personal viewpoints of the community members about a particular thematic content event. Optionally, the conversation video may include one or more producer dialogue videos (or portions thereof) that have been generated by another person who is knowledgeable about the thematic content event. Thus, upon viewing the conversation video, the user 104 has an experience that is comparable to the above-described group of friends who are together to discuss the thematic content event.

The thematic content event may be provided to the user 104 in a variety of manners. For example, a content source system 108 may provide a media content stream 110 that is received by a media device 112, such as a set top box (STB) or the like. The thematic content event may be concurrently broadcast from the content source system 108 to the media device 112 over a suitable video content network 114 along with a plurality of other thematic content events. Alternatively, or additionally, the thematic content event may be directly accessed via an on-demand system operated by the content source system 108.

In a broadcast environment, one or more media content streams 110 are communicated to the media device 112 from the content source system 108, which may include a remote head end facility (not shown), operated by a content service provider. Non-limiting examples of such video content networks 114 include satellite systems, cable systems, over-the air broadcast systems, and the Internet. For example, if the content service provider provides a thematic content event via a satellite-based communication system, the media device 112 is configured to receive one or more broadcasted satellite signals detected by an antenna (not shown). Alternatively, or additionally, the media content stream 110 can be received from one or more different types of video content networks 114, such as, but not limited to, a cable system, an over-the air radio frequency (RF) communication system, or the Internet.

A particular thematic content event may be obtained from other sources. For example, but not limited to, a thematic content event may be stored in a suitable memory medium, such as a digital video disk (DVD) 116. A DVD player (not shown) may access the thematic content event stored on the DVD 116, and then communicate the accessed thematic content event to the media device 112 or to the media presentation system 106. Other non-limiting examples that may access a stored thematic content event include electronic devices, such as a personal computer, a smart phone, a tablet or the like may have a memory medium that has stored the thematic content event. Such electronic devices, when communicatively coupled to a display (or that include a display), may present the accessed thematic content event to the user 104. (It is also understood that such devices have audio presentation systems which present the audio portion of the thematic content event for listening by the user 104).

As another non-limiting example, the thematic content event may be accessed from a remote site 118, such as from an Internet site or the like, that provides thematic content to a plurality of users via the communication network 120. The communication network 120 is illustrated as a generic communication system. In one embodiment, the communication network 120 may be the Internet, a telephony system, a public or private Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the communication network 120 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the communication network 120 may be configured to communicate over combination systems having a plurality of segments which employ different formats for each segment that employ different technologies on each segment.

B. Conversation Video and Proof Video

Embodiments of the video community system 100 employ a plurality of novel techniques to create thematic content event-based conversations that emulate an experience that is comparable to the above-described group of friends who are together to discuss a particular thematic content event, defined herein as emulated conversation content. The emulated conversation content exists in two forms: the conversation video and a proof video.

Each conversation video is associated with a particular thematic content event of interest. For example, the thematic content event of interest and the conversation video may have the same or similar titles. Or, part of the conversation video data includes the title of the thematic content event of interest so that when a request for a particular thematic content event is received from the user 104, the title included in the conversation video data can be used to identify and provide the associated conversation video since the title matches the title of the thematic content event. If needed, other portions of the conversation video data can have clues or the like that can be used to identify and provide the associated conversation video since the speaker is likely talking about a particular thematic content event.

The conversation video emulates a conversation about a particular thematic content event between the user 104 and other community members (users) and/or knowledgeable individuals. The presented conversation video may include conversations on a plurality of the scenes in the thematic content event. The order of conversation about the scenes may be presented in an order that corresponds to the presentation of scenes in the thematic content event. Alternatively, or additionally, groups of related topic scenes may be discussed together. Any suitable presentation order of scene discussion may be used by the various embodiments.

Alternatively, or additionally, the presented conversation video may include conversations on one or more topics pertaining to the thematic content event. An example conversation video may include a conversation (video and/or audio commentary) provided by a plurality of community members and/or another knowledgeable individuals that are particularly knowledgeable about the topic of interest. For any given topic, one or more conversations (or portions thereof) are sequentially assembled together to emulate a conversation about that topic. A conversation video may address only a single topic, or may present a plurality of different topics. For example, but not limited to, a conversation video may present a series of different topics, wherein each topic corresponds to a particular scene of the thematic content event, and the order of the presented conversation video topics correspond to the order of the associated scenes in the thematic content event.

As another example, the conversation video topics may include commentary pertaining to one or more particular themes. The conversation video topics may include a discussion about one or more particularly interesting scenes (such as a discussion about the subject matter of the scene, a discussion about aspects pertaining to the scene setting, and/or a discussion about special effects) that were presented in the thematic content event. Another example conversation video topic may include commentary on the performance of the actors, such as overall performance throughout the thematic content event and/or a particular actor's performance in a particular scene.

The conversation video may optionally include one or more selected portions of the thematic content event (video portions and/or audio portions) itself to facilitate the emulated conversation about a particular topic of the thematic content event. For example, during a conversation about a particular scene, the scene or a portion thereof may be presented as part of the conversation video to remind the user 104 of the scene.

Such scenes or portions thereof may be presented using any suitable format, such as a picture over picture format, a picture in picture format, a split screen format, a full screen format, or the like, wherein the presented scene is relatively smaller than the view field of the display presenting images of the speaker. Alternatively, images of the current speaker may be relatively smaller than the view field of the display that is presenting the scene.

In some instances, all of or selected portions of the audio portion of the scene may be omitted to permit continued presentation of community member audio commentary. In other situations, the volume of the audio portion of the scene may be reduced to a relatively lower level so that continued presentation of community member commentary may be presented at a higher volume level.

Additionally, or alternatively, selected portions of other thematic content events may be added into the conversation video to further facilitate conversation about the thematic content event. For example, the current thematic content event being discussed may be a sequel in a series of related movies. At times, portions of one or more of the prequels may be added into the conversation video to facilitate a current discussion that is being presented in the conversation video. In some instances, the conversation video may at times discuss or provide commentary to such other thematic content events.

Textual information may also be presented to the user 104 as part of the conversation video. A pop-up window, a banner, or the like may present any suitable textual information of interest. The textual information may be presented as a stream of textual information scrolling across the banner. The textual information may describe some aspect of the currently discussed topic of the conversation video. Alternatively, or additionally, the textual information may identify actors, provide scene setting or location information, and/or describe other characteristics of the thematic content event. Alternatively, or additionally, the textual information may identify the particular community member(s) or other individual(s) providing commentary during the conversation video.

The proof video presents video and audio commentary from one or more community members wishing to become a recognized expert. The proof video commentary presents personal opinions and views of a particular community member about a particular thematic content event and/or a particular genre and/or topic pertaining to the thematic content event. Proof videos provide an opportunity for the particular community member to establish (prove) to the "community" that they are very knowledgeable about some aspect of a particular thematic content event and/or a particular genre and/or topic pertaining to the thematic content event. Embodiments of the video community system 100 generate the proof video using rant videos from the community member and endorsement videos from other knowledgeable individuals.

Based on the viewing of the proof video by other community members, optionally including the user 104, community members may "vote" for that particular member as an affirmation, or as a denial of affirmation, of that particular member's assertion that they are knowledgeable in a particular thematic content event and/or a particular genre and/or topic pertaining to the thematic content event. For example, the user 104, upon viewing a particular proof video of a particular member, may provide a "thumbs up" vote as an affirmation (an affirmation vote) if the user likes the proof video. On the other hand, the user 104 may provide a "thumbs down" vote (a denial of affirmation vote) if the user 104 dislikes the proof video.

Based on votes from community members, that particular community member may eventually be affirmed within the community as a recognized expert. That is, that community member may become recognized within the community as being particularly knowledgeable about a particular thematic content event and/or a particular genre and/or topic pertaining to the thematic content event.

Affirmation may be achieved by a community member, in an example embodiment, after a predefined number of other community members provide affirmation votes greater than or at least equal to a threshold number of affirmation votes after viewing the proof video of that particular community member. Alternatively, or additionally, affirmation may be achieved if the community member has a voting ratio of affirmation votes to denial of affirmation votes that is greater than or at least equal to a predefined ratio.

Further, affirmation status may be maintained so long as the community member maintains a predefined maintenance threshold ratio (which may be different than the predefined threshold ratio for achieving affirmation), and/or maintains the number of affirmation votes above some predefined maintenance threshold number (which may be different than the predefined threshold number of affirmation votes for achieving affirmation). In some embodiments, community members may later change their proof video voting from an affirmation vote to a denial of affirmation vote, or vice versa.

Once a community member has been recognized as being an expert in the community, that particular community member's commentary about a particular thematic content event may be given a preference and/or a higher priority for becoming selected for inclusion into a generated conversation video. That is, because it is more desirable to include commentary from a notoriously well known and recognized community member than from a non-recognized or relatively unknown community member, their commentary is more likely to be included in a conversation video.

Further, denial or loss of an affirmation a community member may provide a basis to exclude that particular member's commentary from future generated conversation videos. A community member may be denied affirmation if they receive a threshold number of denial of affirmation votes and/or if the ratio of affirmation to denial of affirmation votes falls below some predefined threshold. Further, a previously recognized expert community member may lose their expert status if they receive a threshold number of denial of affirmation votes (which may be different than the predefined threshold number of affirmation votes for achieving affirmation) and/or if the ratio of affirmation to denial of affirmation votes falls below some predefined threshold (which may be different than the predefined threshold ratio for achieving affirmation).

C. The Video Community System

The first novel technique used in the generation of emulated conversation content (the "conversation video") is the generation of a modified thematic content event. A modified thematic content event is generated from a thematic content event by addition of anchor points and associated keywords to the thematic content event.

Generation of the modified thematic content event is preferably performed at the thematic content modify system 122 by the producer of the thematic content event. The generated modified thematic content event is then provided to the video community system 100, and is stored in the modified thematic content storage medium 124 for later processing.

Alternatively, or additionally, the modified thematic content event may be generated by another knowledgeable party or entity having access to, and the ability to modify, the thematic content event. For example, but not limited to, a content service provider operating the content source system 108 is a knowledgeable entity that may generate, and/or further modify, the thematic content event to generate the modified thematic content event. Another example of a knowledgeable party may be a film critic person. An agent of the producer may be another example of a knowledgeable party.

Once generated, the modified thematic content event may be communicated or provided to the video community system 100 using any suitable means via any suitable communication system. As a non-limiting example, the modified thematic content event may be in an electronic format, which may then be communicated in the electronic format to the video community system 100 from an Internet website or the like, via the example communication network 120 or other suitable communication system. Alternatively, or additionally, the modified thematic content event may be stored on a physical memory medium, which may then be physically transferred to the video community system 100.

Embodiments of the video community system 100 comprise a conversation content generator 126 that generates proof videos and conversation videos. The proof video generator 128 generates proof videos which are stored in the proof video storage medium 130. The proof videos are generated based on video and audio commentary, referred to herein as a rant video, provided by a particular community member seeking affirmation as a recognized expert about one or more particular thematic content events and/or a particular genre and/or topic pertaining to the thematic content event. Proof videos are available for presentation to the user 104 who wishes to view proof videos of that particular community member.

The conversation content generator 126 further includes a conversation video generator 132 that generates the conversation videos. Conversation videos are generated based on conversations (video and/or audio commentary) on one or more topics pertaining to the thematic content event that have been received from a community member or other knowledgeable party. The conversation videos are stored in the conversation video storage medium 134, and are available for presentation to the user 104 who wishes to view the commentary video that is associated with a particular thematic content event of interest.

Embodiments of the video community system 100 further comprise a producer interface 136 that receives producer dialogue videos (video and/or audio commentary) from producers of the thematic content event or other knowledgeable parties. The video community system 100 also comprises a member interface 138 that receives member dialogue videos (video and/or audio commentary) from community members (i.e., the users who view the thematic content event and provide their commentary). The received producer dialogue videos and member dialogue videos are stored in the community commentary information storage medium 140.

The video community system 100 optionally includes a processing system 142 configured to manage the proof video generator 128 and the conversation video generator 132. In some embodiments, the processing system 142 includes a plurality of distributed processing devices that reside in the proof video generator 128 and the conversation video generator 132, and/or in other components of the video community system 100. Any suitable processing device may be used in the processing system 142.

A content manager interface 144 is included for inputting instructions, as needed, for operation of the processing system 142. Thus, the operator of the video community system 100 may provide via the content manager interface 144 specific inputs, update programming, mange storage, and perform other tasks as necessary to manage operation of the video community system 100. The content manager interface 144 may include a keyboard and/or other suitable input devices, a display screen, and optionally its own processor system (not shown) to facilitate input from the operator. In some embodiments, the content manager interface 144 may be a personal computer, a dedicated computing system, or the like that interfaces with the processing system 142 of the video community system 100.

In other embodiments, one or more of the elements of the video community system 100 may be combined with each other and/or may be integrated with other elements not specifically described or illustrated herein. Further, elements illustrated separately from the video community system 100, such as the thematic content modify system 122 or other elements, may be included in the video community system 100 and/or may be integrated with other elements of the video community system 100.

D. The Modified Thematic Content Event

FIG. 2 is a block diagram of an example thematic content modify system 122 that is configured to generate a modified thematic content event. The example thematic content modify system 122 comprises an operator interface 202, a thematic content processing system 204 that receives and processes a thematic content event, an anchor point adder 206 that adds anchor points into a processed thematic content event, a keyword descriptor adder 208 that adds keyword descriptors into a processed thematic content event and that associates added keyword descriptors with particular anchor points, and a modified thematic content generator 210 that generates the modified thematic content event (which includes the added anchor points and the associated keyword descriptors). The elements of the thematic content modify system 122 are illustrated and described separately for clarity. In other embodiments, one or more of the elements of the thematic content modify system 122 may be combined with each other and/or may be integrated with other elements not specifically described or illustrated herein.

In the example embodiment, a single thematic content modify system 122 is illustrated in FIG. 2. However, a plurality of thematic content modify systems 122 may be used to generate different modified thematic content events. For example, a plurality of different media content producers and/or content providers may have their own thematic content modify systems 122. Additionally, or alternatively, another party or entity having access to, and the ability to modify, the thematic content event may have a thematic content modify system 122 to generate a modified thematic content event.

Further, a thematic content modify system 122 may be used to further modify a previously generated modified thematic content event. For example, additional key words and/or anchor points may be added. Alternatively, or additionally, selected key words and/or anchor points may be modified and/or deleted.

In practice the thematic content processing system 204 receives a particular thematic content event 212. The thematic content event 212 may be received in a streaming fashion in a received media content stream 110, or may be accessed from a memory medium upon which the thematic content event 212 has been previously stored on.

In the various embodiments, a received thematic content event 212 is processed to generate the modified thematic content event 214 by defining a plurality of anchor points for the thematic content event 212. An anchor point is a type of identifier that is used to identify a particular point in the thematic content event 212, that is used to identify a location in the thematic content event 212, and/or that is used to identify a portion of the thematic content event 212. Each anchor point comprises an anchor point identifier and an anchor point locator.

The anchor point identifier is a unique identifier that uniquely identifies a particular anchor point. Thus, each defined anchor point of the thematic content event 212 may be uniquely identified from the other anchor points based on its unique anchor point identifier. The anchor point identifier may be any suitable unique identifier, such as a numeric identifier, an alphabetic identifier, and/or an alpha numeric identifier.

The anchor point locator identifies the particular location and/or portion of interest in the thematic content event 212. An example anchor point locator may be associated with a particular video frame of the thematic content event 212 to locate a particular point in the thematic content event. As another example, a frame identifier (ID) or the like may be used to define an anchor point locator.

Alternatively, or additionally, the anchor point locator may be associated with a particular scene of the thematic content event 212. For example, a scene ID in the meta data may be used to define an anchor point locator that is associated with a particular scene of interest.

A scene may have multiple anchor points. For example, the anchor point may be added to identify different subject matter or topics that may occur at different points, or even at the same point, in the same scene or in a plurality of scenes. Alternatively, or additionally, multiple anchor points may be associated with different points or events in a scene.

Alternatively, or additionally, a particular time in the thematic content event 212 may be used to define an anchor point locator. For example, a time from the starting time of the thematic content event 212 may be specified as the anchor point locator. Or a presentation time associated with a particular video frame of interest may be specified as an anchor point locator.

Alternatively, or additionally, a portion of the thematic content event 212 may be used to define a duration type anchor point locator that defines a particular portion of the modified thematic content event. For example, a duration type anchor point locator may be associated with a particular scene of interest, or even a smaller portion of a scene of interest. Alternatively, or additionally, a duration type anchor point locator may be associated with a larger portion that spans a plurality of scenes that are presenting a related portion of the thematic content event. For example, the plurality of scenes may have a related particular subject matter, and/or may have a related particular topic, of the thematic content event 212. An anchor point locator associated with a duration of the thematic content event 212 may be defined by a starting time or a particular identified video frame, plus a specified duration. Alternatively, or additionally, the duration of a duration type anchor point locator may be a specified using start time or video frame, and a specified end time or video frame. A plurality of duration type anchor points may even overlap the same portions of the thematic content event 212.

A keyword descriptor is associated with at least one particular anchor point. Each keyword descriptor comprises a unique keyword identifier and at least one keyword.

The keyword identifier is a unique identifier of the keyword descriptor. Thus, each defined keyword descriptor may be uniquely identified from the other keyword descriptors based on their unique keyword identifier. The keyword identifier may be any suitable unique identifier, such as a numeric identifier, an alphabetic identifier, and/or an alpha numeric identifier. Thus, a single keyword descriptor may be uniquely associated with a single anchor point. In an example embodiment, the keyword identifier may be the same as the anchor point identifier.

Alternatively, the keyword identifier and the anchor point identifier may be different from each other. When the keyword identifier and the anchor point identifier are different, they are associated with each other. Thus, a unique keyword descriptor may be uniquely associated with a identifier of a designated anchor point. Further, a selected unique keyword descriptor may be uniquely associated with a plurality of designated anchor point identifiers. Accordingly, keywords of a particular keyword descriptor may be associated with multiple anchor points, and therefore be associated with multiple portions of the thematic content event 212.

Keywords are words or phrases that are descriptive of an attribute of the portion of the thematic content event 212 that has been associated with that particular anchor point. A keyword descriptor may have as few as one keyword, or may have many different keywords.

Any suitable keyword may be used in a keyword descriptor. An example keyword may be related to the subject matter theme of the associated portion of the thematic content event 212. Another example keyword may pertain to some aspect or characteristic of the scene set and/or location where that associated portion of the thematic content event 212 was filmed. Another example keyword may describe some aspect or characteristic of the dialogue, or may be the actual dialogue, of that associated portion of the thematic content event 212. Another example keyword may pertain to some aspect or characteristic of the sound track, such as particular sounds or music, of that associated portion of the thematic content event 212. Another example keyword may be descriptive of an event that was portrayed in the associated portion of the thematic content event 212. Keywords may identify particular actors performing in the associated portion of the thematic content event 212. Keywords may also include interesting trivia pertaining to any of the above-described aspect or characteristic of the portion of the thematic content event 212 that has been associated with the associated anchor point.

In practice, a received thematic content event 212 is processed by defining anchor points for portions or locations of interest in the thematic content event 212, and by defining associated keyword descriptors for the portions or locations of the thematic content event 212 identified by the particular associated anchor point. The modified thematic content generator 210 generates a modified thematic content event 214 that includes the original thematic content event 212, the defined anchor points, and the associated keyword descriptors. The modified thematic content event 214 may then be stored into a suitable memory medium, such as the example modified thematic content storage medium 124 (FIG. 1). In some embodiments, the generated modified thematic content event 214 may be communicated, such as in a media content stream or the like, to another device for storage.

In practice, an operator of the thematic content modify system 122 specifies locations or portions in the thematic content event 212 that are to have an anchor point defined for. Additionally, the operator specify at least one keyword that is to be added to the keyword descriptor for that associated anchor point.

Alternatively, or additionally, a first operator may define anchor points and at a later time a second operator (or even the first operator) may specify the associated keywords separately. Further, the second operator (or even the first operator) may later add new anchor points (and associated keywords), later modify the location information for anchor points, and/or later delete anchor points, to further modify a previously generated modified thematic content event 214.

FIG. 3 conceptually illustrates a portion of the modified thematic content event 214 that has been generated by the modified thematic content generator 210 (FIG. 2). The portion of the modified thematic content event 214 is conceptually illustrated as a media content stream 302 that communicates, transports, or otherwise carries, the modified thematic content event 214. The media content stream 302 portion of the modified thematic content event 214 comprises a video stream 304, a corresponding audio stream 306, and a corresponding metadata stream 308, and optionally, a closed captioning stream 310.

The video stream 304 is comprised of a plurality of serially sequenced video frames 312. Each video frame 312 has data or information used to render and present a particular image of the thematic content event 212. The video frames 312 are serially presented so as to create a moving picture.

The audio stream 306 may include spoken words, music, and background sounds. The audio stream 306 is sequenced with the video frames 312 such that spoken words, music, and background sounds of the audio stream 306 correspond in time with the moving picture. In an example embodiment, a speech synthesis generator may be used to generate a textual version of the audio stream dialogue (where the generated textual dialogue may be used to compare with keywords).

Some media content streams 302 may include a metadata stream 308 which contains other information of interest pertaining to an associated point in the thematic content event 212. For example, scene identifiers, scene transition identifiers, or the like may be included in the metadata stream 308 for scene identification. Descriptive material describing some aspect or characteristic of an associated point in the thematic content event 212 may be included in the metadata stream 308. For example, but not limited to, actors may be identified, scene themes may be described, and/or subject matter may be described. The metadata may describe artifacts such as a building or an object shown in the scene. The metadata may describe a location of the scene or some aspect or characteristic of the scene set. Any suitable alphanumeric textual information may be used for such descriptive information that is included in the metadata (where the textual metadata may be used to compare with keywords).

An optional closed captioning stream 310 is also conceptually illustrated as part of the media content stream 302. The closed captioning stream 310 is typically a textual presentation of the words of the audio stream 306 for hearing impaired viewers or for viewers in an area with relatively loud ambient noise levels, such as a bar or the like. The text of the closed captioning stream 310 may be in a different language that the language used for the spoken dialogue of the thematic content event 212. The words of the closed captioning stream 310 are sequenced so as to generally correspond to the spoken words of the audio stream 306.

In the various embodiments, the plurality of anchor points are added into the media content stream 302 at a suitable location that corresponds to a particular location in the thematic content event 212. In an example embodiment, anchor points may be added into the frame data. Alternatively, the anchor points may be embedded in or otherwise incorporated into the audio stream 306, the metadata stream 308, and/or the closed captioning stream 310 of the media content stream 302.

FIG. 3 conceptually illustrates a first anchor point 314a that has been associated with a first video frame 312a. Thus, the anchor point location of the anchor point 314a corresponds to the location of the video frame 312a. In the example embodiment, the anchor point locator may be an identifier of the video frame 312a. Alternatively, the anchor point identifier may be a time from start that identifies the location of the video frame 312a in the media content stream 302. This example anchor point 314a also has a unique anchor point identifier that identifies the anchor point 314a from other anchor points.

Further, a first keyword descriptor 316a is conceptually illustrated as being associated with the first anchor point 314a. The first keyword descriptor 316a includes its unique identifier, and includes keyword 1 through keywords i. Accordingly, the one or more keywords 1-i are associated with the location of the first anchor point 314a since the keyword identifier of the first keyword descriptor 316a corresponds to, or is the same as, the unique anchor point identifier of the first anchor point 314a. Further, because the anchor point location of the first anchor point 314a is associated with the known location of the first video frame 312a, the keywords 1-i are associated with the known location of the first video frame 312a, and thus, with the portion of the thematic content event 212 which the first video frame 312a is depicting.

FIG. 3 further conceptually illustrates a second anchor point 314b that has been associated with a duration $T_1$ of the thematic content event 212 beginning with the second video frame 312b. Thus, the anchor point location of the anchor point 314b corresponds to the beginning location of the portion of the video frame 312b, which may be identified by its identifier or a time from start. The duration $T_1$ is identified by a specified duration as measured from the location of the video frame 312b. Alternatively, the duration $T_1$ may be determinable by the location of the last frame 312c.

Further, a second keyword descriptor 316b is conceptually illustrated as being associated with the second anchor point 314b. The second keyword descriptor 316b includes its unique identifier, and includes keyword A through keywords n. Accordingly, the one or more keywords A-n are associated with the location of the second anchor point 314b since the identifier of the second keyword descriptor 316b corresponds to, or is the same as, the unique identifier of the second anchor point 314b. Further, because the anchor point location of the second anchor point 314b is associated with the known location of the duration $T_1$, here beginning at with the second video frame 312b, the keywords A-n are associated with the known location of the second video frame 312b, and thus, with the portion of the thematic content event 212 which the duration $T_1$ is depicting.

In an example embodiment, the plurality of keyword descriptors may be stored in a keyword descriptor database. Such a keyword descriptor database may be separately stored from the media content stream 302. The information in the keyword descriptors may be stored in a relational database (wherein the keyword identifier is related to the anchor point identifier, and wherein the keyword identifier is related to the associated one or more keywords). In such embodiments, the data stored in the keyword descriptor database may be modified without having to access the modified thematic content event 214. Keywords may be added or deleted. Because the unique keyword identifier (which is not changed or modified) is associated with the corresponding unique anchor point identifier, modifications made to the keywords of the keyword descriptor will not affect the location relationship between the keywords of the keyword descriptor and the associated portion of the modified thematic content event 214.

Alternatively, the keyword descriptors may be added into the media content stream 302 at a suitable location that corresponds to a particular location in the anchor point. For example, the keyword descriptors may be embedded in or otherwise incorporated into the audio stream 306, the metadata stream 308, and/or the closed captioning stream 310 of the media content stream 302.

In some embodiments, the anchor point locator is the actual location of the embedded anchor point in the media content stream 302. Alternatively, location information identifying a particular location (or duration) may be stored as data in an anchor point database. That is, the unique anchor point identifier and the information for the anchor point locator may be stored in an anchor point database, or may be stored in the same database that is storing the keyword descriptors. For example, the location information for the anchor point locator may be a frame ID, a scene ID, or a specified time from the start of the thematic content event 212. Thus, the anchor point stored in the anchor point database would be the unique anchor point identifier assigned to the anchor point and the frame ID, scene ID, or time from start. A duration and or a duration end time may also be included as part of the anchor point data that is stored in the anchor point database to define a duration. In such embodiments, anchor points may be added (assuming that the requisite location information is determinable in some manner) and/or may be deleted without having to access the thematic content event 212.

In practice, the operator views the received thematic content event 212 using the operator interface 202 (FIG. 2). At some point of interest in the thematic content event 212 that has been identified by the operator, and based on anticipation by the operator that a portion of a conversation video may have discussion relating to that point in the thematic content event 212, the operator provides a suitable input to the operator interface 202. In response to the operator's input, the anchor point adder 206 generates an anchor point and adds the generated anchor point into the received thematic content event. Alternatively, the anchor point adder 206 may generate the anchor point identifier and use the associated location identifier of the location in the thematic content event 212 (such as the frame ID, the scene ID and/or the time from start) to define the anchor point information, which is then stored in the anchor point database.

Additionally, or optionally, the operator may then specify one or more keywords that are to be associated with a particular anchor point. For example, the operator may initiate generation of the anchor point. Then, the operator may then next specify one or more keywords. The keyword descriptor adder 208 would then generate a keyword identifier and associate it with the anchor point identifier of the generated anchor point. Then, the specified one or more keywords with the keyword descriptor identifier are stored in the keyword descriptor database.

As anchor points are generated, and as keyword descriptors are optionally defined for generated anchor points, the modified thematic content generator generates the modified thematic content event 214. Once the processing of the thematic content event 212 has been completed, the generated modified thematic content event 214 includes a modified version of the thematic content event 212 that includes the generated anchor points and the keyword descriptor database.

E. Member Dialogue Video

In the various embodiments, the conversation video is generated by the video community system 100 using selected video and/or audio commentary, or portions thereof, that have been received from the example user 104 (FIG. 1), from a plurality of other community members (not shown) who have also viewed the thematic content event, or from other individuals (not shown) that are knowledgeable about the thematic content event. Various systems and methods used by a member video and content generator 102 are configured to receive the member dialogue videos that are used to generate the conversation video. A member dialogue video comprises video and audio information that expresses the personal opinions and/or personal viewpoint of the community member about a particular thematic content event. That is, the audio portion of the member dialogue video verbally expresses at least one of a personal opinion and a personal viewpoint about the thematic content event.

Figure 4:
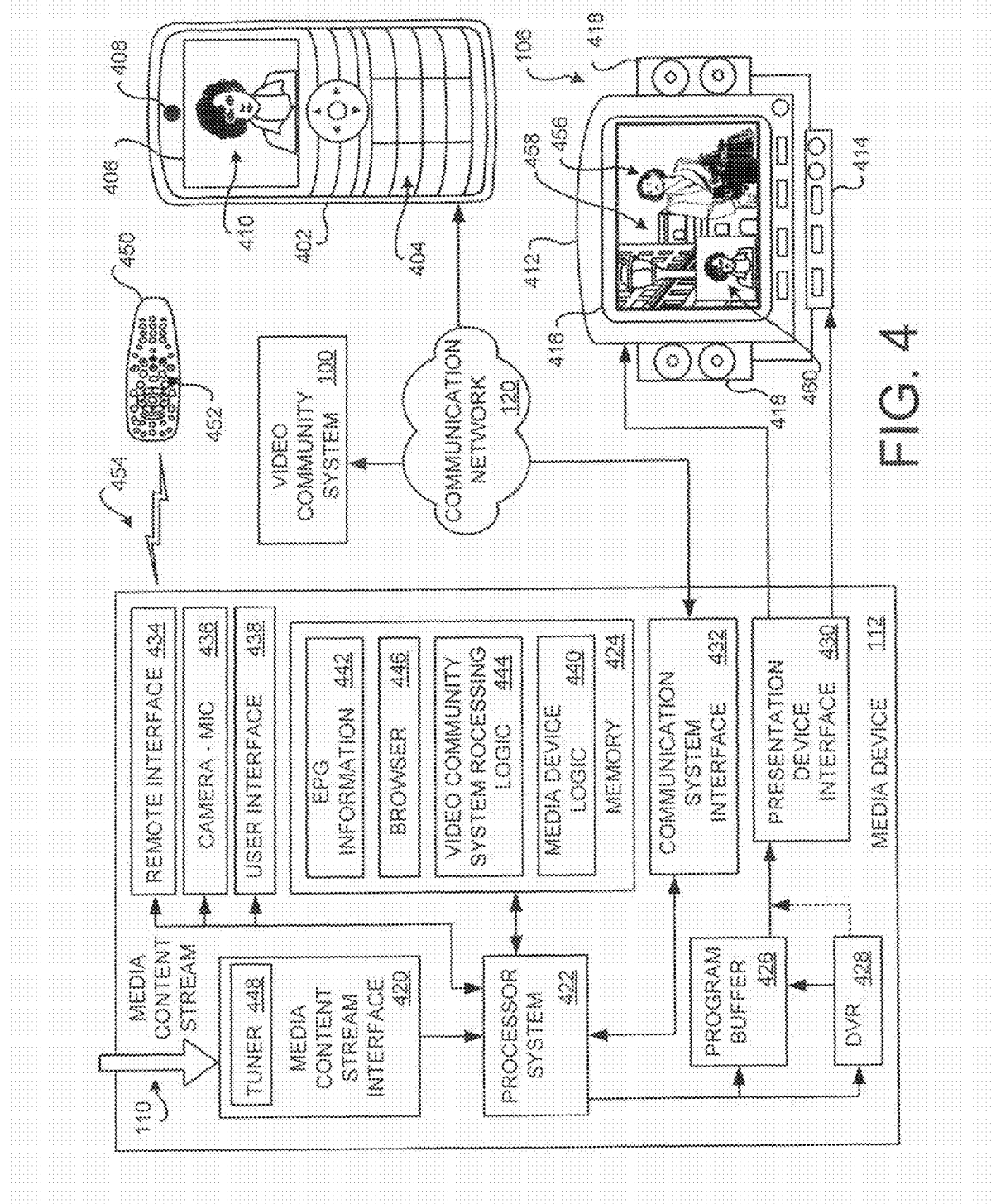
FIG. 4 is a block diagram illustrating an example media device and a mobile device that are configured to generate the video and/or audio commentary that is communicated to the video community system.

FIG. 4 is a block diagram illustrating an example media device 112 and a mobile device 402 that are configured to generate the video and/or audio commentary, referred to as a member dialogue video. Here, the media device 112 and the mobile device 402 are embodiments of the member video and content generator 102. A generated member dialogue video is then communicated to the video community system 100.

An image capture device (video camera) and an audio capture device (microphone) are used to acquire a community member's (the user's) video and audio commentary about a particular thematic content event. In practice, community members, such as the user 104, view a thematic content event (or the modified thematic content event). After the conclusion of the presentation of the thematic content event to the user 104, or even during presentation of the thematic content event, the user 104 may operate the media device 112 and/or the mobile device 402 to acquire their video and/or audio commentary pertaining to the viewed thematic content event.

The device 112, 402 is configured to communicatively couple, via a communication connection or a communication link established with the video community system 100 via the communication network 120. Accordingly, the member dialogue video (the acquired video and/or audio commentary) may be communicated to the video community system 100 for storage. An example embodiment of the video community system 100 receives the member dialogue video at the member interface 138. The member dialogue video is saved into the community commentary information storage medium 140 at the video community system 100 for later processing by the conversation content generator 126.

The communicated member dialogue video additionally includes information that identifies the user 104. Thus, when the video community system 100 constructs a conversation video, the identity of the user 104 is determinable. The identity information of the user may be the user's name, nickname, user handle, or the like that has been stored by the media device 112 or the mobile device 402. Other suitable identifiers may be used. For example, the phone number of the user may be included in the conversation video when the mobile device 402 is a cellular phone. In some embodiments, when a communication connection or link is established between the devices 112, 402 and the video community system 100, information identifying the device 112, 402 may be associated with the identity of the user 104. For example, a serial number of the device 112, 402 may be associated with the name or the like of a community member in a database residing at the video community system 100. Such a database may reside at another suitable location. As other non-limiting examples, the devices internet protocol (IP) address, a uniform resource locator or the like may be used to identify the user 104.

In some situations, if the user's member dialogue video, or a portion thereof, is incorporated into a generated conversation video, the identity of the user 104 may be indicated in the conversation video. For example, the audio portion of the conversation video may audibly present the name of the user 104 before, or after, the user's video and/or audio commentary is presented. Alternatively, or additionally, the name of the user 104 may be textually indicated during presentation of the conversation video. For example, a banner or other text box may be presented while the video and/or audio commentary of that particular user 104 is being presented in the conversation video.

The member dialogue video presents an opinion or a personal viewpoint that the user 104 has concerning the viewed thematic content event. The user 104 may verbally articulate their likes and/or dislikes about the thematic content event in general, about one or more particular scenes, about the performance of one or more actors of the thematic content event, about various attributes or characteristics of the film set where the thematic content event was filmed, about their reaction to the theme or subject matter of the thematic content event, or about any other aspect, characteristic, or point of interest of the thematic content event. Further, a member dialogue video may be relatively long or may be relatively short.

For example, the mobile device 402 may be provisioned with a plurality of controllers 404, such as buttons, switches or the like, a display 406, and a camera/microphone device 408. The user 104 actuates one or more of the controllers 404 to cause the mobile device 402 to operate the camera/microphone device 408 to capture an image 410 of the user 104 and to concurrently acquire the user's audio commentary about the viewed thematic content event that is spoken by the user 104.

Examples of the mobile device 402 include cellular phones equipped with video functionality, personal device assistants (PDAs), note pads, or portable personal computers (PCs) that are configured to acquire video and/or audio commentary. Optionally, the mobile device 402 may be configurable to present a thematic content event that is received in a media content stream on its display 406.

In an example embodiment, the acquired video and/or audio commentary is stored in a memory (not shown) of the mobile device 402 until the user 104 has decided to end their commentary about the thematic content event. Then, the user 104 may review the stored video and/or audio commentary. The stored video and/or audio commentary may be revised or edited by the user 104 as desired. Then, the acquired video and/or audio commentary may be communicated from the mobile device 402 to the video community system 100.

Alternatively, or additionally, the mobile device 402 may establish a connection or link to the video community system 100 before the user initiates their video and/or audio commentary. Accordingly, the user's video and/or audio commentary is communicated to the video community system 100 as it is being captured live by the camera/microphone device 408 of the mobile device 402.

In some instances, the video and/or audio commentary may be acquired while the user 104 is viewing the presented thematic content event. When the user 104 wants to add to their video and/or audio commentary, the user 104 may pause presentation of the thematic content event while the thematic content event video and/or audio commentary is being acquired. When the user 104 has finished their input, presentation of the thematic content event is resumed. In embodiments where the thematic content event is being presented on a display controlled by the device 112, 402 that is acquiring the user's video and/or audio commentary, the device 112, 402 may be configured to automatically pause presentation of the thematic content event when the user 104 initiates input of their thematic content event video and/or audio commentary, and then automatically resume presentation when the user 104 stops their commentary input.

For example, the user 104 may be viewing the thematic content event on the display 406 of their cell phone 402. When the user 104 actuates one or more of the controllers 404, the cell phone 402 begins to acquire the video and/or audio commentary using the camera/microphone device 408 while concurrently pausing presentation of the thematic content event. In some situations, the media device 112 may be presenting the thematic content event on the controlled media presentation system 106. The mobile device 402, if communicatively coupled to the example media device 112, may communicate a message or the like to the media device 112 which causes the media device 112 to pause presentation of the thematic content event.

In some embodiments, the media device 112 may be configured to acquire the video and/or audio commentary of the user 104. FIG. 4 further presents a block diagram of selected elements of the media device 112. An exemplary media device 112 is a set top box (STB). Embodiments of media device 112 may include, but are not limited to, stereos, surround-sound receivers, radios, televisions (TVs), digital video disc (DVD) players, digital video recorders (DVRs), game playing devices, or personal computers (PCs) that are configured to present a video-based thematic content event that is received in a media content stream 110.

The exemplary media device 112 is communicatively coupled to the media presentation system 106 that includes a visual display device 412, such as a television (hereafter, generically a TV), and an audio presentation device 414, such as a surround sound receiver controlling an audio reproduction device (hereafter, generically, a speaker). Other types of output devices may also be coupled to the media device 112, including those providing any sort of stimuli sensible by a human being, such as temperature, vibration and the like. The video portion of the media content event is displayed on the external display 416 and the audio portion of the media content event is reproduced as sounds by one or more speakers 418. In some embodiments, the media device 112 and one or more of the components of the media presentation system 106 may be integrated into a single electronic device.

The non-limiting exemplary media device 112 comprises a media content stream interface 420, a processor system 422, a memory 424, a program buffer 426, an optional digital video recorder (DVR) 428, a presentation device interface 430, a communication system interface 432, a remote interface 434, a camera/microphone 436 (Camera/MIC), and an optional user interface 438. The memory 424 comprises portions for storing the media device logic 440, the electronic program guide (EPG) information 442, the video community system processing logic 444, and an optional browser 446. In some embodiments, the media device logic 440, the browser 446, and the video community system processing logic 444 may be integrated together, and/or may be integrated with other logic. In other embodiments, some or all of these memory and other data manipulation functions may be provided by and using remote server or other electronic devices suitably connected via the Internet or otherwise to a client device. Other media devices (such as, but not limited to the example mobile device 402) may include some, or may omit some, of the above-described media processing components. Further, additional components not described herein may be included in alternative embodiments.

As noted above, a user 104 may wish to view a thematic content event of interest. That is, based upon the user's commands, the media device 112 can then control itself and/or the various media devices that it is communicatively coupled to, such as the components of the media presentation system 106, in accordance with the generated user commands.

The functionality of the media device 112, here a set top box, is now broadly described. A media content provider provides media content that is received in one or more multiple media content streams 110 multiplexed together in one or more transport channels. The transport channels with the media content streams 110 are communicated to the media device 112 from a media system sourced from a remote head end facility (not shown) operated by the media content provider. Non-limiting examples of such media systems include satellite systems, cable system, and the Internet. For example, if the media content provider provides programming via a satellite-based communication system, the media device 112 is configured to receive one or more broadcasted satellite signals detected by an antenna (not shown). Alternatively, or additionally, the media content stream 110 can be received from one or more different sources, such as, but not limited to, a cable system, a radio frequency (RF) communication system, or the Internet.

The one or more media content streams 110 are received by the media content stream interface 420. One or more optional tuners 448 residing in the media content stream interface 420 selectively tune to one of the broadcast-type media content streams 110 in accordance with instructions received from the processor system 422. Other components (not shown) may alternatively, or additionally, reside in the content stream interface 420 to receive other types of media content streams 110.

The processor system 422, executing the media device logic 440 and based upon a request for a thematic content event of interest specified by a user, parses out media content associated with the thematic content event of interest. The thematic content event of interest is then assembled into a stream of video and/or audio information which may be stored by the program buffer 426 such that the video and audio content can be streamed out to components of the media presentation system 106, such as the visual display device 412 and/or the audio presentation device 414, via the presentation device interface 430. Alternatively, or additionally, the parsed out media content may be saved into the DVR 428 for later presentation. The DVR 428 may be directly provided in, locally connected to, or remotely connected to, the media device 112. In alternative embodiments, the media content streams 110 may stored for later decompression, processing and/or decryption.

From time to time, information populating the EPG information 442 portion of the memory 424 is communicated to the media device 112, via the media content stream 110 or via another suitable media. The EPG information 442 stores the information pertaining to the scheduled programming that includes the thematic content event of interest. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user 104 requesting presentation of an EPG display, the information in the EPG information 442 is retrieved, formatted, and then presented on the display 416 as an EPG.

In some embodiments, those particular thematic content event listed in the EPG that have one or more associated conversation videos may be identified as such in the EPG. The availability of a conversation video may be indicated by a suitable color of shading, sect color, text font, text underlining, text bolding or the like. Some embodiments may include a suitable icon on a presented EPG. In some embodiments, the presented EPG icon may be selectable by the user 104. In such embodiments, selection of the EPG icon may cause the media device 112 to become configured to receive a user's input conversations on one or more topics pertaining to the thematic content event (the member dialogue video).

The associated conversation video may be directly accessed from the EPG in some embodiments. For example, selection of a presented EPG icon may cause automatic presentation of the conversation video. In another embodiment, section of a particular thematic content event listed in the EPG may cause presentation of a pop-up window or the like that permits the user to select between presentation of the thematic content event or the associated conversation video.

The exemplary media device 112 is configured to receive commands from the user 104 via a remote control 450. The remote control 450 includes one or more controllers 452. The user 104, by actuating one or more of the controllers 452, causes the remote control 450 to generate and transmit commands, via a wireless signal 454, to the media device 106. The commands control the media device 112 and/or control the media presentation devices 128. The wireless signal 454 may be an infrared (IR) signal or a radio frequency (RF) signal that is detectable by the remote interface 434.

The processes performed by the media device 112 relating to the processing of the received media content stream 110 and communication of a presentable media content event to the components of the media presentation system 106 are generally implemented by the processor system 422 while executing the media device logic 440. Thus, the media device 112 may perform a variety of functions related to the processing and presentation of one or more media content events, the thematic content event, and/or the conversation video that is received in the media content stream 110 or that is received at the communication interface 432.

The example media device 112 optionally includes the camera/microphone 436. The camera/microphone 436 is an image capture device and a sound capturing device that is operable to capture the video and/or audio commentary made by the user when a member dialogue video is being made. Alternatively, or additionally, the camera/microphone 436, and/or one or more components therein, may be external devices or appliances communicatively coupled to the media device 112. For example, a remote camera and/or microphone may be communicatively coupled to the media device wirelessly, or using a suitable wire connector. In some embodiments, the camera/microphone 436 may be components of another device, such as the mobile device 402, a video recorder, the remote control 450, a notepad, a laptop computer, a personal computer, a personal device assistant (PDA), or the like.

The user interface 438 is configured to receive input from the user. For example, the user may input their identifying information that is incorporated into the member dialogue video via the user interface 438. Alternatively, the user may input a request for a particular conversation video by specifying a thematic content event of interest. In an example embodiment, the user interface include various controllers (not shown) that are accessible by the user 104. Alternatively, or additionally, the user interface 438 may be configured to communicatively couple to another device, such as a keyboard device, a touchpad device, a mouse device, or the like.

When the user 104 is viewing a proof video of another community member, the user 104 may wish to provide an affirmation vote or a denial of affirmation vote for that community member. An actuator, such as a button, toggle or the like may reside on the surface of the user interface 438 so that the user 104 may select their vote. In some embodiments, the remote control 450 may be configured to permit the user 104 to make an affirmation vote or a denial of affirmation vote. A suitable pop up screen or the like may be used to graphically indicate the user's vote selection.

FIG. 4 further conceptually illustrates an image of a scene in a thematic content event that the user has selected for presentation. Here, the image shows an actress 456 looking at one of a plurality of buildings 458. During presentation of the scene, the user 104 may be particularly pleased with the performance and/or appearance of the actress 456. The user may decide to provide their video and/or audio commentary about the impression (personal views) to the community by generating a member dialogue video. The example camera/microphone 436 captures the user's audio commentary while an image of the user 104 is concurrently captured. During capture of the member dialogue video, an image 460 of the user 104 may optionally be shown on the display 416 using any suitable format, such as a picture over picture format, a picture in picture format, a split screen format, a full screen format, or the like, wherein the presented scene is relatively smaller than the view field of the display. Once the user 104 has completed making their commentary, the resultant member dialogue video is then communicated to the video community system 100.

F. Member Rant Video

As described herein, a proof video presents commentary from one or more community recognized experts. The proof video presents opinions and views of a particular community member about a particular thematic content event and/or a particular genre and/or topic pertaining to the thematic content event. The proof video is a tool whereby the generating community member may become recognized by the community as being an expert in (based upon received affirmation votes and/or denial of affirmation votes received from other community members).

Before a community member is recognized (before receiving received affirmation votes and/or denial of affirmation votes from other community members), the submitting community member generates a member rant video that presents their opinions and/or views about a particular thematic content event and/or a particular genre and/or topic pertaining to the thematic content event for which they would like to become deemed by the community as being an expert in. That is, before becoming a recognized expert, the submitting community member must submit their member rant video to the video community system 100. Then, the submitting community member must receive a sufficient number of affirmation votes, and/or obtain a sufficient ratio of affirmation votes to denial of affirmation votes, from other community members. Accordingly, the other voting community members need to view the member rant video, and then vote for affirmation, or vote against affirmation, based on their opinion of the member rant video.

Because the objective of a member rant video is to persuade community members that the submitting community member should be recognized as an expert in the community as having a special skill and/or knowledge. Accordingly, the member rant video is preferably a passionate monologue that is made by the submitting community member that demonstrates their high degree of skill or knowledge about a particular thematic content event and/or a particular genre and/or topic pertaining to the thematic content event.

A community member may generate their member rant video using the device 112/402 described in FIG. 4. To initiate generation of a member rant video, the submitting community member provides an input that identifies their recording of their commentary (video and/or audio commentary) as being a member rant video.

A member rant video may be directed to any topic that the submitting community member believes will help establish their expertise in a particular thematic content event and/or a particular genre and/or topic pertaining to the thematic content event. The submitting community member may articulate their opinion about a particular thematic content event, their opinion about a particular scene of the thematic content event, and/or their opinion about a theme of the thematic content event. The member rant video preferably includes recitation of one or more concrete facts about the thematic content event in support of the submitting community member's opinion.

As another non-limiting example, a member rant video may present an opinion about a particular actor. The submitting community member's opinion may be based on a single thematic content event or a plurality of different thematic content events that the actor was in. The member rant video preferably includes recitation of one or more concrete facts about the actor in support of the community member's opinion.

Once the member rant video has been generated, the member rant video is communicated to the video community system 100. An example embodiment of the video community system 100 receives the member rant video at the member interface 138. The member rant video is saved into the community commentary information storage 140 at the video community system 100 for later processing by the conversation content generator 126

G. Producer Dialogue Video

Similar to a member dialogue video, a producer dialogue video presents opinions of, views of, and/or information known by, a producer or other knowledgeable person about a particular thematic content event and/or a particular genre and/or topic pertaining to the thematic content event. For example, the producer may be verbally providing information of interest, such as a fact or the like, pertaining to some aspect or characteristic of a particular scene, or portion thereof, in the thematic content event. Accordingly, the producer or other knowledgeable person may participate in the community discussion when their producer dialogue video, or a portion thereof, is included in a generated conversation video.

In an example embodiment, the video portion of the producer dialogue video shows the producer or other knowledgeable person discussing their viewpoint or opinion, thereby emulating a person-to-person conversation between the viewing user 104 and the producer or other knowledgeable person making the producer dialogue video.

In an example embodiment, the producer dialogue video is a relatively short presentation of video and/or audio commentary of the producer or other knowledgeable person. Thus, a plurality of relatively small producer dialogue videos may be generated, wherein each producer dialogue video pertains to a specified scene and/or topic of the thematic content event. Such producer dialogue videos are in contrast with prior art director cuts, which are typically audio commentary that is made over the course of the entirety of the thematic content event, and which replaces the audio sound track of the thematic content event. That is, the audio portion of a producer dialogue video does not replace portions of the soundtrack of the thematic content event, and portions of the included video portion of a producer dialogue video are different from the corresponding video portion of the thematic content event.

The commentary (video and/or audio commentary) of the producer dialogue video may be created by the device 112, 402, or a similarly configured electronic device (having an image capture/audio capture device, and a way to communicate or store the generated producer dialogue video). A producer dialogue video is communicated to the video community system 100 for optional inclusion in a generated conversation video. An example embodiment of the video community system 100 receives the producer dialogue video at the producer interface 136. The producer dialogue video is saved into the community commentary information storage 140 at the video community system 100 for later processing by the conversation content generator 126.

Alternatively, or additionally, the thematic content modify system 122 (FIG. 2) may be provisioned with the camera/microphone 436 or similar device. The producer dialogue video may be incorporated into the modified thematic content event or may be separately communicated to the video community system 100 (with an associating identifier that associates the producer dialogue video with the thematic content event that pertains to the commentary of the producer dialogue video).

When the producer or other knowledgeable person is creating the producer dialogue video, the producer dialogue video or portions thereof may be associated with one or more anchor points. Accordingly, one or more relatively small producer dialogue videos may be associated with a particular anchor point. Thus, the producer dialogue video is associated to a specified scene, topic, and/or location of the thematic content event.

Alternatively, or additionally, one or more keywords may be associated with a producer dialogue video. The associated keywords are later used by the video community system 100 to facilitate generation of a conversation video. The associated keywords may be later correlated with the anchor point keywords, and thus become associated with a particular scene, topic, and/or location in the thematic content event.

In some situations, the producer dialogue video may include portions of selected scenes in the thematic content event. For example, a picture over picture format, a picture in picture format, a split screen format, a full screen format, or the like, wherein the presented scene is relatively smaller than the view field of the display presenting an image of the speaker. Alternatively, images of the current speaker may be relatively smaller than the view field of the display that is presenting the scene.

Individuals that might create a producer dialogue video include producers of the film and other parties, such as actors, directors, editors, screen writers, film critics, and/or soundtrack composers. Multiple individuals may cooperatively work together to create a producer dialogue video.

The producer dialogue video may include video from other sources, such as other thematic content events or a specially created video. Alternatively, or additionally, the producer dialogue video may include selected audio from other sources, such as a special soundtrack or other music.

H. Endorsement Video

A proof video commentary presents opinions and views of a particular recognized community member about a particular thematic content event and/or a particular genre and/or topic pertaining to the thematic content event. The community member may have been deemed by the community as being an expert in (based upon received affirmation votes and/or denial of affirmation votes received from other community members). To obtain recognition, the submitting community member generates a member rant video. To bolster the persuasiveness of a particular member rant video, a producer or other knowledgeable person may generate an endorsement video. The endorsement video may be incorporated into the submitting community member's rant video.

For example, the director of a thematic content event and/or one or more actors in the thematic content event may be familiar with the submitting community member. They may have a high opinion of the submitting community member, and thus wish to see that submitting community member become a recognized expert. Accordingly, the director and/or actor may generate an endorsement video that presents their favorable opinion of the submitting community member. Preferably, the director and/or actor are notoriously well known and respected by the community members.

When other community members view a proof video that includes the submitting member's rant video, and that further includes one or more endorsement videos, the added endorsement videos may further influence the community member to give an affirmation vote to the submitting community member. For example, a community member may somewhat like the member's proof video, but may not be persuaded enough to give the submitting community member an affirmation vote. However, if the famous actor John Smith has prepared an endorsement video included in the member proof video that supports the submitting community member, then the community member viewing the submitting member's proof video may then become sufficiently persuaded to give the submitting community member an affirmation vote.

The endorsement video may be created by the device 112, 402, or a similar electronic device. Alternatively, or additionally, the thematic content modify system 122 (FIG. 2) may be provisioned with the camera/microphone 436 or similar device so that an endorsement video may be generated using the content modify system 122. The endorsement video is communicated to the video community system 100 for optional inclusion in a member proof video.

An example embodiment of the video community system 100 receives the endorsement video at the producer interface 136. The endorsement video is saved into the community commentary information storage 140 at the video community system 100 for later processing by the conversation content generator 126.

I. Association of Dialogue Videos with Thematic Content Events

When a conversation video is to be generated by the conversation content generator 126, an emulated conversation is generated based on received member dialogue videos, and optionally the producer dialogue videos, that pertain to a particular thematic content event. In view that there are many different thematic content events for which a conversation video will be generated, one skilled in the art appreciates that the many received member dialogue videos and producer dialogue videos must be correctly associated with the particular thematic content event that the conversation content generator 126 is generating the conversation video generated for. That is, if a particular member dialogue video pertains to the thematic content event "A" and does not related to other thematic content events, then when the conversation content generator 126 generates the conversation video for the thematic content event "A", that particular member dialogue video is a candidate for inclusion in the generated conversation video. On the other hand, when the conversation content generator 126 generates a conversation video for a different one of the thematic content events, that particular member dialogue video is not a candidate for inclusion in the generated conversation video. Accordingly, a first problem solved by embodiments of the video community system 100 is correctly associating each received member dialogue video and each received producer dialogue video with at least one particular thematic content event.

In some situations, a received one of the member dialogue videos and/or producer dialogue videos may pertain to multiple thematic content events. Accordingly, embodiments of the video community system 100 correctly associate some received member dialogue videos and received producer dialogue videos with a multiple thematic content events.

Further, once a particular member dialogue video or producer dialogue video has been correctly associated with a particular thematic content event(s), then the pertinent location that the member dialogue video or producer dialogue video is commenting upon must be identified. For example, if a particular portion of a generated conversation video is presenting commentary on a particular scene, then those member dialogue videos or producer dialogue videos that provide commentary on that particular scene should be selected and grouped together in that particular portion of the conversation video.

For example, commentary relating to the conclusion of a thematic content event should occur preferably in one place in the conversation video, and preferably at the end of the conversation video. Otherwise, the continuity of the emulated conversation will seem unnatural to the user 104 viewing the conversation video. To further illustrate, in a member dialogue video providing commentary on the opening scene of the thematic content event is included in the emulated conversation about the conclusion of the thematic content event, then the flow of the emulated conversation will likely become disrupted, and therefore may become distracting or displeasing to the user 104. Accordingly, a second problem solved by embodiments of the video community system 100 is correctly associating each received member dialogue video and each received producer dialogue video (or portions thereof) with a particular relevant location within the thematic content event.

Figure 5:
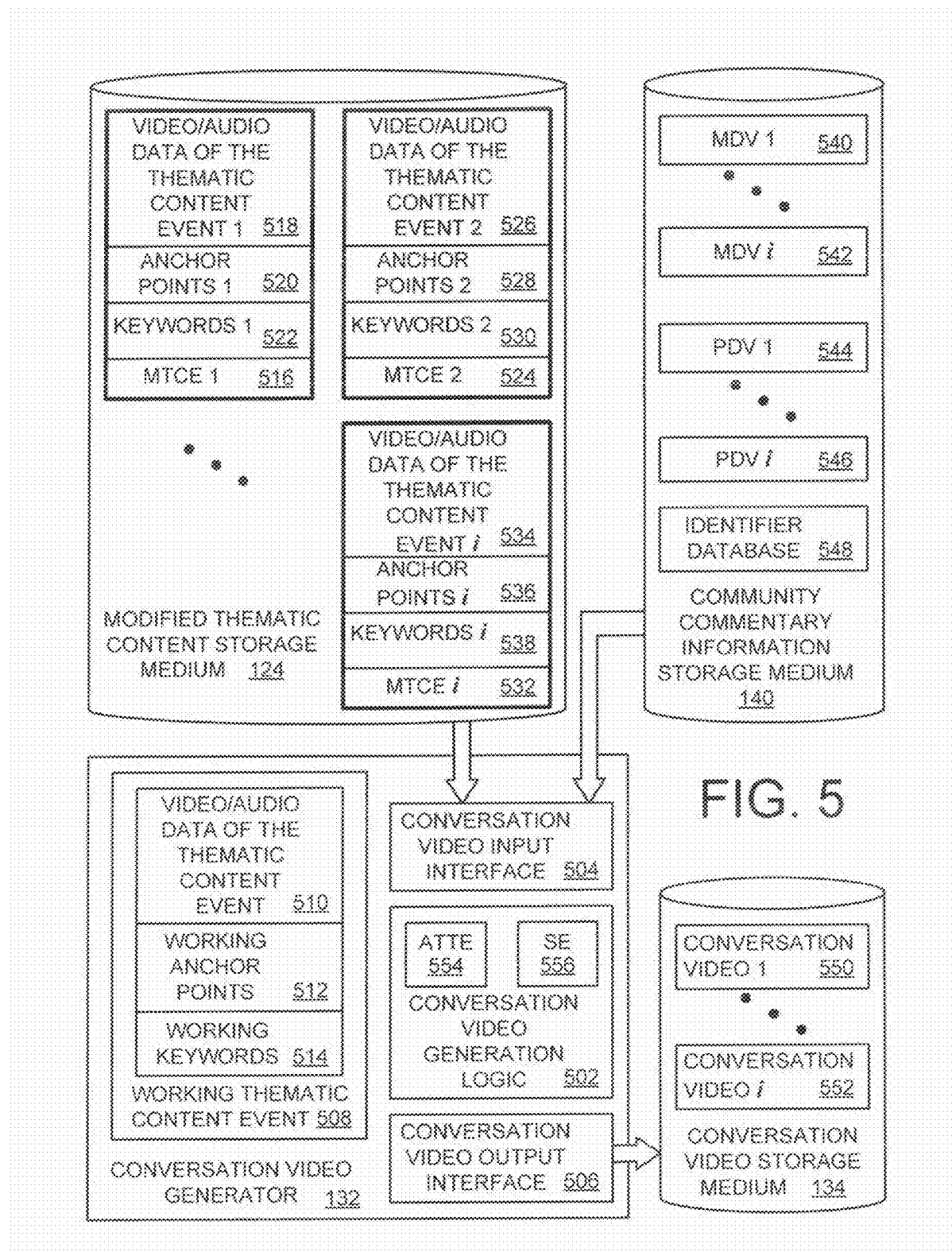
FIG. 5 is a block diagram of the conversation video generator, the modified thematic content storage medium, the community commentary information storage medium, and the conversation video storage medium.

FIG. 5 is a block diagram of the conversation video generator 132, the modified thematic content storage medium 124, the community commentary information storage medium 140, and the conversation video storage medium 134. The conversation video generator 132 comprises the conversation video generation logic 502, a conversation video input interface 504, a conversation video output interface 506, and a working thematic content event 508. The working thematic content event 508 comprises video/audio data of the thematic content event 510, working anchor points 512, and working keywords 514.

The modified thematic content storage medium 124 stores a plurality of modified thematic content events, illustrated as modified thematic content event 1 through modified thematic content event i. The first modified thematic content event 516 (illustrated as "MTCE 1") includes the video/audio data of the thematic content event 518, a plurality of anchor points 520 (illustrated as "anchor points 1"), and a plurality of keywords 522 (illustrated as "keywords 1"). Similarly, the second modified thematic content event 524 (illustrated as "MTCE 2") includes the video/audio data of the thematic content event 526, a plurality of anchor points 528 (illustrated as "anchor points 2"), and a plurality of keywords 530 (illustrated as "keywords 2"). Finally, a last one of the plurality of modified thematic content events 532 (illustrated as "MTCE i") includes the video/audio data of the thematic content event 534, a plurality of anchor points 536 (illustrated as "anchor points i"), and a plurality of keywords 538 (illustrated as "keywords i"). In alternative embodiments, one or more of the modified thematic content events may be stored in a distributed fashion using other memory mediums The community commentary information storage medium 140 stores a plurality of member dialogue videos, illustrated as the first member dialogue video 540 (illustrated as "MDV 1") through a last member dialogue video 542 (illustrated as "MDV i"), and a plurality of producer dialogue videos, illustrated as the first producer dialogue video 544 (illustrated as "PDV 1") through a last producer dialogue video 546 (illustrated as "PDV i"). The community commentary information storage medium 140 further includes the identifier database 548 that stores an identifier for each of the stored member dialogue videos and producer dialogue videos. Further, the identifier includes an association between the member dialogue videos and/or the producer dialogue videos with one or more thematic content events. In alternative embodiments, one or more of the member dialogue videos, producer dialogue videos, and/or the information in the identifier database 548 may be stored in a distributed fashion using other memory mediums.

The conversation video storage medium 134 stores a plurality of generated conversation videos, illustrated as the first conversation video 550 (illustrated as "conversation video 1") through a last conversation video 552 (illustrated as "conversation video i"). In alternative embodiments, one or more of the conversation videos may be stored in a distributed fashion using other memory mediums.

When each member dialogue video or producer dialogue video is received at the conversation video input interface 504, embodiments of the conversation content generator 126, executing audio-to-text translation engine 554 (ATTE) of the conversation video generation logic 502 (using the processing system 142 or another suitable processor system), accesses the audio portion of the member dialogue video or producer dialogue video. An audio to text conversion is performed by the ATTE 554 wherein the verbal commentary in the member dialogue video or producer dialogue video is converted to text.

Then, the text of the member dialogue video or producer dialogue video is compared to the keywords of each of the plurality of modified thematic content events by a text-based search engine 556 (SE) of the conversation video generation logic 502. Embodiments of the video community system 100 may use any suitable text-based search engine 556. The text-based search engine 556 is an engine that compares text of a first element with words of a plurality of second elements. Here, the first element is an analyzed member dialogue video or producer dialogue video where the text has been determined by the ATTE 554 based on the dialogue on the commentary of the analyzed member dialogue video or producer dialogue video. The plurality of second search elements are the plurality of generated modified thematic content events having a plurality of predetermined keywords (associated with anchor points). Thus, the determined text of the analyzed member dialogue video or producer dialogue video is compared with the keywords of one or more of the modified thematic content events.

When a sufficient number of words in the text of the analyzed member dialogue video or producer dialogue video match with the keywords of a particular modified thematic content event, then the analyzed member dialogue video or producer dialogue video is then associated with that particular modified thematic content event. In the various embodiments, each of the member dialogue videos or producer dialogue videos are given a unique identifier. Each of the modified thematic content events also have unique identifiers. Thus, when a match is identified, the unique identifier of the member dialogue video or producer dialogue video is associated with the unique identifier of the matching modified thematic content event, and the matching pair of unique identifiers permits later generation of a conversation generator.

For example, community member John Smith may generate a member dialogue video that is communicated to the video community system 100. The dialogue of John Smith's member dialogue video is converted to text. At some point in the dialogue of the member dialogue video, John Smith may have spoken the title of the particular thematic content event that he is discussing. Here, the text-based search engine 556 is configured to identify the words of the title of the particular thematic content event that John Smith is commenting on, and then match the spoken words of the title with the same title of the modified thematic content event (because example keywords of the modified thematic content event include its title).

Additionally, or alternatively, John Smith may have spoken about one or more attributes of a particular scene in a particular thematic content event (without mentioning the title of the thematic content event). For example, John Smith may have spoken the names of actors in the theme, described one or more particular events occurring in the scene, described a particular theme about the subject matter of the scene, and/or described one or more characteristics of the scene setting. Here, during generation of the modified thematic content events, keywords have preferably been defined for scenes that John Smith may have spoken about in his member dialogue video. Accordingly, the text-based search engine 556 is configured to identify the words John Smith may have spoken about, and then match the spoken words of the plurality of keywords of the same modified thematic content event (because example keywords of the modified thematic content event include its words that correspond to the various attributes of the scene). When there are a sufficient number of matches between the words spoken by John Smith during his discussion of the thematic content event with keywords in a plurality of thematic content events, a match with the particular subject thematic content event may be determined with a sufficient degree of reliability to conclude that the subject thematic content event has been identified.

In practice, the ATTE 554 receives each member dialogue video or producer dialogue video and determines text (words) of the dialogue therein. Optionally, the text-based search engine 556 may identify and omit, or otherwise ignore, insignificant or less significant words from the determined text. For example, words such as "and", "or", "a", "an" or the like are not likely to meaningfully contribute to the word searching process performed by the text-based search engine 556. Thus, the text-based search engine 556 may include and/or access a list of predefined words and/or phrases that will not be used in the search process. Searching can then proceed based on remaining text. Any suitable word or phrase may be predefined and stored in a list that is accessed by the text-based search engine 556 to facilitate a search process.

Optionally, some words or phrases will always be used in the search process. For example, the name of a famous actor may be included in a list of predefined words and/or phrases that will be used in the search process. Any suitable word or phrase may be predefined and stored in a list that is accessed by the text-based search engine 556 to facilitate a search process.

In some instances, a received member dialogue video or producer dialogue video may be related to multiple thematic content events. Additionally, or alternatively, different portions of a received member dialogue video or producer dialogue video may be related to different thematic content events. The text-based search engine 556 is configured to associate the analyzed member dialogue video or producer dialogue video with multiple modified thematic content events, and to associate portions of the analyzed member dialogue video or producer dialogue video with different modified thematic content events.

Information for each received member dialogue video or producer dialogue video and its associated one or more member dialogue videos is saved for later generation of a conversation video for a particular modified thematic content event. In an example embodiment, this information is stored in the identifier database 548 of the community commentary information storage medium 140. In other embodiments, the information may be saved in other suitable media that is accessible by the conversation video generation logic 502.

In some embodiments, the associated one or more thematic content events may be already associated with a received member dialogue video or producer dialogue video. In such situations, the conversation video generation logic 502 does not need to identify the thematic content event with the received member dialogue video or producer dialogue video using the text-based search engine 556. Rather, the received information may be directly stored into the identifier database 548.

For example, but not limited to, the user 104 or the producer may use a suitable interface to type in or otherwise specify the words of the title of the particular thematic content event that they are discussing. The words of the title are then automatically included in the member dialogue video or producer dialogue video that is communicated to the video community system 100.

As another example, the user 104 may be watching a particular thematic content event while they are generating a member dialogue video. If the device 112, 402 that is generating the member dialogue video is also presenting the particular thematic content event, or is in communication with another device that is presenting the particular thematic content event, then the identity of that thematic content event is determinable. For example, the title of the thematic content event may be available for the EPG information 442 since the device 112, 402 can identify the presented thematic content event. A program identifier (PID) or other suitable identifier may be available from the EPG information 442 and/or may be available in the metadata of the presented thematic content event. The determined identifier may then be automatically included in the member dialogue video that is communicated to the video community system 100.

As another non-limiting example, the remote control 450 (FIG. 4) provisioned with a camera/microphone 436 may be the device that is used to generate the member dialogue video. Since the user 104 has previously operated the remote control 450 to select the particular thematic content event that the user 104 is discussing, the identity of that particular thematic content event is determinable by the remote control 450 and/or the controlled media device 112.

In some situations, the media device 112 may be presenting the particular thematic content event while the user is using their mobile device 402 to generate the member dialogue video. Here, the mobile device 402 may establish a suitable communication link to the media device 112 and query the media device 112 for the title and/or other suitable identifier of the currently presented thematic content event. The media device 112 may then determine the identifier of the currently presented thematic content event based on the EPG information 442 and/or information in the metadata of the thematic content event. This identifying information can then be communicated from the media device 112 to the mobile device 402 for automatic inclusion in the generated member dialogue video.

If a producer or other knowledgeable person is using the thematic content modify system 122 (FIG. 2) to generate their producer dialogue video, the title of the thematic content event or other suitable identifier may then be automatically included in producer dialogue video that is communicated to the video community system 100. For example, the producer may type in or otherwise specify the title of the thematic content event via the operator interface 202. Alternatively, or additionally, a program identifier (PID) or other suitable identifier may be used to automatically identify the thematic content event.

Association of Rant and Endorsement Videos with Community Members

When a community member wishes to become a recognized expert (being particularly knowledgeable about a particular thematic content event and/or a particular genre and/or topic pertaining to the thematic content event), the community member generates a rant video the provides persuasive arguments, and preferably supporting facts, for their assertion that they should become a recognized expert. The identity of the community member must be determinable for each received rant video.

In an example embodiment, the community member generating the rant video may speak their name in an introductory statement or the like. The ATTE 554 may then be used by the video community system 100 to determine the identity of the community member submitting the rant video.

Alternatively, or additionally, the community member may type in their name using a suitable user interface during generation of the rant video. For example, the community member may use the plurality of the controllers 452 on the remote control 450 to enter their name when using their remote control to generate the rant video. The community member may enter their name when using their mobile device 402 to generate the rant video. Alternatively, or additionally, the community member may enter their name via the user interface 438 when generating their rant video using the media device 112.

In some embodiments, the identity of the community member may be inferred based on the device that is used to generate the rant video. For example, the media device 112, the mobile device 402 and/or the remote control 450 may have a unique identifier, such as a serial number or the like. Alternatively, or additionally, account information may be associated with the media device 112, the mobile device 402 and/or the remote control 450 generating the rant video, wherein the account information is associated with the submitting community member. For example, if the mobile device 402 is cellular phone or the like, the telephone number, subscriber identity module (SIM) card identifier, Global System for Mobile (GSM) Communications identifier, or the like may be used to determine the identity of the submitting community member.

Once the identity of the community member submitting a rant video is determined, the identifying information is associated with the rant video. This information is saved into the identifier database 548 so that the submitting community member can be identified when a proof video is generated by the video community system 100.

When a proof video is generated, endorsement videos, or portions thereof, may be included to further bolster the submitting community member's assertion that they should become a recognized expert. For example, a famous actor, producer, director or other notoriously well known person may generate an endorsement video in support of a particular community member. When an endorsement video is received by the video community system 100, the identity of the individual generating the endorsement video and the intended beneficiary community member must be determinable.

In an example embodiment, the individual generating the endorsement video may speak their name and/or the name of the intended beneficiary community member in an introductory statement or the like. The ATTE 554 may then be used by the video community system 100 to determine the identity of the individual submitting the endorsement video and the intended beneficiary community member.

Alternatively, or additionally, the individual may type in their name and/or the name of the intended beneficiary community member using a suitable user interface during generation of the endorsement video. For example, the individual may use the plurality of the controllers 452 on the remote control 450 to enter their name and/or the name of the intended beneficiary community member when using their remote control to generate the endorsement video. The individual may enter their name and/or the name of the intended beneficiary community member when using their mobile device 402 to generate the endorsement video. Alternatively, or additionally, the individual may enter their name and/or the name of the intended beneficiary community member via the user interface 438 when generating their rant video using the media device 112.

In some embodiments, the identity of the individual generating the endorsement video may be inferred based on the device that is used to generate the endorsement video. For example, the media device 112, the mobile device 402 and/or the remote control 450 may have a unique identifier, such as a serial number or the like. Alternatively, or additionally, account information may be associated with the media device 112, the mobile device 402 and/or the remote control 450 generating the endorsement video, wherein the account information is associated with the submitting individual. For example, if the mobile device 402 is cellular phone or the like, the telephone number, subscriber identity module (SIM) card identifier, Global System for Mobile (GSM) Communications identifier, or the like may be used to determine the identity of the individual submitting the endorsement video.

Once the identity of the individual submitting a endorsement video and the intended beneficiary community member is determined, the identifying information is associated with the endorsement video and the rant video of the intended beneficiary community member. The information is saved into the identifier database 548 so that the submitting individual and the intended beneficiary community member can be identified when a proof video is generated by the video community system 100.

J. Conversation Video Generation

Embodiments of the video community system 100 are configured to receive member dialogue videos (video and/or audio commentary) from the user 104, receive member dialogue videos from a plurality of other users, and/or receive producer dialogue videos from other individuals that are knowledgeable about the thematic content event. Based on the received video and/or audio commentary, embodiments of the video community system 100 then generate a conversation video that incorporates selected ones of the received member dialogue videos and/or producer dialogue videos (or portions thereof). The conversation video may optionally include selected portions of that particular thematic content event. The generated conversation video emulates a conversation about the thematic content event between the user 104 and other users and/or knowledgeable individuals. Thus, upon viewing the conversation video, the user 104 has an experience that is comparable to the above-described group of friends who are together to discuss the thematic content event.

A conversation video may be generated that presents a conversation spanning the entirety of a particular thematic content event. In such a conversation video, all of the scenes, or selected scenes of significance to the story line of the thematic content event, may be discussed in a chronological order that corresponds to the order of scene presentation in the thematic content event. Alternatively, or additionally, a plurality of selected scenes that are related to each other may be discussed as a group in the conversation video. Accordingly, the user 104 upon viewing the conversation video, is experiencing an emulated conversation among community members and other knowledgeable persons about the entirety of the thematic content event.

Other conversation videos may discuss particular topics and/or particular subject matter of a thematic content event. For example, one or more scenes may be so significantly interesting, and may be of such significant community interest, that the conversation video may be focused on that particular aspect of the thematic content event. For example, the thematic content event may have a story line relating to social issues that are of great interest to society. Accordingly, discussion relating to other scenes that are not particularly relevant to the social interest topic are omitted from the thematic content event. In such a conversation video, selected scenes relating to the particular topic or subject matter of interest may be discussed in the conversation video. The related scenes may be discussed in a chronological order corresponding to the order of scene presentation in the thematic content event. Alternatively, or additionally, a plurality of selected scenes that are further related to each other may be discussed as a group in the conversation video. Accordingly, the user 104 upon viewing the conversation video, is experiencing an emulated conversation among community members and other knowledgeable persons who are interested in the topic or subject matter of interest.

Alternatively, or additionally, one or more selected scenes may be discussed in a generated conversation video. For example, a single scene, or a few selected scenes, may themselves we worthy of their own conversation video. For example, the thematic content event may employ a new cinematic special effect that has never before been used in the filming of thematic content events. Accordingly, the user 104 upon viewing the conversation video, experiences an emulated conversation among community members and other knowledgeable persons about the cinematic special effect of interest In some situations, multiple thematic content events, or portions thereof, may be discussed in a generated conversation video. In such a conversation video, selected scenes from the multiple modified thematic content events may be discussed. For example, a series of related thematic content events may be discussed in a thematic content event on an episode-by-episode basis. Alternatively, the conversation video may present a discussion about a particular actor of the series, and/or may present a discussion about recurring topic in the plurality of thematic content events. Accordingly, the user 104 upon viewing the conversation video, experiences an emulated conversation among community members and other knowledgeable persons about a group of related thematic content events.

Generation of a conversation video begins when the general structure and architecture of a generated conversation video is initially defined, preferably by an operator of the video community system 100. For example, the operator may specify that the conversation video is to present a general discussion about the entirety of a particular thematic content event. Alternatively, or additionally, the operator may structure the conversation video to present a discussion about one or more special topics and/or about selected specific subject matter presented in a particular thematic content event and/or multiple thematic content events.

Once the general structure and architecture of the conversation video to be generated has been defined (which includes a specification of the particular thematic content events that are to be used for generation of the conversation video), the video community system 100 retrieves the specified modified thematic content event(s) from the modified thematic content event storage medium 124. The retrieved modified thematic content event is then saved as the working thematic content event 508 that is to be processed by the conversation video generation logic 502. For example, if the first thematic content event 516 is specified as the thematic content event that is to form the basis of the generated conversation video, the stored video/audio data of the thematic content event 1 (reference numeral 518) is accessed, and then is stored into the video/audio data of the thematic content event 510 for later processing by the conversation video generator 132. The stored anchor points 1 (see reference numeral 520) and the stored keywords 1 (see reference numeral 522) of this first thematic content event are also accessed, and then are stored as the working anchor points 512 and the working keywords 514, respectively.

The identifier database 548 is also accessed to identify member dialogue videos and/or producer dialogue videos that are associated with the specified thematic content event. Identified member dialogue videos and/or producer dialogue videos (or discussion portions thereof) are then each analyzed by the ATTE 554 to determine the text of the dialogue. The determined dialogue text of each analyzed member dialogue video and/or producer dialogue video is then compared with the keywords of the specified modified thematic content event by the text-based search engine 556.

The text-based search engine 556 matches determined textual dialogue with one or more keywords associated with a particular one of the anchor points. Then, the corresponding anchor point of that matched keyword is identified. Based on the anchor point location information of the identified anchor point, the pertinent location in the modified thematic content event that the determined textual dialogue pertains to is identified. Then, that particular analyzed member dialogue video and/or producer dialogue video is associated with the identified location in the modified thematic content event.

As more member dialogue videos and/or producer dialogue videos associated with the specified thematic content event are analyzed, additional member dialogue videos and/or producer dialogue videos each become associated with a particular location in the thematic content event. In some instances, many member dialogue videos and/or producer dialogue videos are associated with same location in the thematic content event (identified by the location information in the associated anchor points).

Some member dialogue videos and/or producer dialogue videos may provide commentary about different portions of the specified thematic content event. The conversation video generation logic 502 is configured to identify and parse out the different discussion portions of an analyzed member dialogue video or analyzed producer dialogue video. Then, for each parsed out individual discussion, the conversation video generation logic 502 identifies the particular relevant location in the thematic content event for each of the parsed out discussion portions.

Typically, a member dialogue video and/or a producer dialogue video may transition from one discussion to another discussion throughout the course of the dialogue video or producer dialogue video. In an example embodiment, the conversation video generation logic 502 parses out individual discussions (determined discussion portions of the member dialogue video) based on a textual analysis of the determined dialogue text. For example, but not limited to, transitional words such as "next" or the like may be used to identify a transition from one discussion portion to another discussion portion.

Alternatively, or additionally, the words of the determined text may indicate a transition. For example, the user 104 may be discussing a first actor's performance in a particular scene, and then proceed to a discussion of a second actor's performance in another scene. The names of the first and second actors may be identified, and therefore be determined to be different from each other. The change in actor names during the commentary of the member dialogue video may be used to identify a transition from one discussion portion to another discussion portion.

As yet another non-limiting example, the user 104 may be discussing a topic or characteristic of a particular scene, and then proceed to a discussion of a different topic or characteristic in a different scene or even in the same scene. In an example embodiment, the topics and/or characteristics may be differentiated from each other by the text-based search engine 556. For instance, the user 104 may be discussing a first scene filmed at night (and thus the user 104 may using words such as night, dark, stars, moon, etc.) and then transition to a discussion about a second scene filmed during the day (and thus user 104 may then be using words such as light, sun, shade, shadows, or the like.) The change in the description of topics or characteristics during the commentary of the member dialogue video may indicate a transition from one discussion portion to another discussion portion. For instance, a transition may be identified when the determined text has the words "stars" therein, and then changes to then include the word "sun" or the like. These particular example words spoken in a member dialogue video would tend to indicate a transition between discussion portions of the member dialogue video.

Next, the text-based search engine 556 compares the text of each individual discussion portion with the keywords of the modified thematic content event. When the text of an individual discussion portion matches keywords associated with a particular anchor point, then the location information of that anchor point may be used to identify the corresponding location in the thematic content event that that particular discussion portion pertains to.

In some embodiments, a member dialogue video may be generated while the user 104 is viewing presentation of a modified thematic content event which already has associated anchor points throughout the modified thematic content event. If the device 112, 402 that is generating the member dialogue video is synchronized with presentation of the particular modified thematic content event, or is in communication with another device that is presenting the particular modified thematic content event, then anchor points may be encountered from time to time while the user 104 is providing their commentary during generation of their member dialogue video. In such situation, an annotation or the like may be added into the member dialogue video to indicate the identity of an encountered anchor point, thereby associating the anchor point with a particular location in the member dialogue video. For example, the user 104 may be discussing scene "A" during a particular point in the generation of their member dialogue video. If an anchor point associated with scene "A" is encountered, then the identification of that particular anchor point can be saved with that particular portion of the member dialogue video. When that portion of the member dialogue video is later analyzed, the identified anchor point may be used to more quickly and efficiently identify where in the thematic content event that particular member dialogue video portion should be associated with.

As the member dialogue videos and/or producer dialogue videos associated with the specified thematic content event are processed, a plurality of member dialogue videos and/or producer dialogue videos (or discussion portions thereof) becomes uniquely associated with locations (as identified by the anchor points) in the thematic content event.

Next, the conversation video generation logic 502 constructs the conversation video by selectively picking and choosing those associated member dialogue videos and/or producer dialogue videos (or discussion portions thereof) for each particular scene and/or topic that is to be discussed during the conversation video. For example, the thematic content event may have ten significant scenes, and/or ten significant topics presented by one or more different scenes, that are to be discussed in a generated conversation video. These ten significant scenes and/or topics are specified by the operator of the video community system 100 in an example embodiment. Further, the discussion order of the scenes and topics may be specified by the operator, or alternatively, may be ordered based on their relative order of presentation in the thematic content event.

For the first scene or topic to be discussed in the conversation video, there may be many, or even thousands of, member dialogue videos and/or producer dialogue videos (or discussion portions thereof) that have been identified as potential candidates pertaining to that first scene or topic (based on the association of the determined text and keywords, and the location information from the anchor points associated with the keywords). From the pool of available candidate member dialogue videos and/or producer dialogue videos (or discussion portions thereof), the conversation video generation logic 502 chooses a limited number of the member dialogue videos and/or producer dialogue videos (or discussion portions thereof) for inclusion into a generated conversation video. This selection of a limited number of member dialogue videos and/or producer dialogue videos (or discussion portions thereof) is desirable so that the portion of the generated conversation video does not become too long.

In an example embodiment, the number of selected member dialogue videos and/or producer dialogue videos (or discussion portions thereof) may be predefined. Alternatively, or additionally, a duration for a portion of the conversation video may be predefined. Thus the duration of selected candidate member dialogue videos and/or producer dialogue videos (or discussion portions thereof) may be added together so that the total duration of the conversation video does not exceed the predefined duration.

In some situations, the number and/or duration of the selected member dialogue videos and/or producer dialogue videos (or discussion portions thereof) for one particular scene or topic may be different from other scenes and/or topics presented in the conversation video. The desired number and/or duration for discussion of each scene and/or topic may be specified by the operator of the video community system 100. For example, a first scene may be specified to have no more than three member dialogue videos and/or producer dialogue videos (or discussion portions thereof). A more important second scene or topic may be specified to have between six and eight member dialogue videos and/or producer dialogue videos (or discussion portions thereof). Thus, final selection of candidate member dialogue videos and/or producer dialogue videos (or discussion portions thereof) may be based on a predefined number.

Alternatively, or additionally, a total duration of discussion may be defined for each of the scenes and/or topics. For example, a duration of the discussion for the first scene or topic may be specified to be three minutes, and the total duration for the more important second scene or topic may be specified to be between six to eight minutes. Thus, final selection of candidate member dialogue videos and/or producer dialogue videos (or discussion portions thereof) may be based on the specified duration.

In some embodiments, the number and duration are considered together. Thus, a particularly long duration member dialogue video and/or producer dialogue video (or discussion portions thereof) might be initially selected for inclusion into the conversation video, but may later be discarded or otherwise disqualified if the total duration of discussion allocated for that particular scene or topic is exceeded. An alternative candidate member dialogue videos and/or producer dialogue videos (or discussion portions thereof) may then be selected.

Alternatively, or additionally, weighting factors may be assigned to each scene and/or topic. Then, based on a total specified duration for the conversation video, the number and/or duration may be automatically adjusted (determined) for each scene and/or topic. For example, a more important scene or topic may have a weighting of two times that of another scene or topic. Thus, if the other scene or topic is determined to have at most three member dialogue videos and/or producer dialogue videos (or discussion portions thereof), then the more important scene or topic would have six member dialogue videos and/or producer dialogue videos (or discussion portions thereof). Similarly, if the other scene or topic is determined to have at most a total duration of three minutes of member dialogue videos and/or producer dialogue videos (or discussion portions thereof), then the more important scene or topic would have a duration of six minutes of member dialogue videos and/or producer dialogue videos (or discussion portions thereof).

Once candidate member dialogue videos and/or producer dialogue videos (or discussion portions thereof) have been identified for a particular scene and/or topic of the thematic content event, and a determination has been made for the total number of and/or total duration of the member dialogue videos and/or producer dialogue videos (or discussion portions thereof) that may be used for each scene and/or topic, the conversation video generator 132 next picks and chooses particular member dialogue videos and/or producer dialogue videos (or discussion portions thereof) for inclusion in the conversation video.

When the number of candidate member dialogue videos and/or producer dialogue videos (or discussion portions thereof) exceeds the allocated total number and/or total duration for a particular scene or topic, embodiments of the conversation video generator 132 must select which of the candidate member dialogue videos and/or producer dialogue videos (or discussion portions thereof) are to be used for generation of the conversation video and which of the candidate member dialogue videos and/or producer dialogue videos (or discussion portions thereof) are not to be used. Preferably, more interesting, more informative, and/or more entertaining candidate member dialogue videos and/or producer dialogue videos (or discussion portions thereof) are selected over less interesting, less informative, and/or less entertaining candidates.

In an example embodiment, the operator of the video community system 100 makes a determination of which candidate member dialogue videos and/or producer dialogue videos (or discussion portions thereof) will be used in the generated conversation video, and which candidates will not be used. The video community system 100 may present a menu or the like to the operator that indicates the identified candidate member dialogue videos and/or producer dialogue videos (or discussion portions thereof) on a scene by scene, or by a topic by topic, basis. The menu is configured to permit the operator's selection of candidate member dialogue videos and/or producer dialogue videos (or discussion portions thereof) for inclusion in the conversation video.

Some menus may be configured to permit the operator to view selected candidate member dialogue videos and/or producer dialogue videos (or discussion portions thereof) so that the operator may subjectively base their selection amongst the candidate member dialogue videos and/or producer dialogue videos (or discussion portions thereof) using their personal preferences. That is, after viewing candidate member dialogue videos and/or producer dialogue videos (or discussion portions thereof), the operator may select their favorites for inclusion in the generated conversation video.

Alternatively, or additionally, the member dialogue videos and/or producer dialogue videos (or discussion portions thereof) may be automatically selected from the candidate pool of member dialogue videos and/or producer dialogue videos (or discussion portions thereof). In an example embodiment, a rating system or priority system may be used for selection among candidate member dialogue videos and/or producer dialogue videos (or discussion portions thereof). For example, but not limited to, a member dialogue video provided by a recognized community member may have a higher rating or priority than a member dialogue video provided by other community members. As another example, a producer dialogue video (or discussion portions thereof) provided by a notoriously famous and well-liked actor may have a higher rating or priority than a producer dialogue video provided by an unknown actor. Any suitable rating system or priority system may be used by the various embodiments.

For example, but not limited to, a member dialogue video from a recognized expert community member may have a rating or priority of 9 (out of 10), and member dialogue video submitted by a relatively unknown or new community member may have a lower rating or priority of 2 (out of 10). Thus, if only one of these two candidate member dialogue videos can be selected for the conversation video, the higher rated candidate member dialogue video may be automatically selected. Presenting higher rated member dialogue videos in a conversation video is appreciated to result in a more interesting and/or entertaining conversation video Further, other criteria may be used to select member dialogue videos and/or producer dialogue videos (or discussion portions thereof). For example, opposing viewpoints may be made by different groups of candidate member dialogue videos and/or producer dialogue videos (or discussion portions thereof). For example, one group of candidates may express a like for a particular scene, and another group of candidates may express a dislike for the same scene. Accordingly, one or more from the group expressing a liking for the scene, and one or more from the group expressing a dislike for the scene may be selected for inclusion in the conversation video. All similar views may be presented together as a group in an example embodiments. Alternatively, or additionally, opposing viewpoints may be interleaved to create dialogue exchange that emulates an argument. Presenting opposing viewpoints in a conversation video is appreciated to result in a more interesting and/or entertaining conversation video.

Alternatively, or additionally, an example criteria may require that a selected member dialogue video and/or producer dialogue video (or discussion portion thereof) have supporting reasoning and/or supporting facts. In such embodiments, the presence or absence of supporting reasoning and/or supporting facts may be used to select among candidates. For example, a first community member may state in their member dialogue video that they like a particular scene because of certain specific reasons which have been articulated in support of their opinion. Further, the first community member may optionally provide supporting facts in their conversation video in support of their opinion. In contrast, a second community member may merely say that they like the same scene in their conversation video, with no discussion of their reasoning or with no supporting facts. Accordingly, the member dialogue video provided by the first community member may be more desirable (and thus is selected for inclusion in the conversation video) than the member dialogue video from the second community member (which is not selected).

In some instances, a first community member may provide a relatively comprehensive first member dialogue video that discusses most of, or all of, the scenes and/or topics of the thematic content event. In contrast, a second community member may submit a relatively short and/or less comprehensive second member dialogue video that discusses a single scene or topic, or that discusses a limited number of scenes and/or topics. The more comprehensive first member dialogue video from the first community member may be parsed into a plurality of discussion segments, each pertaining to discussion for the different scenes and/or topics, and then incorporated into the generated conversation video. The less comprehensive second member dialogue video from the second community member may be omitted since there would be fewer and/or shorter discussion segments As another example, the user 104 may be watching a particular thematic content event while they are generating a member dialogue video. If the device 112, 402 that is generating the member dialogue video is also presenting the particular thematic content event, or is in communication with another device that is presenting the particular thematic content event, then the identity of that thematic content event is determinable. For example, the title of the thematic content event may be available for the EPG information 442 since the device 112, 402 can identify the presented thematic content event. A program identifier (PID) or other suitable identifier may be available from the EPG information 442 and/or may be available in the metadata of the presented thematic content event. The determined identifier may then be automatically included in the member dialogue video that is communicated to the video community system 100 parsed out from that second member dialogue video. Here, since many discussion segments from the selected first member dialogue video provided by the first community member is used throughout the conversation video, the overall discussion presented by the conversation video will seem more intimate and personal to the viewing user 104. That is, a conversation video presenting discussion segments from a relatively few number of community members and/or other knowledgeable persons will more closely emulates a small intimate discussion group having a conversation about the thematic content event. In such situations, the user 104 is more likely able to develop personal connections with the relatively small number of community members and/or other knowledgeable persons presenting their comments in the conversation video. In contrast, a conversation video presenting discussion segments from a relatively large number of different community members and/or other knowledgeable persons may be more difficult to follow by the viewing user 104 because such a conversation video emulates a large discussion group. Here, the user 104 is less likely able to develop personal connections with such a large number of community members and/or other knowledgeable persons.

Some embodiments of the video community system 100 employ a hierarchical tree structure to identify and select member dialogue videos and/or producer dialogue videos (or discussion portions thereof) from a large number of available member dialogue videos and/or producer dialogue videos (or discussion portions thereof). That is, a hierarchical tree structure is used to progressively narrow the pool of candidates so that more desirable candidates are retained for consideration, and less desirable candidates are eliminated from further consideration.

For example, an embodiment that employs the hierarchical tree structure process may first identify those member dialogue videos and/or producer dialogue videos (or discussion portions thereof) that are associated with the specified thematic content event. Other member dialogue videos and/or producer dialogue videos (or discussion portions thereof) that have not been associated with the specified thematic content event are no longer considered as candidates.

Then, the hierarchical tree structure process may identify member dialogue videos and/or producer dialogue videos (or discussion portions thereof) provided by recognized community experts and/or by other well known, notorious and knowledgeable persons. Here, member dialogue videos from recognized community experts can be anticipated to be more interesting, more informative, and/or more entertaining that member dialogue videos from other community members. Similarly, a producer dialogue video from a famous actor can be anticipated to be more interesting than a producer dialogue video from an unknown actor. Such candidate member dialogue videos and/or producer dialogue videos (or discussion portions thereof) are retained for further consideration. In contrast, candidates from community members who are not recognized experts, and/or from others who are not well known, may be eliminated as candidates for further consideration.

As the number of candidate member dialogue videos and/or producer dialogue videos (or discussion portions thereof) is reduced through each successive iteration performed during the hierarchical tree structure process, more interesting, more informative, and/or more entertaining member dialogue videos and/or producer dialogue videos (or discussion portions thereof) remain as candidates. One or more other tree structure criteria may then be applied to further reduce the number of candidates for consideration. At some point in the hierarchical tree structure process, a manageable number of candidate member dialogue videos and/or producer dialogue videos (or discussion portions thereof) will remain for consideration.

The final selection of candidate member dialogue videos and/or producer dialogue videos (or discussion portions thereof) may be made by the operator of the video community system 100 based on their persona subjective preferences. Or, the final candidates may be identified automatically, such as when the total number of and/or total duration of candidates allocated for the identified scenes and/or topics falls within specified allocations (such as the total number and/or total duration specified for a conversation video).

When a particular scene or topic has multiple member dialogue videos and/or producer dialogue videos (or discussion portions thereof) that have been selected for inclusion in a generated conversation video, the order of presentation of the selected member dialogue videos and/or producer dialogue videos (or discussion portions thereof) may be determined. The final order may be made by the operator of the video community system 100 based on their personal subjective preferences. Or, the final order may be determined automatically, such as when those member dialogue videos and/or producer dialogue videos (or discussion portions thereof) expressing a like for the scene or topic are to be presented before those selected candidates expressing a dislike for the scene or topic.

Some embodiments of the video community system 100 are configured to select portions of the video and/or audio thematic content event for inclusion in a conversation video. For example, when a particular scene is being discussed in a conversation video, the video portion of that scene or a portion thereof, may be included in the generated conversation video. The audio portion of the thematic content event may be omitted or otherwise muted so that the user 104 can listen to the dialogue of the currently presented member dialogue videos and/or producer dialogue videos (or discussion portions thereof). With presentation of selected portions of the thematic content event, the user 104 viewing the conversation video at a later time more readily appreciates the nature of the conversation presented by the conversation video since they may review that scene (or portion thereof) while listening to the audio commentary from community members and/or other knowledgeable persons.

The presentation of video content and audio content in a conversation video may be formatted in a variety of manners. For example, the video portion of the conversation video may present the image of the contributing community member while the audio portion presents their commentary dialogue. Alternatively, or additionally, the video portion of the conversation video may present a particular scene (or portion thereof) while the audio portion presents commentary dialogue of one or more contributing community members. Alternatively, or additionally, an image of the contributing community member may be concurrently presented with the scene (or portion thereof) using a picture over picture format, a picture in picture format, a split screen format, a full screen format, or the like, wherein the presented scene (or portion thereof) is relatively smaller than the view field of the display that presents the image of the contributing community member. Alternatively, images of the current speaker or the like may be relatively smaller than the view field of the display that is presenting the scene.

In an example embodiment, once a draft conversation video has been generated, the draft conversation video may be optionally presented to the operator for review, editing and/or approval. The operator may modify the draft conversation video by adding and/or deleting selected member dialogue videos and/or producer dialogue videos (or discussion portions thereof). Alternatively, or additionally, the operator may choose to add or delete scenes (or portions thereof) from the thematic content event.

Once a particular conversation video has been generated, the conversation video is communicated from the conversation video output interface 506 for storage in the conversation video storage medium 134. For example, if the first thematic content event is selected for generation of a conversation video, the corresponding first modified thematic content event 516 (see MTCE 1 illustrated in FIG. 5) is accessed by the conversation video generator 132. The conversation video that is generated based on the first modified thematic content event is then stored as conversation video 1 (see reference numeral 550). The information for this first stored conversation video further includes at least one identifier that uniquely associated this first conversation video with the first thematic content event.

Later, when the user 104 wishes to access a conversation video associated with a particular thematic content event of interest, a request is generated by the device 112, 402. The request is communicated to the member interface 138. Based on the identity of the thematic content event of interest indicated in the request, the video community system 100 accesses the particular conversation video(s) associated with the identified thematic content event. The accessed conversation video(s) is then communicated back to one or both of the devices 112, 402. The received conversation video(s) may then be presented to the user 104.

In an example embodiment, the user 104 may have to specify the title or other identifier of the thematic content event of interest. For example the user may type in the title of the thematic content event. Alternatively, or additionally, some embodiments may automatically determine the title or identifier of the thematic content event. For example, if the device 112, 402 is currently presenting the thematic content event the title or identifier of the thematic content event may be determined based on the EPG information 442 and/or the metadata information of the currently presented thematic content event.

In some situations, multiple associated conversation videos may be available for a single thematic content event. In an example embodiment, all associated conversation videos are communicated to one or both of the devices 112, 402. A selectable menu or the like (such as an EPG) may be presented to the user 104 that provided descriptive information of each different one of the available conversation videos. The user can then select one or more of the conversation videos for presentation.

In another embodiment, information identifying the plurality of available conversation videos is communicated to one or both of the devices 112, 402. A selectable menu or the like is presented to the user with descriptive information describing characteristics of the different conversation videos. Once the user has selected one or more of the indicated conversation videos of interest, a second communication is returned from one or both of the devices 112, 104 to the video community system 100. The selected one or more conversation videos are then communicated to one or both of the devices 112, 402 for presentation to the user 104.

Alternatively, or additionally, the first request may include supplemental information that describes topics or characteristics of interest that the user 104 is interested in. In this example embodiment, the video community system 100 automatically identifies one or more conversation videos that may be of interest to the requesting user 104 based on the supplemental information in the request. Then, the identified conversation videos may be communicated to one or both of the devices 112, 402. Alternatively, information indicating the identified conversation videos may be communicated to one or both of the devices 112, 402, wherein a second request initiated by the user 104 specifies one or more of the indicated conversation videos that are to be then sent to one or both of the devices 112, 402.

K. Proof Video Generation

Figure 6:
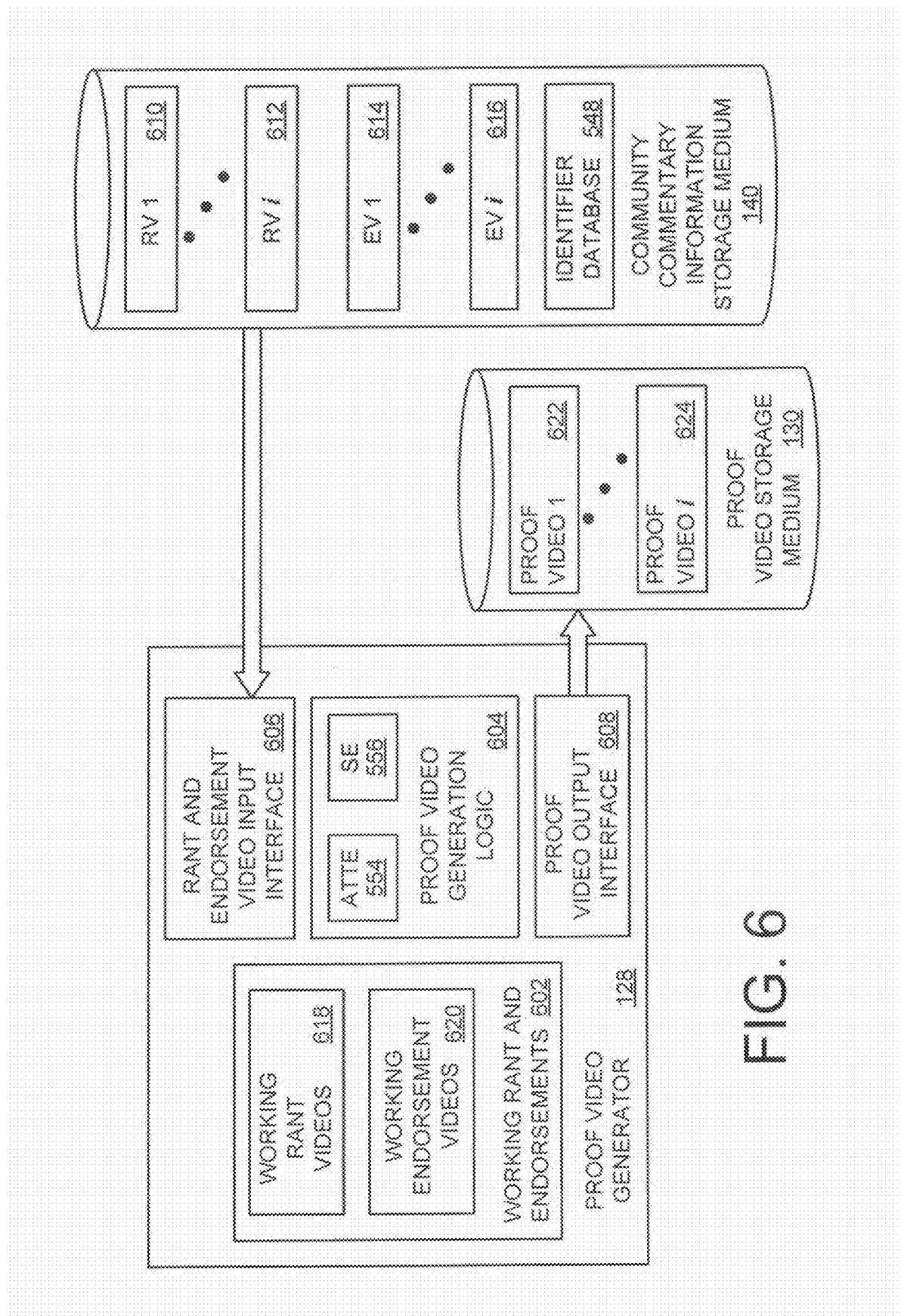
FIG. 6 is a block diagram of the proof video generator, the community commentary information storage medium, and the proof video storage medium.

FIG. 6 is a block diagram of the proof video generator 128, the community commentary information storage medium 140, and the proof video storage medium 130. The proof video generator 128 is configured to generate proof videos based on one or more rant videos received from a community member seeking recognition and/or based on one or more endorsement videos supporting that community member. The proof video generator comprises a working rant and endorsements medium 602, proof video generation logic 604, a rant and endorsement video input interface 606, and a proof video output interface 608

A proof video presents commentary (opinions and views) of a particular community member about a particular thematic content event and/or about a particular genre and/or topic pertaining to the thematic content event. In some instances, the particular community member may have been deemed by the community as being an expert in (based upon affirmation votes and/or denial of affirmation votes previously received from other community members). A suitable icon, text note or the like may be presented in the proof video to indicate that the community member is a recognized expert community member.

The community commentary information storage medium 140 stores a plurality of rant videos, illustrated as the first rant video 610 (illustrated as "RV 1") through a last rant video 612 (illustrated as "RV i"), and a plurality of endorsement videos, illustrated as the first endorsement video 614 (illustrated as "EV 1") through a last endorsement video 616 (illustrated as "EV i"). The community commentary information storage medium 140 further includes, in the identifier database 548 or in another suitable medium, stored identifiers that uniquely identify each one of the stored rant videos and endorsement video. The unique rant video identifier further includes information identifying the community member that the rant video is generated for. Also, the unique endorsement video identifier includes information that identifies the person who generated the endorsement video and the identity of the intended beneficiary community member that the endorsement video is supporting. In alternative embodiments, one or more of the rant videos, endorsement videos, and/or the information in the identifier database 548 may be stored in a distributed fashion using other memory mediums.

In practice, a community member generates a rant video using one of the devices 112, 402. The generated rant video is communicated to the member interface 138. The video community system 100 stores the received rant video into the community commentary information storage medium 140. The rant video further includes information identifying the community member who generated the rant video. The identifying information may be the name of the community member. Alternatively, other identifying information may be used, such as a handle, nickname, or the like, that uniquely identifies the community member who generated the received rant video.

When a single rant video is processed to generate a proof video, the rant video is accessed from the community commentary information storage medium 140. The accessed rant video is then stored into the working rants and endorsements 602 as a working rant video 618.

In some situations, the community member may have generated a plurality of different rant videos that are stored in the community commentary information storage medium 140. Some of the multiple rant videos may be indented to further bolster the community member's arguments that they should become a recognized expert in a particular thematic content event and/or about a particular genre and/or topic pertaining to the thematic content event. Alternatively, the multiple rant videos may be directed to different particular thematic content events and/or about different particular genre and/or topic pertaining to other thematic content events or other topics.

When a single proof video is generated based on a plurality of rant videos, a particular thematic content event and/or a particular genre and/or topic pertaining to the thematic content event is specified. In an example embodiment, the specification is made by the operator of the video community system 100. Alternatively, the ATTE 554 may generate text from the dialogue of the rant video, and the search engine 556 may then identify and specify the particular thematic content event and/or a particular genre and/or topic pertaining to the thematic content event being discussed in the rant video.

Once the particular thematic content event and/or the particular genre and/or topic pertaining to the thematic content event has been specified, a plurality of rant video from that community member having discussions that pertaining to the specification are accessed from the community commentary information storage medium 140 and are saved into the working rant videos 618.

Based on the identity of the community member who generated the received rant video, the search engine 556 searches the plurality of endorsement videos (EV1 through EVi) to find matches with the identified beneficiary community member. If and when a match between the identity of the community member who generated the received rant video and the identified beneficiary community member of an endorsement video is found, the associated endorsement video is accessed and is then stored into the working endorsement videos 620.

At this juncture in the process of generating a proof video for a particular community member, one or more rant videos pertaining to a specified thematic content event and/or a specified genre and/or topic pertaining to the thematic content event have been accessed and stored. Also, any identified endorsement videos for that community member have been accessed and stored.

Then, the proof video generation logic 604 begins the process of generating the proof video from the stored rant videos and the stored endorsement videos. The process of generating a proof video, in some instances, may be a relatively simple process. For example, the proof video may be generated using a single rant video and no endorsement videos. Here, the rant video is incorporated into the proof video with little or no processing of the single rant video. The proof video generation logic 604 may only need to add identifying information of the community member who generated the received rant video, and/or may need to format the proof video for a variety of presentation devices 112, 402 that might be used to view the generated proof video.

In another example situation, a single rant video and one or more endorsement videos may be used to generate a proof video. Accordingly, when a single rant video is processed to generate a proof video, the rant video is accessed from the community commentary information storage medium 140. The accessed rant video is then stored into the working rants and endorsements 602 as a working rant video 618 must determine how to combine the one or more endorsement videos with the single rant video to produce a cohesive presentation of the arguments that the community member should become a recognized expert in a particular thematic content event and/or a particular genre and/or topic pertaining to the thematic content event.

The audio portion of the accessed rant video is converted into text by the ATTE 554. Then, similar to the parsing of member dialogue videos, the rant video is parsed into portions by the search engine 556. Each parsed portion of the rant video preferably presents a single argument on behalf of the community member. That is, each parsed rant video portion preferably includes a single hypothesis statement and includes supporting reasoning and/or supporting facts relating to the hypothesis statement. An example hypothesis statement and supporting reasoning and/or supporting facts may be: "I, Davey Jones, should be a recognized expert in the thematic content event ABC because this is my favorite thematic content event of all time, because I have seen this particular thematic content event multiple times, and because I have authored five articles about this particular thematic content event."

The one or more endorsement videos are similarly analyzed, and parsed out into different endorsement video portion if the individual generating the endorsement video is presenting multiple different arguments in support of the beneficiary community member. For example, famous actor Tom Smith might state: "I have read and agree with the five articles written by Davey Jones, and they are the best I have ever seen for this particular thematic content event ABC." In an example embodiment, each endorsement video (or a portion thereof) is associated with one of the presented arguments (the hypothesis statement and the supporting reasoning and/or supporting facts).

Then, the search engine 556 analyzes the one or more endorsement videos (or portions thereof) to determine where each of the endorsement videos (or portions thereof) should be added into the processed rant video. In an example embodiment, the associated endorsement video (or portion thereof) is placed into the proof video immediately after the conclusion of the presentation of the associated argument made by the community member who generated the rant video. However, the search engine 556 may combine the portions of the rant video and the endorsement videos (or portions thereof) in any suitable order that results in a pleasing, entertaining and convincing proof video.

In some instances, a plurality of rant videos may be submitted by a community member that relate to the same particular thematic content event and/or a particular genre and/or topic pertaining to the thematic content event. That is, the community member may decide to add additional arguments and/or revise previously presented arguments. In an example embodiment, a newer received rant video simply replaces older received rant videos. Thus, the newer rant video is used to generate a new proof video that replaces the proof video that was previously generated based on the older rant video.

However, in other embodiments, multiple rant videos are processed together, much like a plurality of different member dialogue videos, to generate a single proof video. The ATTE 554 generates text for each of the multiple rant videos. The search engine 556 parses out each of the multiple rant videos into portions. Then, the portions are analyzed so that related portions (portions have the same or similar arguments therein) can be grouped together for presentation in the proof video. Also, the related endorsement videos (or portions thereof) may be grouped with the grouped rant video portions. Then, the proof video is generated by the proof video generator.

In some endorsement videos, the person generating the endorsement video may define a set of criteria, attributes or the like. If a particular community member satisfies all of, selected one, or a predefined portion of the predefined criteria, attributes or the like, that community member automatically qualifies as a beneficiary of the endorsement video. During generation of a proof video, the qualifications and/or characteristics of the member that is submitting the rant video is compares with the predefined criteria, attributes or the like associated with the endorsement video. If that community member automatically qualifies as a beneficiary, then that particular endorsement video may optionally be included in the proof video.

The generated proof videos are communicated out from the proof video output interface 608 for storage into the proof video storage medium 130. Since the community has a large number of community members a plurality of different proof videos will likely have been generated for a plurality of different community members. The plurality of different proof videos is represent by a first proof video 1 (indicated by reference numeral 622) through a last proof video i (indicated by the reference numeral 624).

On occasion, the user 104 may be interested in viewing generated proof videos that have been generated for a community member of interest. For example, the user 104 may have recently viewed a conversation video for a particular thematic content event, wherein portions of the conversation video were based on one or more member dialogue videos from that particular community member that is now of interest to the user 104. In some embodiments, the conversation video may even identify that particular community member as being a recognized expert within the community.

In such situations, the user 104 may wish to view any proof videos, if they exist, for the community member of interest that has provided their commentary that has been incorporated into the conversation video. The user 104, using one or both of their devices 112, 402, specifies the identity of the community member of interest and indicates that they would like access to any proof videos for that community member. The devices 112, 402 communicate a request for the proof videos to the video community system 100. In an example embodiment, the request includes the identity of the community member of interest. The video community system 100 uses the identifier of the community member to search the plurality of proof videos stored in the proof video storage medium 130. If a proof video has been generated for that particular community member identified in the request, then that associated proof video can be communicated to one or both of the devices 112, 402 for presentation to the user 104. If a plurality of proof videos are available, a selection menu or the like may be presented to the user so that the user may select one of the multiple proof videos for presentation. An example embodiments communicates all available proof videos to one or both of the devices 112, 402. Other embodiments first communicate information describing each of the multiple proof vides. After user selection of one (or more) of the multiple proof videos, the a second request is communicated to the video community system 100 that identifies the selected proof video(s), which is then communicated to one or both of the devices 112, 402.

Proof videos also include a mechanism for accepting an affirmation vote or a denial of affirmation vote from the user 104, preferable after the user 104 has completed viewing of the proof video. In an example embodiment, a pup-up window or the like is presented to the user 104 that is configured to receive one of the affirmation vote or the denial of affirmation vote. Alternatively, or additionally, one or more of the controllers 452 of the remote control 450 may be configured to permit the user to specify their vote.

Once the user 104 has made either an affirmation vote or a denial of affirmation vote, the vote is communicated from one or both of the devices 112, 402 to the video community system 100. The received vote is then associated with the particular proof video and/or the particular member who generated the rant video(s) used to make the proof video. The associated vote is then stored. In an example embodiment, the vote and the identity of the user 104 are stored in the identifier database 548 (or in another suitable medium). Such embodiment may limit the user 104 to a single vote. Thus, if a subsequent vote is received from the same user 104 for the previously voted-on proof video, that vote can be rejected, or may be used to replace the previous vote (thus permitting the user 104 to change their vote).

In other embodiments, a counter or the like tracks the number of affirmation votes and the number of denial of affirmation votes. When a vote is received from the user 104, the counter may be indexed to the next number. For example, if the proof video has 1000 affirmation votes and 50 denial of affirmation votes, and if the received vote from the user 104 was an affirmation vote, then the new total of votes would be 1001 affirmation votes and 50 denial of affirmation votes.

In some embodiments, an incentive or the like may be used to incentivize the community members to view and vote on proof videos. For example, each received vote from a particular community member may award that community member a reward point or the like. After a sufficient number of reward points are accumulated by that community member, they may be awarded a gift or may be permitted to choose among a plurality of available gifts. In an example embodiment, a gift might be a free movie viewing certificate so that the community member may select a movie of interest from an on-demand system for their viewing enjoyment. Other example gifts may include billing credits that reduce service fees for that community member.

L. Modification of Conversation Videos

The conversation videos available for viewing by community members may be changed, modified, or re-created from time to time. It is appreciated that commentary within the community is likely to evolve over time as more and more community members view a particular thematic content event and then submit their member dialogue videos. For example, when a particular thematic content event is first released to the public, especially if the release is a preview and/or is an offering by a relatively small and/or unknown independent producer, relatively few community members may have viewed the thematic content event and provided their member dialogue videos expressing their viewpoints about the recently released thematic content event. If the thematic content event is very entertaining and/or controversial, a number of new member dialogue videos may be generated over a particularly short span of time. Thus, a previously generated conversation video may become quickly outdated.

Embodiments of the video community system 100 are configured to periodically update and/or generate new conversation videos as the available pool of candidate member dialogue videos and/or producer dialogue videos increases. An example embodiment is configured to periodically update and/or generate new conversation videos based on a predefined duration. Alternatively, or additionally, embodiments may be configured to update and/or generate new conversation videos after a new number of member dialogue videos and/or producer dialogue videos are received by the video community system 100.

In an example embodiment, an entirely new conversation video is generated upon the most recently available pool of candidate member dialogue videos and/or producer dialogue videos. The newly generated conversation video is stored into the conversation video storage medium 134, and thereby replaces the previously generated conversation video. (However, some embodiments may archive the previously generated conversation videos for administrative purposes, but prevent access to community members.)

Alternatively, or additionally, embodiments may be configured to retrieve a previously generated conversation video and the newly submitted member dialogue videos and/or producer dialogue videos. The newly received member dialogue videos and/or producer dialogue videos are used to replace selected, and presumably less interesting or less current, member dialogue videos and/or producer dialogue videos (or discussion portions thereof) that were used to generate the previous conversation video. Some of the new member dialogue videos and/or producer dialogue videos (or discussion portions thereof) may be added into the newly generated conversation video, thus resulting in a longer duration conversation video.

M. Example Conversation and Proof Videos

Figure 7:
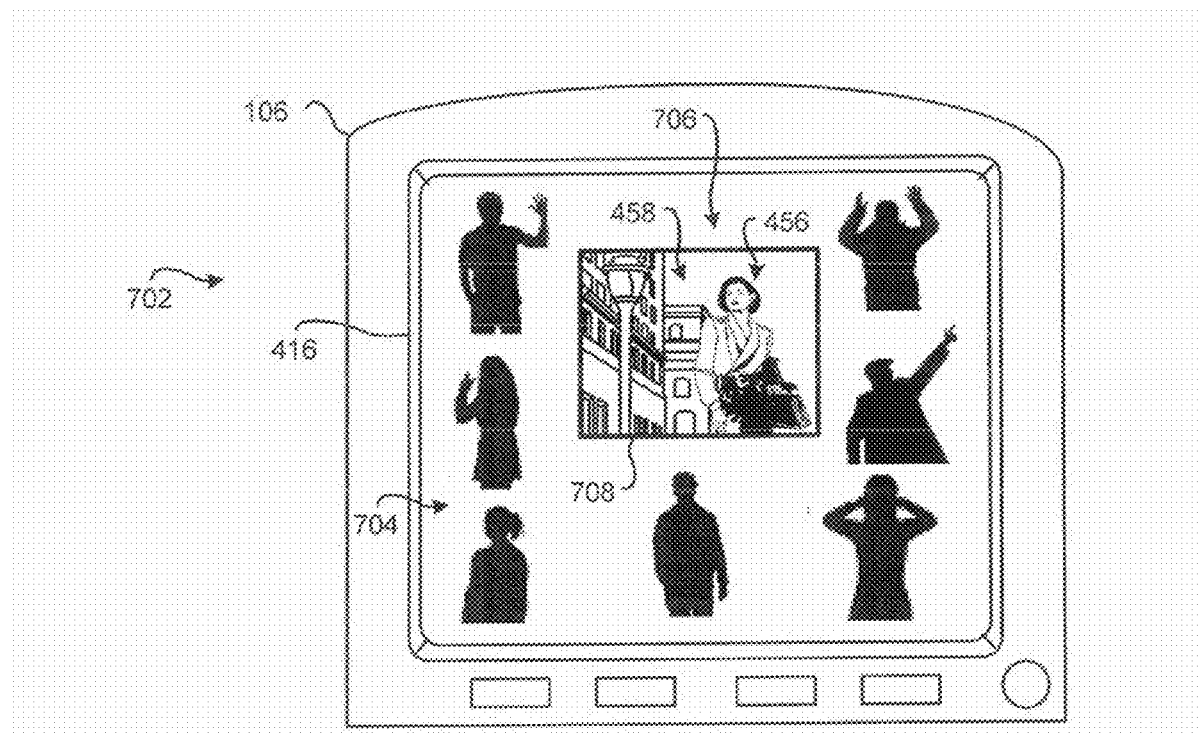
FIG. 7 illustrates a conceptual snapshot of an example conversation video.

FIG. 7 illustrates a conceptual snapshot of an example conversation video 702. The example conversation video 702 includes a plurality of seven community members 704 (or other knowledgeable individuals providing producer dialogue videos) that are providing commentary about the subject member dialogue video, here showing an image of a scene 706 of the subject thematic content event with the actress 456 and the plurality of buildings 458 (see also FIG. 4). It if appreciated that the still images of the community members 704 may be a video of that particular community member 704 providing commentary in the conversation video. Further, at any given moment in the conversation video, one of the community members 704 is providing audio commentary that the viewing user 104 (not shown) is listening to. At times, multiple community members 704 may be providing their audio commentary concurrently. For example, if two or more of the community members 704 are expressing opposing viewpoints, the conversation video may present, as least for some brief durations, overlapping commentary from multiple community members 704 so as to emulate a lively ongoing dispute or argument between the two or more community members 704.

In the example conversation video 702, an image of a selected portion of a scene from the subject thematic content event is illustrated in a viewing pane 708. The illustrated scene portion is presumably part of the scene or portion of the thematic content event that is currently being discussed by the community members 704. In other embodiments, or during other times of this example conversation video 702, the scene 706 may be omitted. Alternatively, the scene 706 may be of a different size, and/or may be shown in another location on the display 416. In some instances, embodiment may present multiple viewing panes with different scenes therein.

In the various embodiments, any suitable number of community members 704 may be concurrently shown on the conversation video 702. Actively speaking community members 704 may be indicated by their movement, which non-talking community members 704 may be still. Alternatively, actively talking community members 704 may be indicated using other indicators, such as a brighter coloring, a pointer, a box, or the like. Alternatively, or additionally, non-talking community members 704 may be represented using a blackened outline or shaded outline of the particular community member 704, and then transition to a photographic video image when they begin to talk. In some embodiments, a small image may be used for currently non-talking community members 704, while speaking community members 704 may transition to an enlarged image while they are talking.

Figure 8:
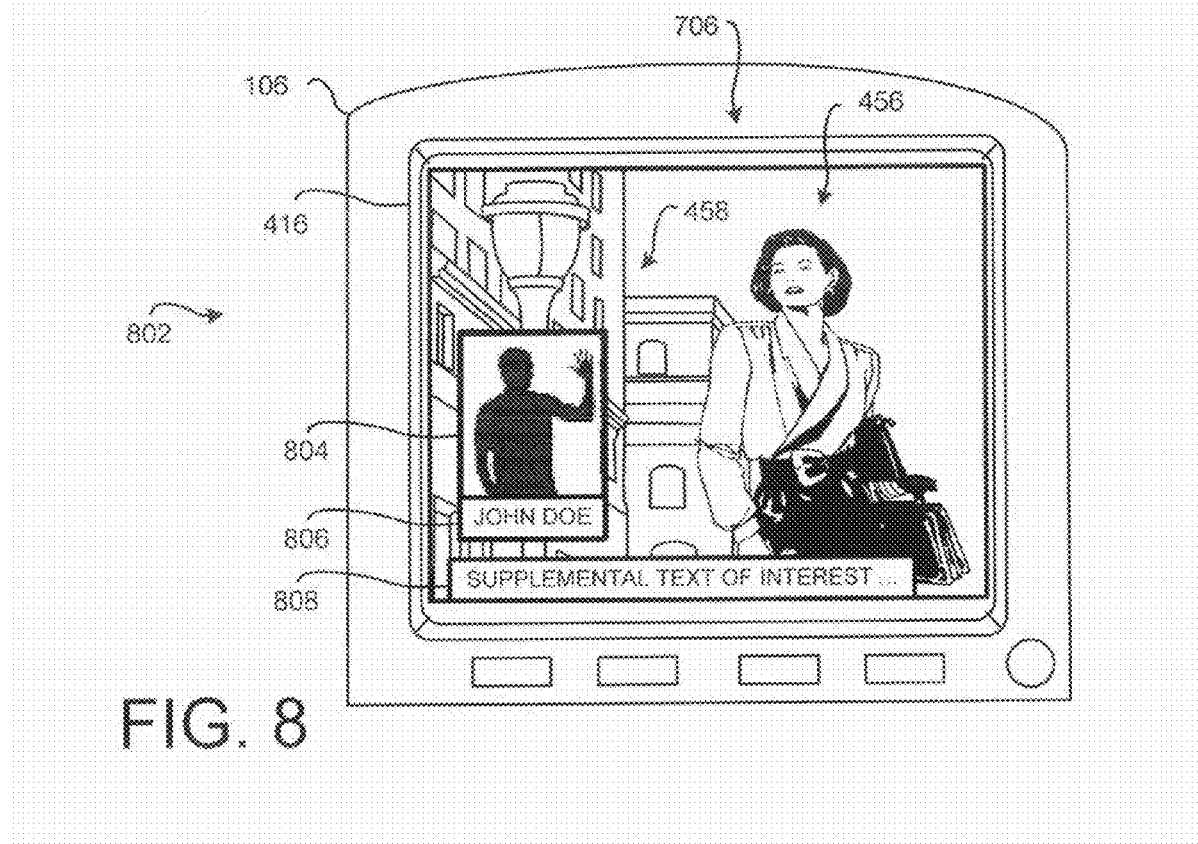
FIG. 8 illustrates a conceptual snapshot of another example conversation video.

FIG. 8 illustrates a conceptual snapshot of another example conversation video 802. Here, a view pane 804 with a video image of a currently speaking community member is shown over the field that is presenting the currently discussed scene 706 of the subject thematic content event. The view pane 804 may be shown at any selected location on the display 416, and may be of any suitable size. Location and/or size of the view pane 804 may be modified as the conversation video progresses. In an example embodiment, when the currently illustrated community member is finished talking, their image may be faded and replaced with a video image of a next speaking community member. Alternatively, or additionally, the next speaking community member may be shown in a new view pane.

In some embodiments, a textual identifier 806 may be shown as part of the view pane 804, or in another suitable location on the display 416, to indicate the identity of the currently speaking community member. Accordingly, the viewing user 104 may better appreciate who is participating in the conversation video, and thereby may develop a more personal connection with the community members 704.

Alternatively, or additionally, a scrolling text banner 808 or the like may be used to indicate supplemental information of interest. The banner 808 may present any text of interest and/or may be located at any suitable place on the display 416.

Figure 9:
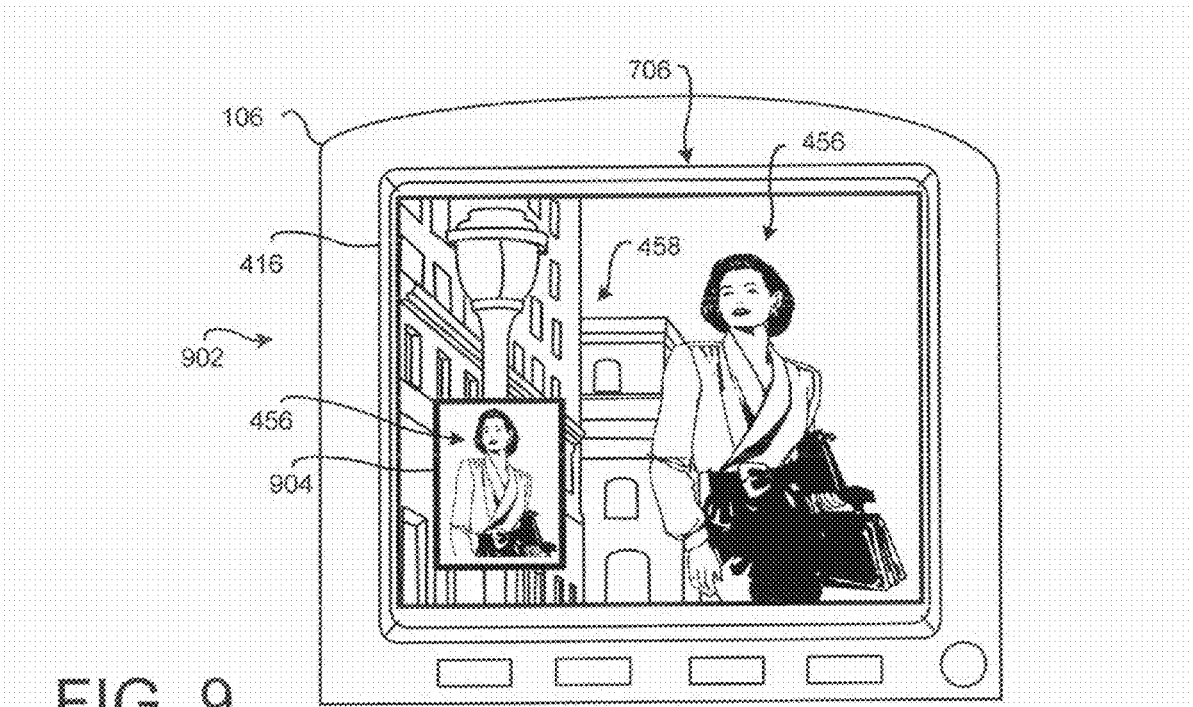
FIG. 9 illustrates a conceptual snapshot of another example conversation video.

FIG. 9 illustrates a conceptual snapshot of another example conversation video 902. Here, a view pane 904 with a video image of the currently speaking actress 456 is shown over the field that is presenting the currently discussed scene 706 of the subject thematic content event. Alternatively, or additionally, one or more of the example features illustrated in FIG. 8 may be included in this example conversation video 902.

Figure 10:
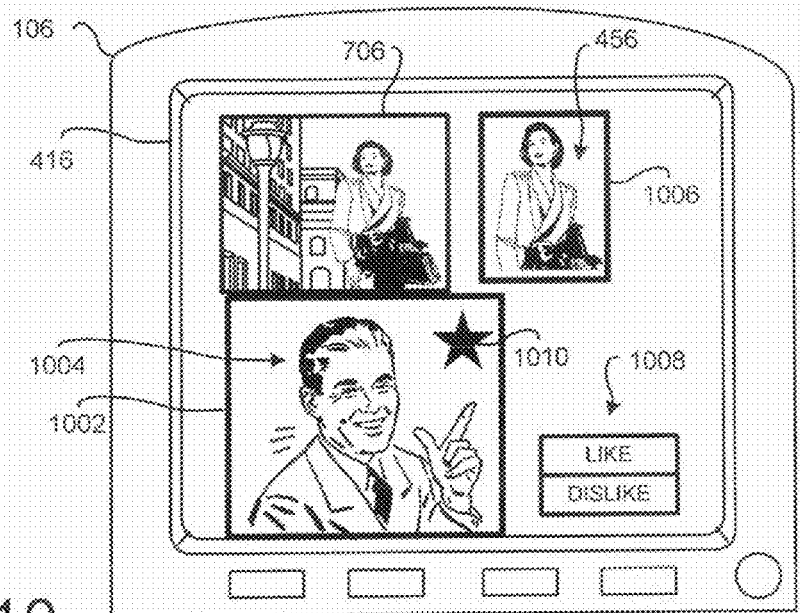
FIG. 10 illustrates a conceptual snapshot of an example proof video.

FIG. 10 illustrates a conceptual snapshot of an example proof video. Here, a view pane 1002 with a video image 1004 of the currently speaking community member who is presenting their personal views and opinions about subject thematic content event is shown. The video of the speaking member was previously submitted as a rant video. The proof video 1002 is also optionally presenting a currently discussed scene 706 of the subject thematic content event.

Additionally, an endorsement video 1006 of the actress 456 may be shown to indicate that the speaking community member 1004 is endorsed by the actress 456. In an example embodiment, an image of the actress 456 optionally remains presented during the proof video. At some point during presentation of the proof video 1002, the video clip of the actress as she is discussion the basis of her endorsement is presented.

A viewing member 104 who is viewing the proof video 1002 may like or may dislike the views and/or opinions of the speaking community member 1004. A voting pop-up pane 1008 is illustrated. The user 104 may select the like portion of the voting pop-up pane 1008, thus submitting an affirmation vote for the speaking community member 1004. Alternatively, the user 104 may select the dislike portion of the voting pop-up pane 1008, thus submitting a denial of affirmation vote. Other embodiments may graphically indicate to the user that they may vote for affirmation using any suitable graphic.

Optionally, a graphical icon 1010 or the like may be presented to indicate that the speaking community member 1004 has already achieved status as a recognized expert in the community. Any suitable icon may be used. Alternatively, or additionally, one or more characteristics of the view pane may be altered to indicate the recognized expert status of the speaking community member 1004. For example, but not limited to, a colored background shading may be used and/or a bolding or coloring of a line enclosing the view pane 1002 may be used.

N. Virtual DVD Furniture System

Today, due to geographical distance between people, community members are likely to be less engaged with their family and/or friends when discussing TV, movies, and other thematic media content events. Furthermore, due to the digital revolution, people are losing their ability to display their movie (thematic content events) watching accomplishments. For example, a community member may display their physical video disk (DVD) collection on a shelf or other furniture object in their living room. However, with physical DVDs becoming increasingly rare (since digital versions of thematic media content event are replacing physical DVDs), a community member is less able to share their favorite movies with friends and family. A day can be envisioned when physical DVDs are entirely obsolete, and therefore, it would be impossible for a community member to create a physical DVD "collection" to even show their friends and family.

Figure 11:
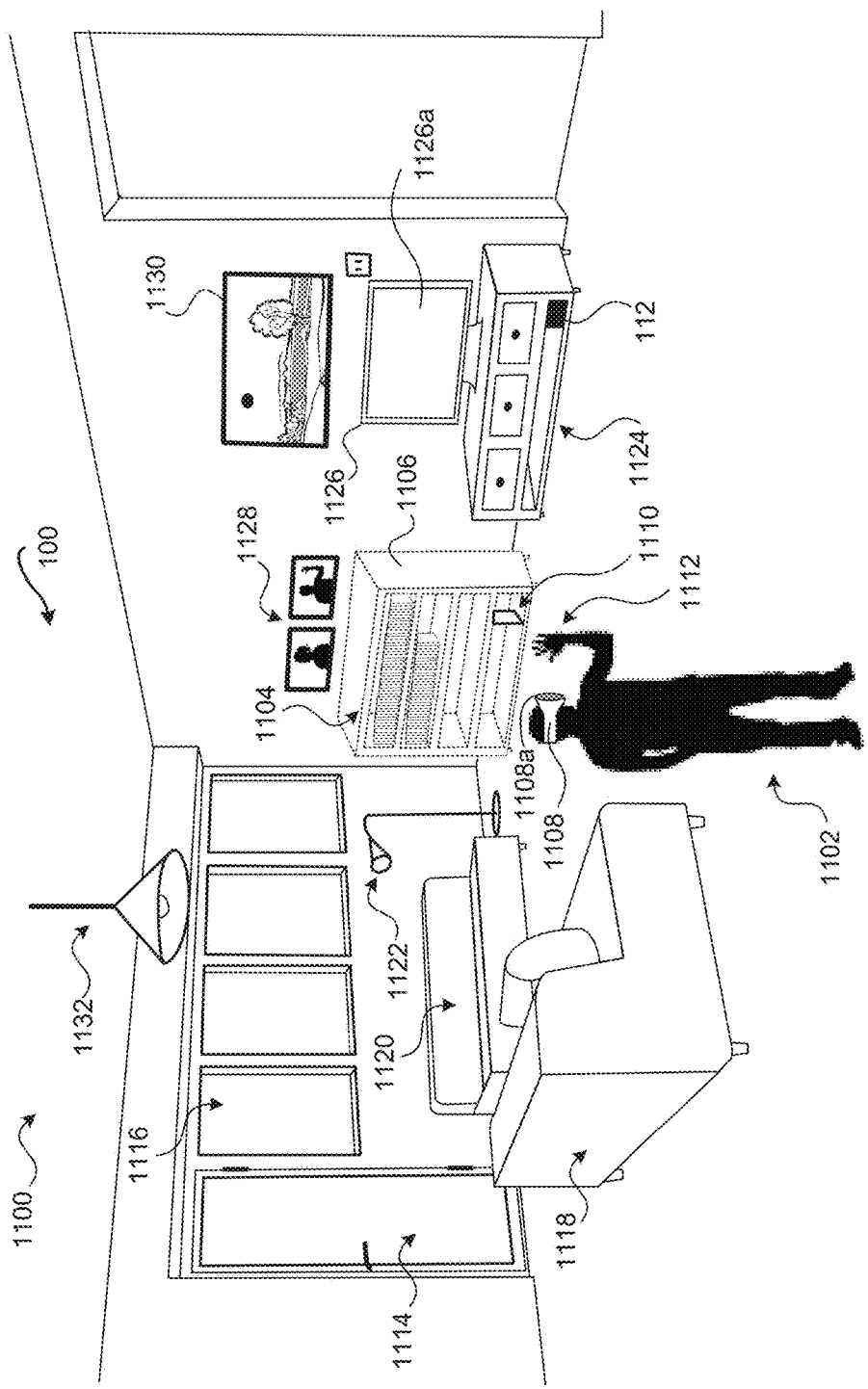
FIG. 11 conceptually illustrates a physical environment of an owner.

FIG. 11 conceptually illustrates a physical environment 1100 of an owner 1102. Examples of the owner's physical environment 1100 include, but are not limited to, an office, a living room, a bedroom, or the like. In addition to other uses, the physical environment 1100 may be used by the owner 1102 to set the stage for virtual display their virtual DVD collection 1104 using an embodiment of the video community system 100. The virtual environment created by embodiments of the video community system 100 emulate the physical environment 1100 where a physical DVD collection might otherwise be displayed by the owner 1102.

Embodiments of the video community system 100 solve the above-described problem of displaying a physical DVD collection by creating a "virtual" world wherein community members (interchangeably referred to herein as an "owner 1102") are able to create their own virtual DVD collection 1104 that is graphically represented in a virtual world. Here, the virtual DVD collection 1104 is graphically depicted to the owner 1102 (or a visiting guest) as being stored on a virtual furniture piece, referred to herein as the virtual bookshelf case 1106.

In a non-limiting example embodiment, the owner 1102 (or a visiting guest) is able to view their virtual DVD collection 1104 using a head mounted device 1108 that is configured to present a three dimensional (3D) virtual image of the virtual bookshelf case 1106 to the owner 1102 that is presented on a display 1108a of the head mounted display (HMD) 1108. The owner 1102 (or the visiting guest), using a gesture control technology that is synchronized with an image of the virtual DVD collection 1104 on the virtual bookshelf case 1106 presented by the HMD 1108, is able to virtually manipulate an individual virtual DVD 1110 with their hand 1112 by coordinating the position of their hand with respect to the image of the virtual DVD collection 1104, and in particular the individual virtual DVDs 1110, presented on the display 1108a. Here, the owner 1102 (or the visiting guest) is able to virtually manipulate (grasp, move, inspect, etc.) an individual virtual DVD 1110 stored on the virtual bookshelf case 1106.

In practice, the virtual DVD collection 1104 is represented or graphically depicted as residing in a virtual bookshelf case 1106 (denoted with dashed lines in FIG. 11 to indicate that the virtual bookshelf case 1106 is not physically present). Here, the virtual bookshelf case 1106 is an artificial graphical object that can be rendered on the display 1108a based on representative electronic data. Here, the data is used to graphically depict the virtual bookshelf case 1106, which is presentable on the display 1108a, or on another a display, to the owner 1102, a guest, or another individual. Similarly, the virtual DVD collection 1104, and the individual virtual DVDs 1110, are a plurality of artificial graphical objects corresponding to electronic data, wherein the virtual DVD collection 1104 and the plurality of virtual DVDs 1110 are presentable on the display.

Once the owner 1102 has created their own virtual DVD collection 1104 and placed the individual virtual DVDs 1110 onto their virtual bookshelf case 1106, the owner 1102 may then also show their virtual DVD collection 1104 to other community members (interchangeably referred to herein as a "guest"). Here, the guest may operate their own HMD 1108 to view the virtual DVD collection 1104 of the owner

1102. That is, the guest may view (see a graphical representation on their display) the owner's virtual bookshelf case 1106 where the collection of individual virtual DVDs 1110 are displayed thereon.

The visiting guest may be located remotely from the physical environment 1100 of the owner 1102. For example, the guest may be in a different town, city, or even across the world because the virtual DVD collection 1104 of the owner 1102 can be graphically presented to the guest on any suitable display.

Further, when the guest is viewing the owner's virtual DVD collection 1104 on the virtual bookshelf case 1106, a preferred embodiment optionally is configured to generate and include a background image of the owner's environment 1100, or a portion thereof, behind the presented virtual bookshelf case 1106 when the guest is visiting (viewing) the owner's virtual environment.

Thus, when a guest is "invited" to view the owner's virtual DVD collection 1104, a presentation means is provided wherein the guest perceives that they are entering into a virtual world. Here, the virtual world is defined as a virtual representation of the owner's physical environment 1100 with the owner's virtual DVD collection 1104. The guest may optionally manipulate (grasp, move, inspect, etc.) an individual virtual DVD 1110 stored on the virtual bookshelf case 1106 to learn about that particular thematic media content event and/or to learn about the owner's interactions in the video community system 100 pertaining to that particular thematic media content event.

To conceptually illustrate an example user's physical environment 1100, a representation of a living room or media room is illustrated in FIG. 11. The example physical environment 1100 has a door 1114 and windows 1116 to the outside environment. A first couch 1118, a second couch 1120, a floor lamp 1122, a media console 1124 with a TV 1126 thereon (having a display 1126a) are located about the physical environment 1100. Personal pictures 1128 and a painting 1130 are illustrated as hanging on a wall of the physical environment 1100. A ceiling lamp 1132 hangs from the ceiling of the physical environment 1100. These objects are generally referred to herein as background objects.

Any suitable HMD 1108 device may be used by the owner 1102. The HMD 1108 includes a display 1108a wherein generated virtual reality images are presented to the owner 1102. In an example embodiment, the virtual reality images are generated by a media device 112 and are then communicated to the HMD 1108. In another embodiment, the HMD 1108 may be itself be configured to receive virtual reality image information from the video community system 100, and then generate the presented virtual reality images on the display 1108a of the HMD 1108. Any suitable HMD 1108 may be used with embodiments of the video community system 100.

In some embodiments, the display 1108a of the HMD 1108 is opaque (not transparent or partially transparent). Accordingly, the owner 1102 views only any presented virtual reality images. The owner 1102 is not able to see background objects in the physical environment 1100.

Alternatively, or additionally, the display 1108a of the HMD 1108 can be partially transparent such that the owner 1102 can see a virtual reality image superimposed over some or all of the background objects of the physical environment 1100. In such an embodiment, the owner 1102 is able to perceive the relative location of their virtual bookshelf case 1106 relative to their position and/or the background objects in the physical environment 1100.

In such an embodiment, location information of the HMD 1108, and orientation information defining a viewpoint or angle of the user's current viewing, may be determined by components of the HMD 1108. The location of the HMD 1108 is the physical location in the physical environment 1100, and may be determined using any suitable location coordinate system. Orientation of the HMD 1108 corresponds the particular location that the owner 1102 is currently looking towards, and may be determined using any suitable angle based coordinate system. Further, orientation information may be determined for the HMD 1108 in a horizontal plane and/or a vertical plane.

Locations of the various background objects in 3D space with respect to the location of the HMD 1108 may be also computed or determined. The location information for the background objects and the respective location information of the HMD 1108 may be correlated with each other such that relative locations are determined with respect to each other (the various physical objects and the HMD 1108). Then, the location information can be used such that virtual reality image data can be defined based on the determinable current location of the HMD 1108 and the background objects in the physical environment 1100.

For example, during the initial setup of the virtual bookshelf case 1106, embodiments may have determined the relative location of the couch 1120 and the media console 1124 with the TV 1126 (based on the determined relative location of the owner 1102 who is viewing the physical environment 1100 using the HMD 1108). During setup, the owner 1102 may specify that the desired location of their virtual bookshelf case 1106 is to be positioned (located and oriented) between the couch 1120 and the media console 1124 with the TV 1126. Here, the owner 1102 is able to virtually manipulate (grasp, move, relocate, reorient, etc.) the virtual bookshelf case 1106 into the desired position (location) in the physical environment 1100. Once the owner 1102 is satisfied with the "position" of their virtual bookshelf case 1106 in the physical environment 1100, the virtual location of the virtual bookshelf case 1106 (relative to other background objects in the physical environment 1100) is saved. Then, when the owner 1102 later views their virtual bookshelf case 1106, the virtual image of the virtual bookshelf case 1106 can be presented in the previously defined location in the physical environment 1100.

In an example embodiment, an image capture device (a still image camera and/or a video image camera) is located on, or is a part of, the HMD 1108. The image capture device (not shown) is configured to capture one or more still images, or a video, of the physical environment 1100 and the background objects. Captured image information is then provided to the video community system 100 for later presentation to the owner 1102 and/or a visiting guest (who is located remotely from the owner's physical environment 1100). Preferably, the capture image information is 3D image information. In an example embodiment, the 3D image information covers the entire 360 horizontal and vertical range of the area of the physical environment 1100. Alternatively, or additionally, a separate still or video camera (not shown) may be used to capture the image data representing the physical environment 1100. Accordingly, in an example embodiment, image data corresponding to a sphere is captured. The viewing user 1102 or a guest is able to view, using their HMD 1108, an image corresponding to the entirety of the physical environment 1100. In other situations, a single image or a panoramic image may be used to represent a portion of the physical environment 1100.

Figure 12:
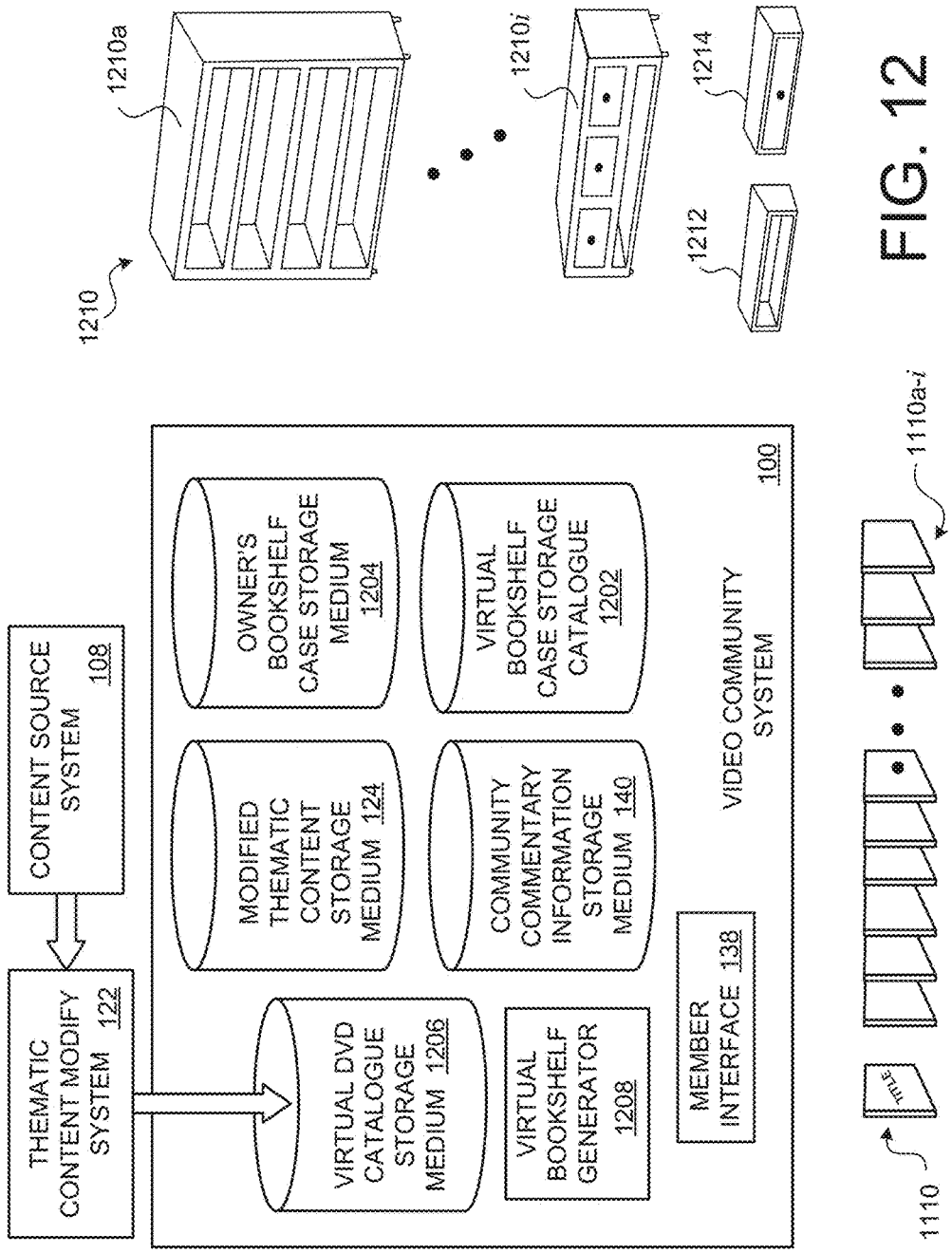
FIG. 12 is a block diagram of selected components of the video community system that are used to generate a virtual world that includes the virtual bookshelf case with the user's virtual DVD collection of FIG. 11.

FIG. 12 is a block diagram of selected components of the video community system 100 that are used to generate a virtual world that includes the virtual bookshelf case 1106 with the user's virtual DVD collection 1104 of FIG. 11. In addition to the components described hereinabove, the video community system 100 further includes a virtual bookshelf case catalogue 1202, an owner's bookshelf case storage medium 1204, a virtual DVD catalogue storage medium 1206, and a virtual bookshelf case generator 1208.

To initialize generation of their own virtual DVD collection 1104, the owner 1102 begins by establishing a communication link from their HMD 1108 (or another electronic device) to the video community system 100 via the member interface 138. The owner 1102 initiates a setup mode of operation. The owner 1102 is then visually presented a plurality of different available virtual bookshelf case templates 1210. Each of the virtual bookshelf case templates 1210 is generated from data that corresponds to a shell, template, or the like, that is used to create a graphical image of a selectable virtual bookshelf case template 1210. That is, the virtual bookshelf case data is a template of data that is used to render a virtual image, preferably in 3D, of the various available virtual bookshelf case templates 1210a-i on the display 1108a of the owner's HMD 1108. Alternatively, the various available virtual bookshelf case templates 1210a-i may be presented on another display, such as the display 1126a of the TV 1126 (FIG. 11).

A suitable navigation graphical user interface (not shown) is presented to the owner 1102 on the display of their HMD 1108. Using hand gestures, the gesture control technology determines movements of the owner's hand 1112. The owner uses hand gestures to select one of virtual bookshelf case templates 1210a-i that the user would like to use for virtually storing their virtual DVD collection 1104. For example, the owner 1102 may select a particular one of the virtual bookshelf case templates 1210a-i by grasping, pointing at, touching, or the like the particular virtual bookshelf case templates 1210 of interest.

For example, the virtual bookshelf case template 1210a substantially resembles the virtual bookshelf case 1106 used by the owner 1102 (FIG. 11). Accordingly, in the conceptual example used herein, the owner 1102 is presumably selecting the virtual bookshelf case template 1210a.

The plurality of virtual bookshelf case templates 1210 are stored in the virtual bookshelf case catalogue 1202. Any suitable storage medium may be used, and/or may be located at any suitable location. Graphic designers (not shown) or other individuals may manage the creation, storage, and publication of the plurality of virtual bookshelf case templates 1210 stored in the virtual bookshelf case catalogue 1202. Any suitable number of virtual bookshelf case templates 1210 may be generated and stored in the virtual bookshelf case catalogue 1202. Different sizes, shapes, configurations, and/or numbers of virtual DVD storage shelves may be used in the various virtual bookshelf case templates 1210a-i. Each virtual bookshelf case template 1210 may have unique attributes, such as s style, carvings, decorations, paint or stain colors, wood grains (if simulating wood construction), or the like. Groupings of virtual bookshelf case templates 1210 may be defined, wherein the owner 1102 first specifies an attribute such that a particular group of virtual bookshelf case templates 1210 are presented to the owner 1102 for their consideration. Accordingly, hundreds or even thousands of different selectable virtual bookshelf case templates 1210 may be stored in the virtual bookshelf case catalogue 1202.

Once the owner 1102 has navigated to and selected one of the virtual bookshelf case templates 1210 from the virtual bookshelf case catalogue 1202, the owner 1102 may further optionally customize that virtual bookshelf case template 1210 in a manner that results in an owner's virtual bookshelf case 1106 that is better suited to their particular needs. Height and/or width of a selected virtual bookshelf case template 1210 may be changed (increased or decreased). The owner 1102 is able to virtually manipulate (grasp, move, inspect, etc.) an individual virtual bookshelf case template 1210. For example, the user may grasp, touch or otherwise indicate the top of the viewed virtual bookshelf case template 1210, and then reposition their hand 1112 to increase or decrease the height of the virtual bookshelf case template 1210. Similarly, the owner 1102 may increase or decrease the width or depth of the virtual bookshelf case 1106.

Additional shelves 1212 may be added to the virtual bookshelf case template 1210 by the owner 1102. Or, existing shelves of the virtual bookshelf case template 1210 removed. Storage cabinets 1214, drawers, or the like can be added to a virtual bookshelf case template 1210. The owner 1102 is able to virtually manipulate (grasp, move, inspect, etc.) the shelves 1212 and/or storage cabinets 1214. Accordingly, the owner 1102 is able to place the shelves 1212 and/or storage cabinets 1214 into on the virtual bookshelf case template 1210, to locate the shelves 1212 and/or storage cabinets 1214 in a desired position in the virtual bookshelf case template 1210, and/or to define a desired size of the shelves 1212 and/or storage cabinets 1214. For example, the owner 1102 might select the virtual bookshelf case template 1210a, increase its height, and then add a plurality of additional shelves 1212 and/or storage cabinets 1214.

Virtual objects can be placed into the storage cabinets 1214 to represent objects that are not immediately viewable by a guest when visiting the owner's virtual DVD display environment. Special, secret, or limited access virtual DVDs may be placed in the storage cabinets 1214, and therefore not be viewable to a guest. Access into the storage cabinet requires a key. The key may be a password or the like defined by the user (who may optionally share it with an identified guest). The key may be represented visually using a graphical object (that appears to be a "key" to the observer). The graphical key may then be virtually grasped and or moved in a manner that unlocks the storage cabinet 1214, thereby providing access to the virtual contents stored therein.

In some embodiments, the top-most shelves 1212 may be sufficiently "high" so as to prevent access by or casual observation by guests. For example, a guest may be a child. The child's HMD 1108 may be configured to limit their view so that virtual DVDs 1110 on the top shelves 1212, which may be holding to mature rated thematic content event virtual DVDs 1110 that the child guest should not have access to, are not viewable by the child guest. Additionally, or alternatively, the virtual reach of the guest child may be limited by the gesture control technology so that the child may not be able to reach the virtual DVD's stored on the top-most shelves 1212.

Once the owner 1102 has optionally reconfigured their selected one of the virtual bookshelf case templates 1210, the owner 1102 can exit or otherwise conclude the setup process. When the setup process is concluded, data corresponding to the selected and optionally reconfigured virtual bookshelf case template 1210 is saved into the owner's bookshelf case storage medium 1204. Since there are many community members, data corresponding to each of the virtual bookshelf cases 1106 are stored using a suitable identifier of the owner 1102. That way, when the owner 1102 wishes to further reconfigure their virtual bookshelf case 1106, add or remove a virtual DVD 1110, or when a guest arrives into the owner's virtual environment, the data corresponding to the owner's personalized virtual bookshelf case 1106 can be retrieved from the owner's bookshelf case storage medium 1204. Then, the owner's personalized virtual bookshelf case 1106 can be rendered and presented to the owner 1102 and/or to the guest.

Each owner 1102 is able to select virtual DVDs 1110 of interest that will be included in their personal virtual DVD collection 1104. In the various embodiments, a thematic content event may be viewed by community members, and then a conversation video may be generated by the community members that emulates a conversation about that particular thematic content event. As noted herein, the content source system 108 provides a copy of the thematic content event to the thematic content modify system 122 for processing. During the processing of the thematic content event, the thematic content modify system 122 generates a virtual DVD 1110 for each of the received thematic content events.

A virtual DVD 1110 is data that corresponds to the thematic content event. The virtual DVD data is used to generate a graphical representation of the virtual DVD 1110. The rendered and presented image of the virtual DVD 1110 resembles the appearance of a legacy DVD box or DVD enclosure. The "outside" of a presented virtual DVD 1110 may include graphical elements that are similar to, or identical to, graphical elements of an outside cover of the legacy DVD box or DVD enclosure. For example, but not limited to, the title of the thematic content event may be shown on the virtual DVD 1110. Actor names, a brief description of the content or theme, and/or photographic images may optionally be presented on the cover of the virtual DVD 1110. Rather than a still image, a short duration thumbnail video clip (with or without corresponding audio content) may be alternatively or additionally included on the virtual DVD 1110.

Since there are many hundreds of, or even thousands of, thematic content events that may have one or more community member conversations, each plurality of generated virtual DVDs 1110 are saved into the virtual DVD catalogue storage medium 1206. Over time, a large number of virtual DVDs 1110*a-i* will have been saved into the virtual DVD catalogue storage medium 1206.

When the owner 1102 wishes to add a particular virtual DVD 1110 into their virtual bookshelf case 1106, the owner 1102 will specify an identifier of that particular thematic content event. The specified identifier may be any suitable identifier, such as the title of the thematic content event. In an example embodiment, a listing of available virtual DVDs 1110 is presented to the owner 1102. The listing may be presented on the display 1108*a* of the HMD 1108 or another suitable display. The listing may resemble a menu, similar to an EPG. Titles, supplemental information, and/or thumbnail images (still or video clips) may be presented to aid the owner 1102 is identifying a thematic content event of interest for inclusion in their virtual DVD collection 1104.

In some embodiments, a virtual keyboard or the like is graphically presented to the owner 1102. The gesture control technology may interpret gestures made by the user that simulates the owner typing in the identifier of the thematic content event of interest. In another embodiment, the user may speak the identifier of a virtual DVD 1110 of interest, which is detected by a microphone (not shown). A speech recognition algorithm identifies the words spoken by the user, and the identifier of the thematic content event is determined based on the determined spoken words. For example, the owner 1102 may speak the title of the thematic content event to specify the identifier of the thematic content event of interest. Another embodiment may use a physical keyboard, and electronic program guide (EPG), or another suitable search method for permitting the owner 1102 to specify the identifier of the thematic content event of interest.

In response to receiving the owner's specification of the thematic content event of interest, the corresponding virtual DVD 1110 is retrieved from the virtual DVD catalogue storage medium 1206. In an example embodiment, the graphical image of the specified virtual DVD 1110 is presented to the owner 1102 (or to the guest) on the display of their HMD 1108. In an example embodiment, when the owner 1102 virtually grasps, points to, or touches a particular one of the presented virtual DVDs 1110, that virtual DVD 1110 is placed onto the virtual bookshelf case 1106 of the owner 1102.

Further, since the identity of the owner 1102 is known at the time when the thematic content event is specified, other information associated with the specifying owner 1102 may be accessed. When that virtual DVD 1110 is stored into that owner's virtual DVD collection 1104, the associated information is also saved. For example, if the owner 1102 is included in a conversation video, information identifying that conversation video and information enabling access to that conversation video associated with the specified virtual DVD 1110 is saved with the virtual DVD data. Alternatively, a link or the like to the conversation video may be saved with the virtual DVD data. Accordingly, when the owner 1102 (or a guest) accesses that particular virtual DVD 1110 from the virtual DVD collection 1104, information indicating the associated conversation video may be presented along with the graphical image of the virtual DVD 1110 such that the owner 1102 (or guest) intuitively understands that they have one or more of their member dialogue videos included in a member conversation video.

Any suitable information associated with the owner 1102 and their specified virtual DVD 1110 may be identified and saved as part of the data of a virtual DVD 1110. If the owner 1102 has previously submitted one or more dialogue videos pertaining to the selected thematic content event which have not been included in a conversation video, that unused dialogue video may be identified and saved with the virtual DVD data. When the owner 1102 (or a guest) accesses that particular virtual DVD 1110 from the virtual DVD collection 1104, information indicating the associated member dialogue video may be indicated. The owner 1102 (or a guest) could then select that information for presentation. Similarly, rant videos, endorsement videos, proof videos and/or other interaction associated with that particular owner 1102 and the specified thematic content event may be identified and saved for later access by the owner 1102 (or a guest).

The process of managing the virtual bookshelf case templates 1210, managing the virtual DVDs 1110 stored in the virtual DVD catalogue storage medium 1206, receiving input from the owner 1102 when a virtual bookshelf case template 1210 is selected and/or reconfigured, receiving selection of one or more of the stored virtual DVDs 1110, and then saving or retrieving the owner's virtual bookshelf case 1106 and the plurality of virtual DVDs 1110 in their virtual DVD collection 1104 stored in the owner's bookshelf case storage medium 1204, is managed by the virtual bookshelf generator 1208. Here, the virtual bookshelf generator 1208 is illustrated as being at the video community system 100 (remote from the owner 1102 and their guests).

In other embodiments, the virtual bookshelf generator 1208 may reside at any suitable electronic device or system.

Alternatively, an embodiment of the virtual bookshelf generator 1208 may reside in the media device 112 itself such that one or more of the above-described processes may be effected locally at the media device 112. For example, the virtual bookshelf generator 1208 resident in the media device 112 may establish a communication link to the virtual DVD catalogue storage medium 1206, retrieve the virtual bookshelf case templates 1210, and then manage the selection and/or reconfiguration of one of the virtual bookshelf case templates 1210 by the owner 1102. Then, the resulting virtual bookshelf case 1106 may be communicated for storage to the owner's bookshelf case storage medium 1204 at the video community system 100.

Alternatively, in a distributed architecture system, the resultant virtual bookshelf case 1106 may be stored locally at the media device 112. When a guest views the owner's virtual bookshelf case 1106 with their virtual DVD collection 1104, then the HMD 1108 of the guest retrieves the locally stored virtual bookshelf case 1106 with the owner's virtual DVD collection 1104 for presentation on the display of their HMD 1108.

Figure 13:
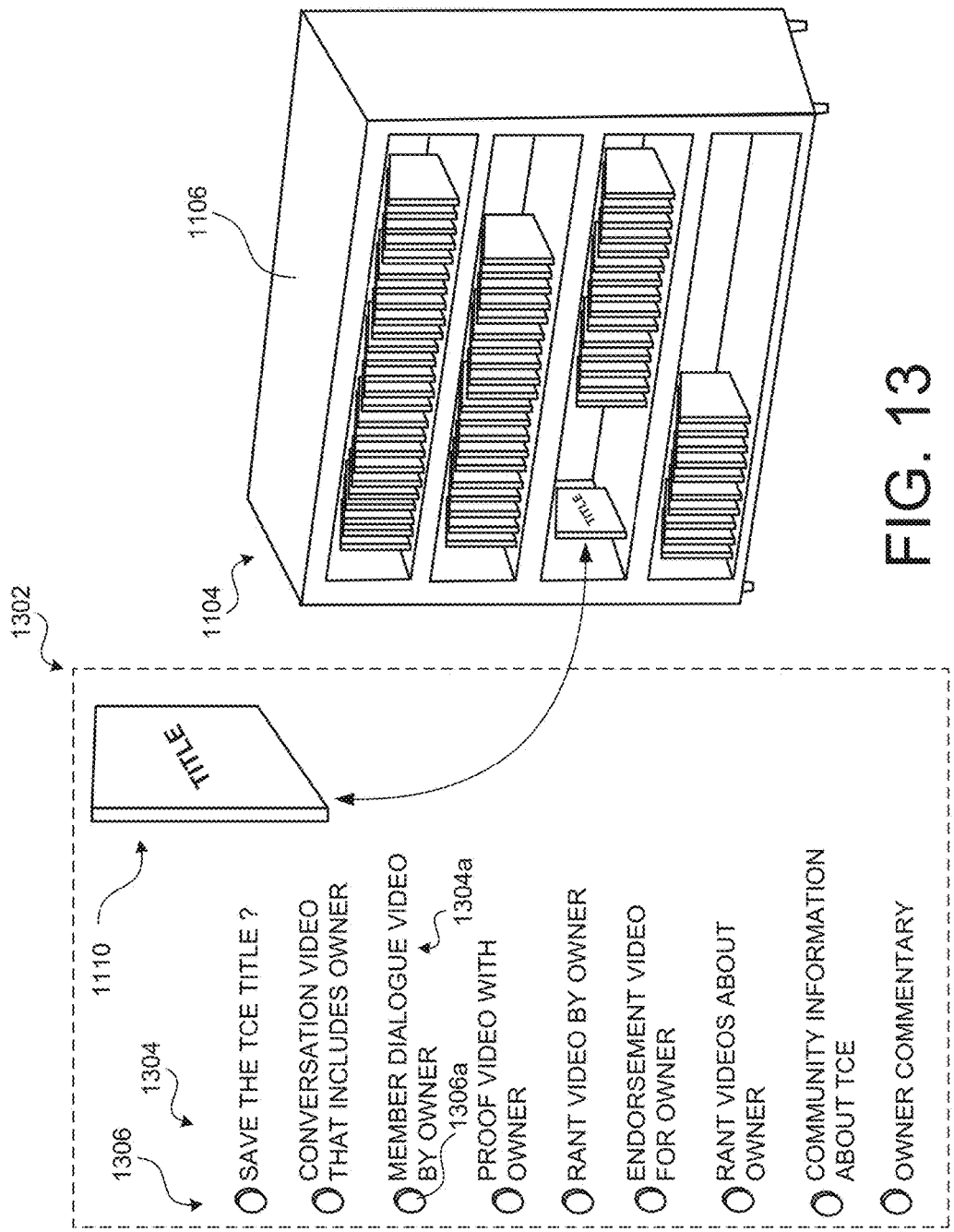
FIG. 13 conceptually illustrates an example image that may be presented to the owner on the display of a head mounted display (HMD), or another suitable display, when they are managing their virtual DVD collection.

FIG. 13 conceptually illustrates an example image that may be presented to the owner 1102 on the display 1108a of the HMD 1108, or another suitable display, when they are managing their virtual DVD collection 1104. The owner 1102 manages their virtual DVD collection 1104 by initiating presentation of the virtual bookshelf case 1106. The virtual bookshelf case data retrieved and is processed to render a virtual image their virtual bookshelf case 1106. The virtual DVD data associated with each of the virtual DVDs 1110 of their virtual DVD collection 1104, and the associated information for each virtual DVD 1110, is retrieved and is processed to render a virtual image their virtual DVDs 1110 from the owner's bookshelf case storage medium 1204 (for that particular owner 1102). In an example embodiment, a graphical image of the virtual bookshelf case 1106 (with their virtual DVD collection 1104) is then presented to the owner 1102.

The additional supplemental information is information associated with prior community interactions of the owner 1102 within the video community system. Example community interactions represented by the supplemental information may include, but is not limited to, conversation videos created by the owner 1102, member dialogue videos created by the owner 1102, rant videos created by the owner 1102, endorsement videos created by the owner 1102 and/or created by others about the owner 1102, proof videos created by the owner 1102, and/or other interactions associated with that particular owner 1102 and the specified thematic content event. Data corresponding to the additional supplemental information is retrieved from the community commentary information storage medium 140 and is communicated to the owner's electronic device for presentation. This additional supplemental information is optionally indicated by a suitable descriptive identifier 1304 as shown in the non-limiting exemplary presented graphics 1302 for each of the different types of community interactions of the owner 1102.

In an example embodiment, the display 1108a of the HMD 1108 may be an opaque type display that presents images of only the virtual bookshelf case 1106 and the virtual DVD collection 1104. Since the display 1108a is opaque, a view of any background objects in the physical environment 1100 cannot be seen. For example, the virtual bookshelf case 1106 may be presented on a solid colored, shaded, or patterned background. Any suitable color, pattern and/or degree of shading may be used. The color, pattern and/or degree of shading may be predefined or may be specifiable by the owner 1102 (or a guest). Accordingly, the user 1102 can sit comfortably on the couches 1118, 1120 while they manage their virtual DVD collection 1104. Alternatively, images of selected background objects, images of photographed scenes, or computer generated graphics may be optionally presented as a background behind the present image of the virtual bookshelf case 1106 for a more pleasing experience.

Alternatively, the display 1108a of the HMD 1108 may be partially transparent such that the owner 1102 may see the background objects of the physical environment 1100 in addition to the rendered graphic of the virtual bookshelf case 1106 with the virtual DVD collection 1104. The image of the virtual bookshelf case 1106 is shown in its relative location to the other visible background objects of the physical environment 1100. For example, returning to FIG. 11, the user might be standing in the central area of the physical environment 1100 as illustrated. While the owner 1102 is looking about through the partially transparent display 1108a of their HMD 1108, the owner 1102 would only see the graphical image of the virtual bookshelf case 1106 when they are looking towards to the location where the virtual bookshelf case 1106 is virtually located in the physical environment 1100. If the owner 1102 moves about the physical environment 1100, the position/location/orientation of the viewed virtual bookshelf case 1106 remains (continues to be presented) in its respective location and orientation in the physical environment 1100.

Here, during the initial set up of their virtual bookshelf case 1106, the owner 1102 selects the location in the physical environment 1100 that the virtual bookshelf case 1106 is to be presented (with respect to other physical objects in the physical environment 1100). The location of the virtual bookshelf case 1106 is a virtual location referenced to a particular physical location in the physical environment 1100, and may be determined using any suitable location coordinate system. For example, in the simplified conceptual example of FIG. 11, the virtual bookshelf case 1106 is shown as being located between the floor lamp 1122 and the media console 1124 with the TV 1126. The owner-specified location information for the virtual bookshelf case 1106 is part of the data that is saved into the owner's bookshelf case storage medium 1204 for that particular owner 1102 during the initial set up.

Additionally, the owner 1102 selects the orientation of the virtual bookshelf case 1106 in the physical environment 1100. Orientation of the virtual bookshelf case 1106 corresponds the position of the virtual bookshelf case 1106 at its particular location, and may be determined using any suitable angle based coordinate system. Typically, orientation information may be determined for the virtual bookshelf case 1106 in a horizontal plane. Locations of the various background objects in 3D space with respect to the location of the virtual bookshelf case 1106 may be also computed or determined. The location information for the background objects and the respective location and orientation information of the virtual bookshelf case 1106 may be correlated with each other such that relative locations and orientations are determined with respect to each other (the various physical objects and the virtual bookshelf case 1106). Then, the location and orientation information can be used such that virtual reality image data can be defined based on the determinable current location of the HMD 1108, the determinable location and orientation information of the virtual bookshelf case 1106, and the background objects in the physical environment 1100.

Accordingly, the graphical image of the virtual bookshelf case 1106 is shown on the display 1108a of the HMD 1108 only when the display 1108a is oriented towards that location in the physical environment 1100. Further, based on the relative location of the HMD 1108 to the location of the virtual bookshelf case 1106, and based on the orientation information of the virtual bookshelf case 1106, the position and location of the virtual bookshelf case 1106 relative to the current location of the HMD 1108 can be determined such that the viewing owner 1102 (or a visiting guest) realistically perceives the virtual bookshelf case 1106 as being in its defined location and position in a virtual environment and/or the physical environment 1100.

Otherwise, when the orientation of the HMD 1108 is not pointed towards the virtual location of the virtual bookshelf case 1106, the owner 1102 will not see the image of the virtual bookshelf case 1106. For example, if the owner 1102 looks directly upward, they will only see the ceiling lamp 1132. If they look to the left, they will only see the couch 1120, door 1114 and windows 1116 (since the field of view of the display of the HMD 1108 will not be oriented towards the defined location of the virtual bookshelf case 1106).

With this embodiment, the HMD 1108 is configured to determine its current location in the physical environment 1100 (or at least its location relative to the specified location for the virtual bookshelf case 1106) and its current orientation in 3D space. Any suitable location and orientation means may be used by the HMD 1108 to determine its location and/or orientation in the physical environment 1100. Embodiments then determine a current location of the HMD 1108 in the physical environment 1100, wherein the graphical representation of the virtual bookshelf case 1106 is presented on the display of the HMD 1108 at a location defined by the location information corresponding to a predefined location of the virtual bookshelf case 1106 in the physical environment 1100. Similarly, embodiments determine a current orientation of the HMD 1108 in the physical environment 1100, wherein the graphical representation of the virtual bookshelf case 1106 is presented on the display of the HMD 1108 at the orientation defined by the predefined orientation information associated with the virtual bookshelf case 1106.

Alternatively, some community members might not have a HMD 1108 that is configured to present images of the virtual bookshelf case 1106 and the virtual DVDs 1110 of the virtual DVD collection 1104. In such situations, the graphical image of the virtual bookshelf case 1106 and the virtual DVD collection 1104 may be presented in a two dimensional format on any suitable display, such as the display 1126a of the TV 1126. Other example electronic devices with displays include personal computers, cellular phones, smart phones, laptop computer, note pads, or the like. The owner 1102 (or a guest) would then be able to navigate around the presented virtual bookshelf case 1106 with the virtual DVD collection 1104. Such navigation could be implemented using a remote control (not shown) that provides navigation commands that are similar to navigation commands used to navigate about a presented EPG.

FIG. 13 further shows a graphics 1302 that graphically illustrates the virtual DVD 1110 and the supplemental information associated with the owner 1102 and that particular virtual DVD 1110. When the owner 1102 (or a guest) is initially viewing the virtual bookshelf case 1106, the graphics 1302 are not presented in an example embodiment (since the owner 1102 has not yet "selected" a particular one of the virtual DVDs 1110 or has not specified a thematic content event for consideration). That is, the owner 1102 (or a guest) initially sees only the virtual bookshelf case 1106 with the virtual DVD collection 1104 (and any background objects, if visible or presented).

The owner 1102 is able to add a new virtual DVD 1110 for any selected thematic content event that is of interest to the owner 1102. To add a new virtual DVD 1110 to their virtual DVD collection 1104, the owner 1102 specifies the identifier of a particular thematic content event that is not part of their virtual DVD collection 1104 to the video community system 100. The video community system 100 retrieves information needed to render a virtual DVD 1110 associated with the specified thematic content event from the virtual DVD catalogue storage medium 1206. This virtual DVD 1110 and the associated information is communicated to the HMD 1108 or another device, such as the media device 112. The graphics 1302 is then presented to the owner 1102. Thus, the owner 1102 sees an image of the virtual DVD 1110 that has been generated for the specified thematic content event that they have specified. Depending upon the embodiment, the graphics 1302 may be presented as a pop-up window or the like.

The owner 1102 specifies the identifier of a particular thematic content event of interest in a variety of manners. In some embodiments, the owner 1102 may be viewing a particular thematic content event on the TV 1126. While the owner 1102 is viewing the thematic content event, and/or after the conclusion of the thematic content event, the owner 1102 owner may select that thematic content event for inclusion as a new virtual DVD 1110 in their virtual DVD collection 1104. For example, a dedicated controller 452 on the remote control 450 (FIG. 4) may be actuated by the owner 1102 to select the presented thematic content event for inclusion as a virtual DVD 1110. In response to the selection by the owner 1102, the data corresponding to the virtual DVD 1110 is retrieved and is added into the their virtual DVD collection 1104.

Alternatively, or additionally, the owner 1102 may be viewing an electronic program guide (EPG) that indicates broadcast times and other information for the thematic content event of interest. For example, a dedicated controller 452 on the remote control 450 (FIG. 4), or a selectable option of presented EPG, may be used by the owner 1102 to navigate to and select a particular thematic content event indicated on the EPG for inclusion as a virtual DVD 1110. In response to the selection by the owner 1102 made via the presented EPG, the data corresponding to the virtual DVD 1110 is retrieved and is added into their virtual DVD collection 1104. Here, one skilled in the art appreciates that the owner 1102 may select any thematic content event, even ones that the owner 1102 has not personally viewed.

Optionally, the supplemental information associated with the owner 1102 itself may be retrieved from the community commentary information storage medium 140. This optional supplemental information, as indicated by a suitable descriptive identifier 1304 shown in the presented graphics 1302 for each of the different types of community interactions of the owner 1102, may be presented. In the various embodiments, the data corresponding to the supplemental information may be concurrently communicated with the data of the virtual bookshelf case 1106 and the data of the virtual DVDs 1110. Alternatively, the data corresponding to the supplemental information may be separately communicated after the data of the virtual bookshelf case 1106 and the data of the virtual DVDs 1110 has been communicated to the electronic device of the owner 1102 (or a visiting guest).

A plurality of selectable virtual buttons 1306 adjacent to an associated item of the supplemental information identifier 1304. The virtual buttons 1306 are selectable, in a virtual manner, by the owner 1102. The owner 1102 may gesture with their hand 1112 to virtually actuate one of the selectable virtual buttons 1306. The owner 1102 might grasp, point to, or touch the selectable button 1306 to simulate selection and actuation of a virtual button 1306 of interest. In response to a selection of one of the virtual buttons 1306, the associated additional supplemental information that is associated with the selected virtual button 1306 is retrieved (communicated from the member community system 100) and/or is then visually presented to the owner 1102. That is, additional supplemental information corresponding to selected item adjacent to the selectable button 1306 is retrieved and is communicated from the video community system 100 to the user's electronic device, wherein the additional supplemental information corresponds to a specific prior community action by the user. Then, the specific prior community action (such as a prior stored member dialogue video or the like created by the owner 1102) is presented to the owner 1102 based on the received additional supplemental information.

For example, the owner 1102 may have previously submitted a member dialogue video to the community. Here, the user could "touch" the button 1306a next to the identifier 1304a (the "member dialogue by owner"). In response to the selection of the virtual button 1306a, that particular member dialogue is retrieved from the community commentary information storage medium 140. The retrieved member dialogue is communicated to the HMD 1108 and is then presented on the display 1108a.

In some embodiments, after optionally previewing the item of supplemental information, the owner 1102 may then optionally confirm that they wish this particular supplemental information to be saved as part of the data for their new virtual DVD 1110 (so that the owner 1102 and/or a visiting guest later has access to that information). Alternatively, the owner 1102 may delete that supplemental information, or selected elements of the supplemental information, so that that particular supplemental information is not saved as part of the data of virtual DVD 1110. Alternatively, the owner 1102 may specify that the supplemental information is private so that that particular supplemental information is saved as part of the data of virtual DVD 1110, but is only viewable by the owner 1102 or authorized guests having an appropriate access privilege right. For example, the associated member dialogue video may be poorly presented or even be embarrassing to the owner 1102. Accordingly, after previewing the member dialogue video, the owner 1102 may decide to delete that particular member dialogue video (or at least limit access to it) from the supplemental data this is saved a part of the virtual DVD 1110.

Some embodiments may be configured to receive commentary from the owner 1102 about the thematic content event of a virtual DVD 1110 that is being processed. For example, if the owner 1102 selects the "owner commentary" button 1306, the owner 1102 is able to enter video, audio and/or textual commentary that is then saved as part of the supplemental information associated with that particular virtual DVD 1110. Such commentary created by the owner 1102 may be generated in a similar manner as used for generation of member dialogue videos, rant videos, or the like.

Then, once the owner 1102 is satisfied with their selection of the thematic content event (and any associated supplemental information), the owner 1102 may specify that the new virtual DVD 1110 is to be saved into their virtual DVD collection 1104. The new virtual DVD 1110 is then saved into the virtual DVD collection 1104, and a graphical image of that new virtual DVD 1110 is shown along with the images of the other virtual DVDs 1110 in the virtual DVD collection 1104. In some embodiments, the image of the new virtual DVD 1110 may be shown as a predefined location, such as at the end of a row of previously saved virtual DVDs 1110. If a shelf is full, then the new virtual DVD 1110 may be located on an empty shelf or in another available open location. If the arrangement of the virtual DVDs 1110 are based on a categorization system, the new virtual DVD 1110 may be categorized and save with other virtual DVDs 1110 belonging to that identified category.

Alternatively, or additionally, the owner 1102 may specify a particular location where the associated virtual DVD 1110 is to be stored (the location of the graphical representation of the new virtual DVD 1110) on their virtual bookshelf case 1106. For example, the owner 1102 may use their hand 1112 to virtually grasp, point to, or otherwise touch the virtual DVD 1110. The owner 1102 may then move their hand 1112 to place the virtual DVD 1110 onto a particular shelf at a particular location.

In an example application, the owner 1102 may have organized the virtual DVDs 1110 of their virtual DVD collection 1104 using a theme-based category or catalogue system. For example, adult and action themed movies might be located by the owner 1102 on the top shelf of the virtual bookshelf case 1106, while romantics and comedies may be located on the middle shelves of the virtual bookshelf case 1106. Further, children's thematic content events may be located on the lowest shelf of the virtual bookshelf case 1106. Thus, it is possible for the owner 1102 to arrange individual virtual DVDs 1110 into the virtual bookshelf case 1106 using any desirable scheme or cataloguing approach.

Some embodiments may automatically organize the virtual DVDs 1110 on the virtual bookshelf case 1106. An genre-based catalogue system may have been selected by the owner 1102 such that the virtual DVDs 1110 are automatically catalogued (categorized) and placed into the virtual bookshelf case 1106 based on criteria that has been predefined for a user specified genre-based catalogue system. Here, an attribute or characteristic of the selected thematic content event may be analyzed by the video community system 100 to determine an appropriately related genre of that thematic content event. When the owner 1102 saves that particular virtual DVD 1110 into their virtual DVD collection 1104, the virtual DVD 1110 is then automatically placed into the virtual bookshelf case 1106 based on the particular catalogue system being used. Example categories that may be used, alone or in combination, include movies with particular actors or directors, parental guidance ratings, dates of production, and/or subject matter (wars, action, science fiction, thrillers, horror, love stories, comedies, etc.). The owner 1102 may even choose to alphabetize virtual DVDs 1110 of their personal virtual DVD collection 1104, or alphabetize the virtual DVDs 1110 in particular categories.

The owner 1102 may also review stored virtual DVDs 1110. The owner 1102 virtually selects a virtual DVD 1110 of interest for review. In an example embodiment, when the owner 1102 or guest virtually grasps, points to, or touches a particular one of the virtual DVDs 1110 shown on the virtual bookshelf case 1106. In response, the video community system 100 presents an expanded sized image of the selected virtual DVD 1110 on the display 1108a of the HMD 1108 (or on another display). In an example embodiment, when the owner 1102 virtually touches a virtual DVD 1110 of interest, the graphic 1302 is also then presented for review by the owner 1102.

Once the owner 1102 has saved a new virtual DVD 1110, or revised an existing virtual DVD 1110, presentation of the larger sized image of the virtual DVD 1110 and the graphics 1302 concludes. The graphics 1302 may disappear, slide off of the viewing region of the display of the HMD 1108 (or the TV 1126), or may fade out and slowly disappear. The larger sized image of the virtual DVD 1110 may be graphically illustrated as shrinking and then visibly moving to its location in the virtual bookshelf case 1106. Any suitable graphics may be used by the various embodiments.

At any time, the owner 1102 may rearrange location of a particular virtual DVD 1110 presented on their virtual bookshelf case 1106. The owner 1102 simply grasps, points to, or touches a particular virtual DVD 1110 that they wish to move. The owner 1102 then moves their hand 1112 to a new location of interest in the virtual bookshelf case 1106, and then releases the virtual DVD 1110 (or makes some other corresponding gesture) such that the particular virtual DVD 1110 of interest is moved to its new location in the virtual bookshelf case 1106. A graphical representation of a hand grasping the virtual DVD 1110 may be shown moving the virtual DVD 1110 to its new location. (Optionally, the above-described larger image of the virtual DVD 1110 and/or the associated graphic 1302 is not shown.)

In some embodiments, a "play" or "record" feature may be available for a virtual DVD 1110. Here, the owner 1102 (or event the visiting guest) simply makes an appropriate corresponding gesture (and/or actuates one of the controllers 452 on their remote control 450) a particular one of the virtual DVDs 1110. In response, the media device 112 of the owner 1102 (or the visiting guest) initiates presentation of the thematic content event associated with the selected virtual DVD 1110. For example, the associated thematic content event may be available from a video on demand system and/or may have been previously recorded (stored) at the media device 112. Alternatively, or additionally, if the thematic content event is scheduled for a future broadcast to the media device 112, a recording of the associated thematic content event may be scheduled by the media device 112. When the thematic content event is broadcast, the media device 112 records the broadcasted thematic content event.

Figure 14:
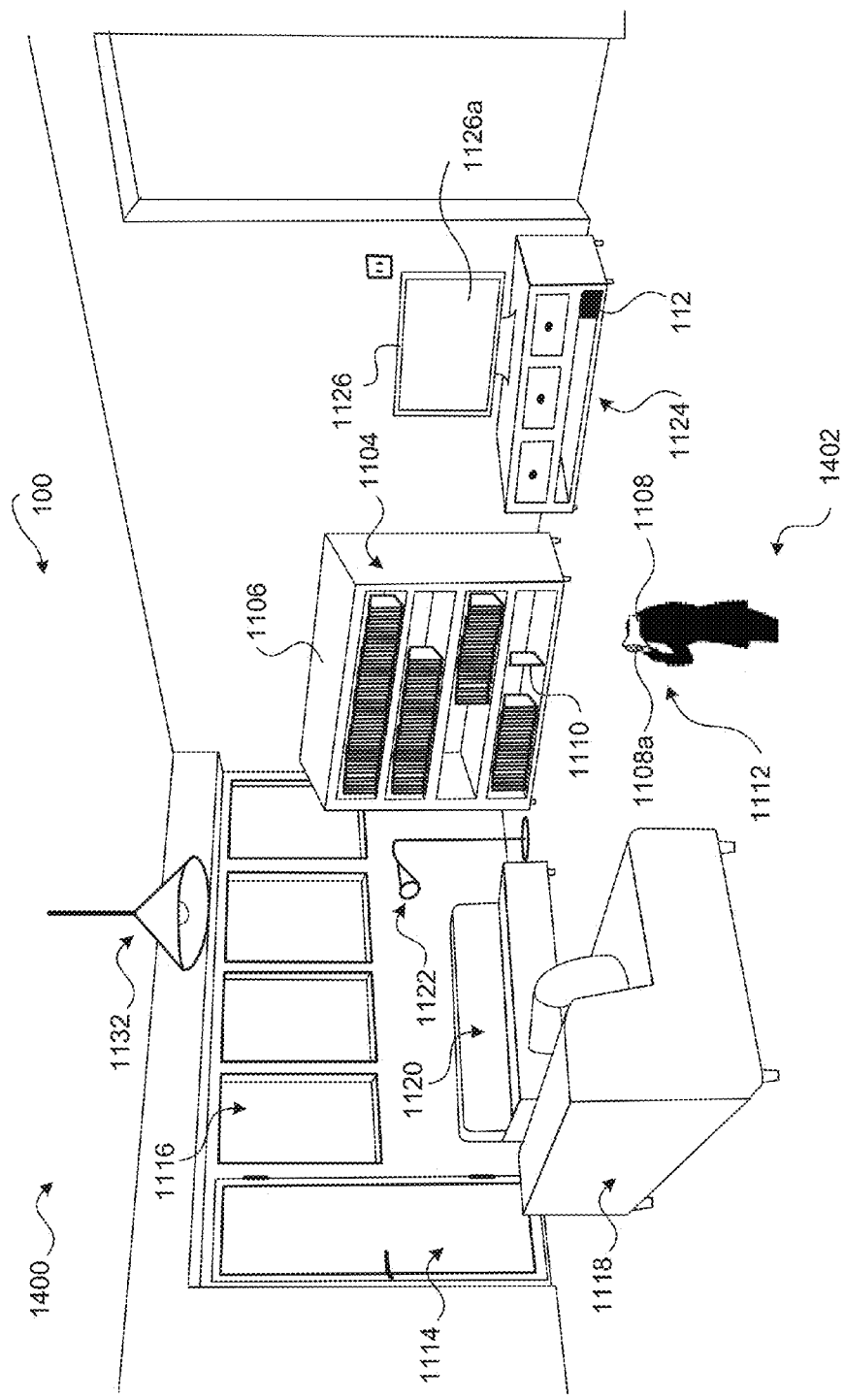
FIG. 14 conceptually illustrates an example virtual environment that may be presented to a guest on the display of their HMD when they are "invited" to visit and view the virtual DVD collection of the owner.

FIG. 14 conceptually illustrates an example virtual environment 1400 that may be presented to a guest 1402 on the display 1108*a* of their HMD 1108 when they are "invited" to visit and view the virtual DVD collection 1104 of the owner 1102. Here, in an example embodiment, the HMD 1108 of the guest 1402 (or another electronic device of the guest 1402, such as the media device 112) establishes a communication link to the video community system 100. When the guest 1402 identifies the particular owner 1102 that they wish to "visit," the particular virtual bookshelf case 1106 with the virtual DVD collection 1104 of the identified owner 1102 is accessed from the owner's bookshelf case storage medium 1204. The data corresponding to the virtual bookshelf case 1106 with the virtual DVD collection 1104 of the identified owner 1102 is received at the HMD 1108. A virtual image of the environment 1400 is then rendered and presented on the display 1108*a* of the guest's HMD 1108.

The presented virtual environment 1400 optionally comprises two portions, the foreground and the background. Here, the illustrated background is an image that corresponds to the captured image of the physical environment 1100 of the owner 1102. The foreground is a virtual image of the virtual bookshelf case 1106 with the virtual DVD collection 1104 of the owner 1102.

When the guest 1402 looks towards the virtual bookshelf case 1106, they will be able to see the virtual DVD collection 1104 of the owner 1102, along with background objects in the vicinity of the location of the virtual bookshelf case 1106. When the guest 1402 looks elsewhere in the presented virtual environment 1400, whey will see other background objects.

In this simplified example, if guest 1402 looks directly upward, they will only see the ceiling lamp 1132. If they look to the left, they will only see the couch 1120, door 1114 and windows 1116 (since the field of view of the display 1108*a* of the HMD 1108 will not be oriented towards the defined location of the virtual bookshelf case 1106). With this embodiment, the HMD 1108 of the guest 1402 is configured to determine its location in the physical environment 1100 (or at least its location relative to the specified location for the virtual bookshelf case 1106) and it's orientation in 3D space of the presented virtual environment 1400. Any suitable location and orientation means may be used by the HMD 1108 to determine its location and/or orientation in the presented virtual environment 1400.

As noted below, not all background objects need to be shown to the visiting guest 1402. In the simplified hypothetical example of FIG. 14, the personal pictures 1128 and the painting 1130 (that were illustrated as hanging on the wall of the physical environment 1100 in FIG. 11) are not presented in the presented virtual environment 1400 shown to the guest 1402. Accordingly, the owner 1102 is able to keep selected private and/or personal of their possessions from view by a particular guest 1402 since those objects are excluded from the presented virtual environment 1400 that is created from the images of the physical environment 1100.

In the various embodiments, the owner 1102 may control which community members are to be allowed to visit their virtual environment 1400 to view their virtual DVD collection 1104. Thus, a priority scheme of access privilege rights is provided by embodiments of the video community system 100. The owner 1102 defines a suitable access privilege right scheme that fits their particular needs, and the access rights scheme is then saved into the owner's bookshelf case storage medium 1204 along with the other data associated with that particular owner 1102.

For example, some guests 1402 may have the most limited level of access privilege rights. Here, the guest 1402 may be limited to only viewing the virtual DVD collection 1104 on the virtual bookshelf case 1106 of the owner 1102, and may not be permitted to see any background objects of the physical environment 1100. Such a limited access privilege guest 1402 might be granted to a general member of the community who is not a friend of, or who may not even personally know, the owner 1102. For example, the guest 1402 and the owner 1102 may be common members in a club or other organization associated with the video community system 100. Such a guest 1402 may have had only a limited contact with the owner 1102 so as to be able to properly identify the owner 1102 to the video community system 100.

One skilled in the arts appreciates that if the community member does not have the identifying information necessary to identify the owner 1102, then the video community system 100 would not be able to provide any information pertaining to the owner 1102 to that community member. That is, it would not be possible for them to become a visiting guest of the owner 1102.

For such limited access guests 1402, the presented background of the virtual environment 1400 may not even be based on images of the physical environment 1100 of the owner. Optionally, a generic background may be presented to such a guest 1402. Any suitable generic background may be used, such as a stock image of an office, library, home or the like. Other example images for a generic background could include an image of a park, a beach, a mountain, a painting, or even the moon and the stars. The generic background could even be a solid color or patterned color background image. Thus, that limited access guest 1402 will not learn anything personal about the particular owner 1102 that they are visiting (since they will see no background objects of the physical environment 1100 of that owner 1102). There are no limitations on the generic background of the presented virtual environment 1400 that is used.

The generic background of the presented virtual environment 1400 may be selected (predefined) by embodiments of the video community system 100. Alternatively, the generic background may be selectable by the owner 1102 during the set up process or the generic background may be selected by the guest 1402. The owner 1102 or guest 1402 may select one of a plurality of presented generic background templates. Much like the virtual bookshelf case templates 1210, the background templates may be stored by the video community system 100. Alternatively, the owner 1102 or the guest 1402 could select and upload any image of interest as their personal generic background that is shown to a limited access guest 1402. Such selectable images may be obtained from any suitable source by the owner 1102 or the guest 1402.

Additionally, or alternatively, the owner 1102 may associate particular virtual DVDs 1110 in their virtual DVD collection 1104 with a particular level of access privilege right. The access privilege right of a guest is compared with the access privilege rights or each of the virtual DVDs 1110. Only those virtual DVDs 1110 that have an access privilege right corresponding to the access privilege right of the guest 1402 will be shown on the presented virtual bookshelf case 1106.

For example, popular movies with a general audience rating (G) or a parental guidance rating (PG) may be defied as being associated with all levels of access privilege rights, including the most limited level of access privilege rights. Specific thematic content events may be included, or excluded, for this access privilege level based on the parental guidance rating of the thematic content event associated with the virtual DVD 1110. Accordingly, when a guest 1402 having the most limited level of access privileges is visiting, they will only be able to see those particular G-rated or PG-rated virtual DVDs 1110 that the owner 1102 wishes them to see. Those virtual DVDs 1110 having their thematic content events with parental guidance ratings of MA, R, X, or other adult content rating will not be shown to that visiting guest 1402.

Other community members may have a higher level of access privileges. Such a higher privilege level guest 1402, when visiting the presented virtual environment 1400, may see various background objects of the owner's physical environment 1100, such as conceptually illustrated in FIG. 14. Here, the visiting guest 1402 sees the first couch 1118, the second couch 1120, the floor lamp 1122, the media console 1124 with the TV 1126 thereon (having the display 1126a), and the ceiling lamp 1132 which are located about the physical environment 1100. However, as conceptually illustrated in FIG. 14, this particular visiting guest 1402 does not see the personal pictures 1128 or the painting 1130 hanging on the wall of the physical environment 1100 (since their associated access privilege right does not permit them to see these particular background objects).

Management of access privileges may be handled in a variety of manners. In an example embodiment, the owner 1102 may be identifiable within the community using different names. For example, the owner 1102 may have defined a first personal identifier, such as a "handle" or other nickname, when they are participating as a member of a particular community group. The first personal identifier of the owner 1102 may be associated with the lowest level of access privilege rights. The owner 1102 may have used a second personal identifier, such as their first name and last name, to define a second higher level of access privilege rights. Further, owner 1102 may have used a third personal identifier, such as their family nickname or a special identifier, to define a third higher level of access privilege rights. To initiate a visit, the guest 1402 provides one of the first, the second or the third personal identifiers to the video community system 100, and their access privilege rights are then defined based on the provided personal identifier of the owner 1102 that they are visiting.

Alternatively, or additionally, the owner 1102 may define a particular password for a particular level of access privilege rights. The password would then have to be provided by the owner 1102 to the visiting guest 1402. If the guest 1402 provides the password to the video community system 100, they will have the password-protected higher level access privilege right. Without the password, the guest 1402 will be limited to a predefined or default level of access privilege rights.

Alternatively, or additionally, the owner 1102 may predefine a list of identified guests 1402 and a specified level of access privileges. Here, the owner 1102 may have a list that identifies a plurality of their closest friends and associates. These identified guests may then be associated with the highest level of access privilege rights, or any other level of access privilege rights. The list may be stored as data in the owner's bookshelf case storage medium 1204 for that particular owner 1102. For example, family members may have different access privilege levels. If a particular guest 1402 is not a listed family member, then that guest 1402 will be limited to another predefined or default level of access privilege rights.

Figure 15:
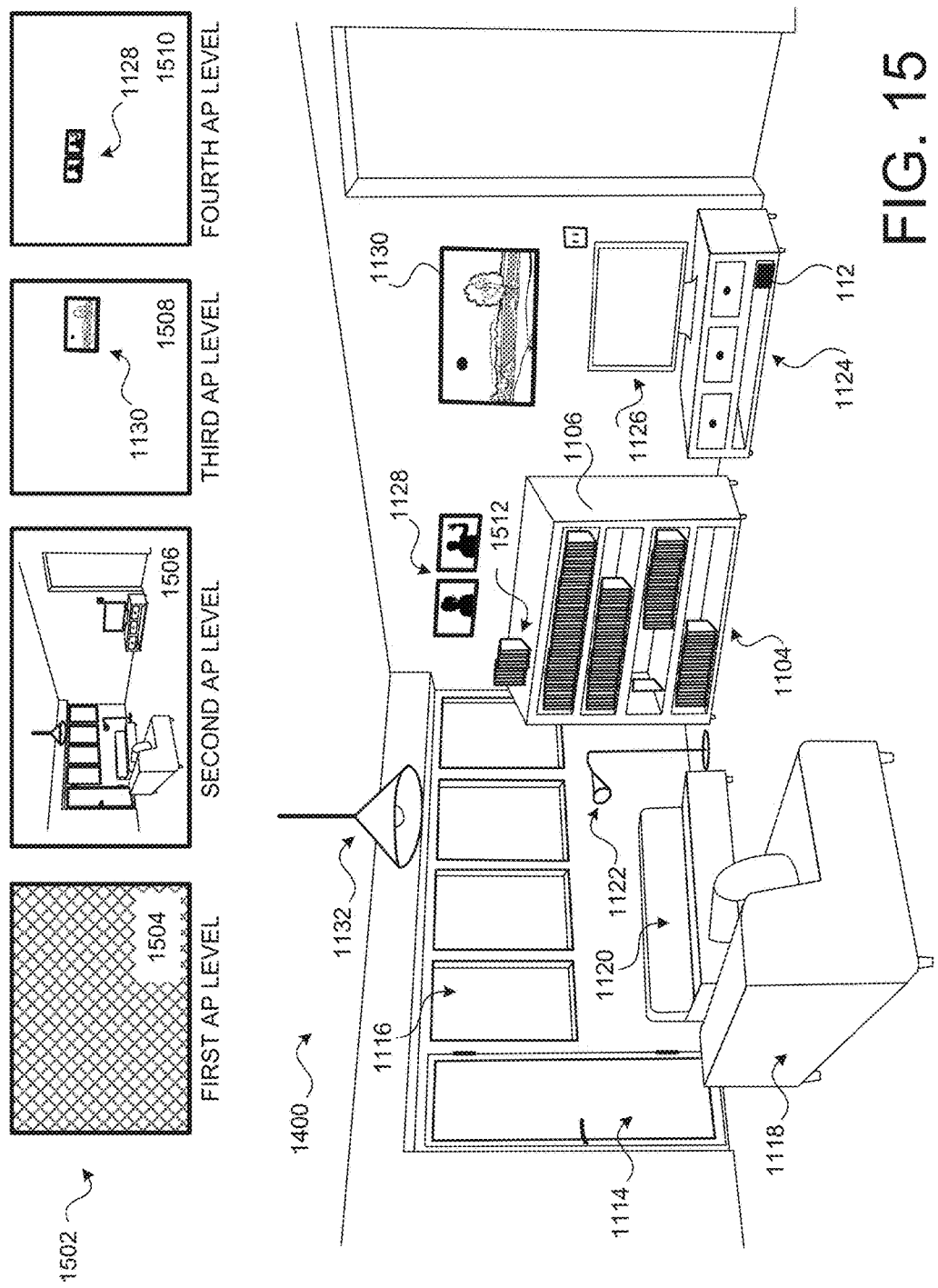
FIG. 15 conceptually illustrates how an example embodiment of the video community system may control presentation of the background based on different levels of guest access privileges.

FIG. 15 conceptually illustrates how an example embodiment of the video community system 100 may control presentation of the background of a presented virtual environment 1400 based on different levels of guest access privilege rights. A plurality of background skins 1502 may be stored in the owner's bookshelf case storage medium 1204 that are associated with a particular owner 1102.

In this simplified example, the lowest level access privilege right is associated with a first access privilege (AP) level skin 1504. If the visiting guest 1402 is associated with the first and lowest level of access privilege rights, the presented virtual environment 1400 is generated by the video community system 100 limited by retrieving the skin 1504 (represented as a solid color having a cross-hatched pattern) and the owner's personalized virtual bookshelf case 1106 with their virtual DVD collection 1104. That particular visiting guest 1402 will only see the skin 1504 and the virtual bookshelf case 1106. As noted above, the owner 1102 may have opted to limit the virtual DVDs 1110 that are shown to this particular guest 1402.

A next higher level access privilege right is associated with a second access privilege (AP) level skin 1506. If the visiting guest 1402 is associated with the second and higher level access privilege right, the virtual environment 1400 presented by the video community system 100 is simply generated by retrieving the skin 1506 (represented as a limited image of the physical environment 1100, with selected background object omitted) and the owner's personalized virtual bookshelf case 1106 with their virtual DVD collection 1104. As noted above, the owner 1102 may have opted to limit the virtual DVDs 1110 that are shown to this particular guest 1402. Here, the personal pictures 1128 and painting 1130 hanging on the wall of the physical environment 1100 in FIG. 11 are not presented to this particular guest 1402. If the painting 1130 is a particularly valuable piece of art, this particular guest 1402 would not know that the owner 1102 had a valuable piece of art (and presumably, would not be enticed to rob the owner 1102 of the painting 1130.) Further, the visiting guest 1402 would not see the family pictures 1128 (and thus, would not become aware of personal information that the owner 1102 wishes to keep confidential).

A third higher level access privilege is associated with a third access privilege (AP) level skin 1508. If the visiting guest 1402 is associated with the third and higher level access privilege right, the virtual environment 1400 presented by the video community system 100 is simply generated by retrieving the skin 1506 (represented as a limited image of the physical environment 1100), the skin 1508 (with selected painting 1130 background object), and the owner's personalized virtual bookshelf case 1106 with their virtual DVD collection 1104. The skin 1508 may be overlaid on top of the skin 1506, thereby conserving data storage requirements at the owner's bookshelf case storage medium 1204. (Alternatively, a single skin corresponding to the skins 1506 and 1508 may be generated and separately saved by the video community system 100.) Here, the personal pictures 1128 that are illustrated as hanging on the wall of the physical environment 1100 in FIG. 11 are not presented to this particular guest 1402.

Finally, a highest level access privilege is associated with a fourth access privilege (AP) level skin 1510. If the visiting guest 1402 is associated with the highest level access privilege right, the virtual environment 1400 presented by the video community system 100 is simply generated by retrieving the skin 1506, the skin 1508, and the skin 1510 (with selected personal pictures 1128), and the owner's personalized virtual bookshelf case 1106 with their virtual DVD collection 1104. The skins 1508 and 1510 may be overlaid on top of the skin 1506, thereby further conserving data storage requirements at the owner's bookshelf case storage medium 1204. (Alternatively, a single skin corresponding to the skins 1506, 1508 and 1510 may be generated and separately saved.) Here, the personal pictures 1128 and the painting 1130 that are illustrated as hanging on the wall of the physical environment 1100 in FIG. 11 are presented to this particular guest 1402.

One skilled in the art appreciates that any number of backgrounds may be defined based on any number of specified levels of access privilege rights. Thus, the owner 1102 is able to fully control what a particular visiting guest 1402 "sees" when the owner's personalized virtual bookshelf case 1106 and their virtual DVD collection 1104 is viewed by the visiting guest 1402 who is seeing the presented virtual environment 1400.

Further, the owner 1102 may similarly control presentation of particular virtual DVDs 1110 to the visiting guest 1402 based on the guest's level of access privilege rights. FIG. 15 conceptually illustrates a plurality of virtual DVDs 1512 located on the top of the owner's personalized virtual bookshelf case 1106. Here, the guest 1402 presumably has the highest example level of access privileges (since they can also view the personal pictures 1128 and the painting 1130 as illustrated in FIG. 15).

During the setup process, the owner 1102 may preview the virtual environment 1400 that will be presented to a visiting guest 1402. The owner 1102 may then specify a particular access privilege right. Then, the owner 1102 may identify or otherwise indicate which background objects and/or particular virtual DVDs 1110 that are to be omitted during presentation to a guest 1402 who has the associated access privilege right. For example, the owner 1102 may be setting up the above-described third level access privilege right (wherein the personal pictures 1128 are not to be presented to the visiting guest 1402). Here, the owner 1102 virtually grasps, points to, or touches the personal pictures 1128. Then, the video community system 100 identifies these background objects and removes these objects from that particular skin. Data corresponding to the generated skin is associated with the owner 1102 and the specified access privilege right, and is then stored as data into the owner's bookshelf case storage medium 1204. Skins for other different levels of access privileges are similarly created by the owner 1102.

Some embodiments may be configured to limit access to, and even limit viewing of, particular virtual DVDs 1110 based on some predefined criteria or attribute of a visiting guest 1402. For example, the age of the guest 1402 may be determinable. Individual ones of the thematic content events (corresponding to the virtual DVDs 1110) will most likely include a parental guidance rating as part of the available supplemental information. The age of the guest 1402 can be compared to age ranges associated with the parental guide rating of the virtual DVDs 1110 in the virtual DVD collection 1104 of the owner 1102. If the age of the visiting guest 1402 is limiting, those particular virtual DVDs 1110 may be omitted such that that visiting guest 1402 does not see them. Additionally, the virtual DVDs 1110 may be arranged on the shelves of the owner's virtual bookshelf case 1106. For example, more mature thematic content events may have their corresponding virtual DVDs 1110 located on the top shelves of the virtual bookshelf case 1106 (and thus be presumably out of reach and/or view of a child guest 1402).

In some embodiments, the visiting guest 1402 may select one of the owner's virtual DVDs 1110 for closer inspection. When the guest 1402 virtually grasps, points to, or touches one of the virtual DVDs 1110, that virtual DVD 1110 is "pulled" from the shelf for inspection. Here, the graphics 1302 is then presented to the guest 1402. The graphics 1302 indicates the owner's prior community interactions within the video community system. Here, the presented graphics 1302 indicates a plurality of descriptive identifiers 1304 to indicate these interactions of the owner 1102 with respect to the selected virtual DVD 1110. Selectable virtual buttons 1306 are shown adjacent to each of the descriptive identifiers 1304.

The virtual buttons 1306 are selectable, in a virtual manner, by the guest 1402 who may gesture with their hand 1112 to virtually actuate one of the selectable virtual buttons 1306. The guest 1402 might grasp, point to, or touch the selectable button 1306 to simulate selection and actuation of a virtual button 1306 of interest. In response to a selection of one of the virtual buttons 1306, the associated additional supplemental information that is associated with the selected virtual button 1306 is retrieved and/or is then visually presented to the guest 1402. That is, additional supplemental information corresponding to selected item adjacent to the selectable button 1306 is retrieved and is communicated from the video community system 100 to the guest's electronic device, wherein the additional supplemental information corresponds to a specific prior community action by the owner 1102 (such as, but not limited to, member dialogue videos, rant videos, endorsement videos, proof videos and/or other interaction associated with that particular owner 1102 and the specified thematic content event corresponding to the selected virtual DVD 1110). Then, the specific prior community action (such as a prior stored member dialogue video or the like created by the owner 1102) is presented to the guest 1402 based on the received additional supplemental information.

For the viewing guest 1402, the presented community action of the owner 1102 may be presented using a format that simulates the owner 1102 being in the presented virtual environment 1400. That is, the owner 1102 is virtually perceived as coming into the presented virtual environment 1400 and then presenting their community action.

Further, in some embodiments, the guest 1402 is still able to view the virtual DVD collection 1104 on the virtual bookshelf case 1106 behind the virtual image of the owner 1102 who is virtually presenting their community interaction. In some situations, the virtual DVDs 1110 of the virtual DVD collection 1104 may remain static during the virtual image of the owner 1102 who is virtually presenting their community interaction. However, some embodiments may be further configured to indicate other ones of the virtual DVDs 1110 in the virtual DVD collection 1104 if and when they are discussed, referred to, or are otherwise identified by the owner 1102 who is virtually presenting their community interaction. For example, but not limited to, the owner 1102 may be discussing several different virtual DVDs 1110 in their virtual DVD collection 1104 while a proof video created by the owner 1102 is being presented to the guest 1402. Here, as the owner 1102 mentions or refers to a particular one of the virtual DVDs 1110, that particular virtual DVD 1110 may be indicated to the guest 1402. Accordingly, the guest may later select that particular virtual DVD 1110 for inspection. Such virtual DVDs 1110 may be indicated in any suitable manner, such as by changing a brightness intensity level of the graphic image of the virtual DVD 1110, by adjusting its position in the virtual bookshelf case 1106, and/or by presenting a graphics 1302 for that particular virtual DVD 1110. The indicators and/or the graphics 1302 may be temporarily presented for some predefined duration and/or may be presented while the owner 1102 is discussing or referring to that particular virtual DVD 1110.

In some embodiments, once the visiting guest 1402 is viewing the virtual DVD collection 1104 of the owner 1102, the guest 1402 may reorder, re-organize, or limit the number of virtual DVDs 1110 shown in the presented virtual environment 1400. For example, the guest 1402 may be interested in learning about action movies that the owner 1102 has added into their virtual DVD collection 1104. Here, the guest 1402 may sort the virtual DVDs 1110 based on an action movie category that is associated with the corresponding thematic content event. All action movie type virtual DVDs 1110 may then be grouped together in the virtual bookshelf case 1106. Additionally, not-action type virtual DVDs 1110 may be removed from the virtual bookshelf case 1106. When the visiting guest 1402 concludes their visit, any changes made to the virtual DVD collection 1104 are not saved. Thus, when the owner 1102 returns to the virtual environment to view their virtual DVD collection 1104, the arrangement of the virtual DVDs 1110 remains unchanged from their previous visit. Further, later visiting guests 1402 will initially see the virtual DVD collection 1104 as the owner 1102 had originally intended.

The visiting guest 1402, in some situations, is able to add a new virtual DVD 1110 for any selected thematic content event that is of interest to the guest 1402. To add a new virtual DVD 1110 to their virtual DVD collection 1104, the guest 1402 specifies the identifier of a particular thematic content event that is not part of the owner's virtual DVD collection 1104 to the video community system 100. The video community system 100 retrieves information needed to render a virtual DVD 1110 associated with the specified thematic content event from the virtual DVD catalogue storage medium 1206.

This virtual DVD 1110 and the associated information may be communicated to the HMD 1108 or another device, such as the media device 112. The graphics 1302 is then presented to the guest 1402. Thus, the guest 1402 sees an image of the virtual DVD 1110 that has been generated for the specified thematic content event that they have specified. Depending upon the embodiment, the graphics 1302 may be presented as a pop-up window or the like.

The visiting guest 1402 is then able to add a new virtual DVD 1110 to the owner's virtual DVD collection 1104. The new virtual DVD 1110, and optionally any associated information relating to community interactions by the guest 1402 associated with the new virtual DVD 1110, is communicated to the video community system 100 for saving into the owner's virtual DVD collection 1104. At a later time, the owner 1102 sees an image of the new virtual DVD 1110 that has been generated for the specified thematic content event that the guest 1402 have specified. Depending upon the embodiment, the graphics 1302 may be presented as a pop-up window or the like for this new virtual DVD 1110.

Figure 16:
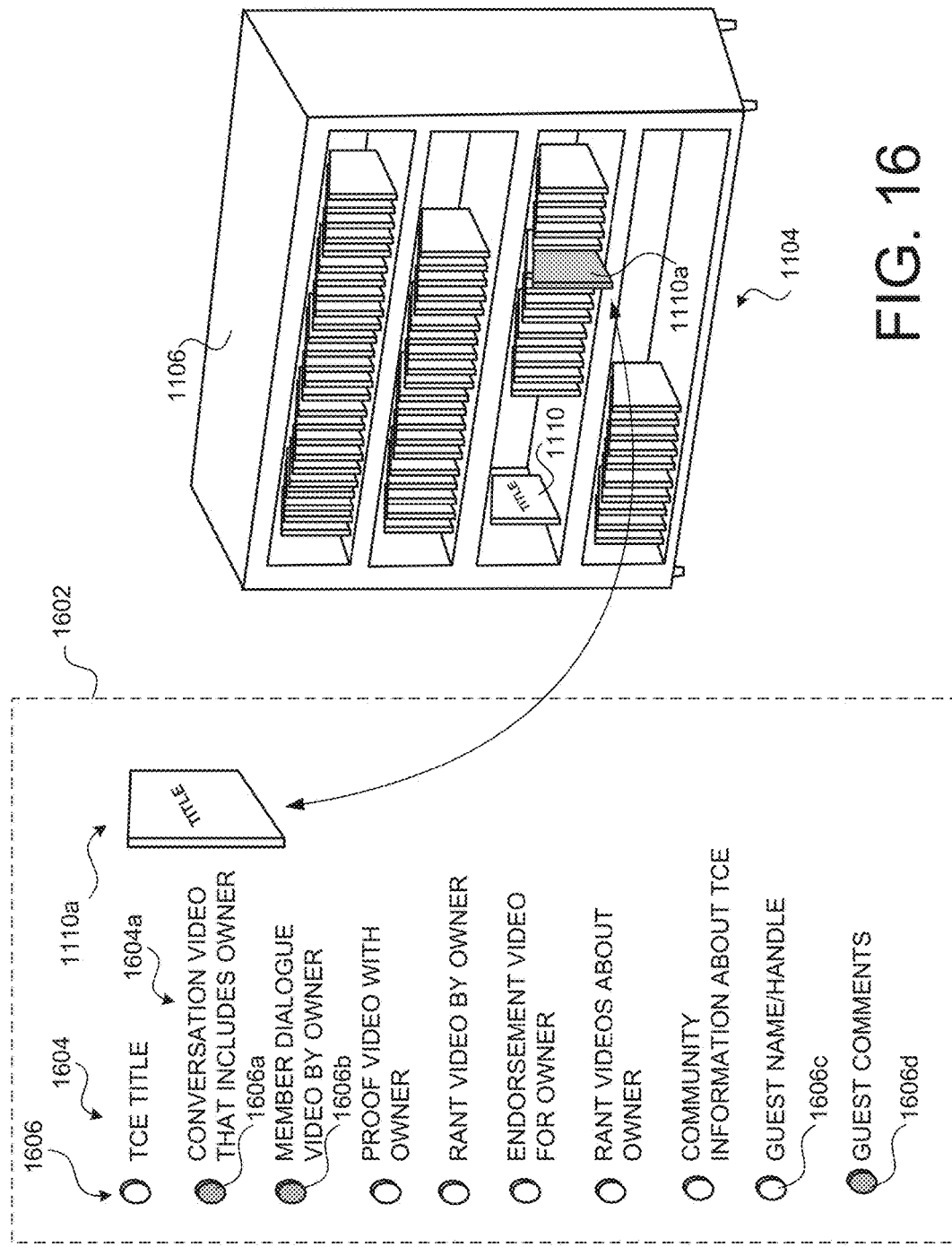
FIG. 16 conceptually illustrates an example image that may be presented to the owner when they are managing their virtual DVD collection subsequent to a visit by the guest.

FIG. 16 conceptually illustrates an example image that may be presented to the owner 1102 when they are managing their virtual DVD collection 1104 subsequent to a visit by the guest 1402. Initially, when the owner 1102 begins to manage their virtual DVD collection 1104, a virtual image of their virtual bookshelf case 1106 is presented based on the current version of the data saved at the owner's bookshelf case storage medium 1204 by the video community system 100. In the various embodiments, during a visit by a guest 1402, a "fingerprint" of the visiting guest 1402 is left on each of the individual virtual DVDs 1110 that has been "touched" by that guest 1402. Accordingly, when the visiting guest 1402 leaves the presented virtual environment 1400 (signs out or otherwise ends their "visit"), activities performed by the guest 1402 which have been monitored are stored into the owner's bookshelf case storage medium 1204 for that particular hosting owner 1102. Each time a different guest 1402 visits the virtual environment 1400 of that owner 1102, the data stored in the owner's bookshelf case storage medium 1204 for that particular owner is updated. Accordingly, when the owner 1102 finally returns to manage their virtual DVD collection 1104, they are presented visual information so that they can understand "how" visited and what that visitor did during their visit.

The owner 1102 is initially presented an image of their virtual bookshelf case 1106 holding their virtual DVD collection 1104 (without the graphics 1602). Any virtual DVD 1110 "touched" by a visiting guest 1402 is visually identified using a "fingerprint" that is visible on the virtual DVDs 1110. The "fingerprint" is defined herein as a visual indicator that enables the viewing owner 1102 to visually discriminate between a virtual DVD 1110 that has been "touched" by a visiting guest 1402 and the other virtual DVDs 1110 of the virtual DVD collection 1104. Here, a "touch" by a visiting guest 1402 is defined when the guest 1402 performs any operation on a virtual DVD 1110. One such example operation is described above and is illustrated in FIG. 14. Any operation on a virtual DVD 1110 that is performed by a guest 1402 results in the generation of an associated "fingerprint" that is saved to inform the owner 1102 or the activities of the visiting guest 1402.

To conceptually illustrate a fingerprint, the example virtual DVD 1110*a* is indicated using a shading. Further, the position or the virtual DVD 1110*a* has been changed so that the virtual DVD 1110*a* appear to protrude (extending outwardly from) the adjacent virtual DVDs 1110. That is, the virtual DVD 1110*a* appears to be partially pulled out from the other surrounding virtual DVDs 1110. Other indicators may be used to visually indicate the virtual DVD 1110*a*. For example, a noticeable color and/or other markings may be used to fingerprint the virtual DVD 1110*a*. Alternatively, or additionally, the apparent size of the virtual DVD 1110*a* may be modified (appear larger or smaller that adjacent virtual DVDs 1110). In some embodiments, the virtual DVD 1110*a* may be presented as being pushed back or inward (such that the adjacent virtual DVDs 1110 protrude beyond the extent of the virtual DVD 1110*a*).

As conceptually illustrated, the owner 1102 readily appreciates that "someone" has visited their virtual environment 1400, and as "touched" the virtual DVD 1110*a* (here, because the virtual DVD 1110*a* is depicted as protruding outward from the other virtual DVDs 1110 and because there is a shading of the virtual DVD 1110*a*). Presumably, the owner 1102 becomes curious about what has happened in their virtual environment 1400.

For brevity, only a single virtual DVD 1110*a* is illustrated as having been previously touched by the visiting guest 1402. However, all of the virtual DVDs 1110 that have been touched by that particular visiting guest 1402 would be similarly identified as the virtual DVD 1110*a*.

Further, a plurality of different guests 1402 may have visited the virtual environment 1400. Any of the virtual DVDs 1110 touched by those guests are similarly identified to the owner 1102. Further, some embodiments may use different indicators to differentiate virtual DVDs 1110 touched by different visiting guests 1402. For example, a first color may be associated with a first visiting guest 1402 and a second color may be associated with a second visiting guest 1402. Thus, the owner 1102 readily appreciates that there have been two different visiting guests 1402 since a plurality of different touched virtual DVDs 1110 are shown using two different colors. Any number of different colors, or other indicators such as shading and/or fill patterns, may be used to indicate different visiting guests 1402.

Further, some embodiments may repeatedly use the same color, shading and/or fill pattern to identify a particular visiting guest 1402. For example, the first visiting guest 1402 may be a close friend or family member that visits the virtual environment 1400 of the owner 1102 on periodic basis, such as weekly or even daily. The virtual DVD 1110 may, based on the repeated visits, learn that this particular guest 1402 is a repeat visitor, and assign a particular color to that guest 1402. Alternatively, or additionally, the owner 1102 may specify a color, shading and/or fill pattern that is to be associated with the repeat visiting guest 1402. This association between repeating visiting guests 1402 and the indicators that are used to identify that particular guest 1402 may be stored in the owner's bookshelf case storage medium 1204 for that particular owner 1102.

Upon seeing the virtual DVD 1110*a*, the owner 1102 may wish to find out more about the visiting guest 1402 who has touched the virtual DVD 1110*a*, and what operations or actions the visiting guest 1402 may have done. When the owner 1102 virtually grasps, points to, or touches the virtual DVD 1110*a*, that virtual DVD 1110*a* is "pulled" from the shelf for inspection. Here, the graphics 1602 is then presented to the owner 1102.

The graphics 1602 indicates the activities (operations) of the visiting guest 1402. Here, the presented graphics 1302 indicates a plurality of descriptive identifiers 1604 to indicate interactions of the visiting guest 1402 with the virtual DVD 1110*a*. Selectable virtual buttons 1606 are shown adjacent to each of the descriptive identifiers 1604. Related activities of the visiting guest 1402 to the virtual DVD 1110*a* may be, in an example embodiment, indicated by the presentation of a associated virtual button 1606.

The virtual buttons 1606 are selectable, in a virtual manner, by the owner 1102. The owner 1102 may gesture with their hand 1112 to virtually actuate one of the selectable virtual buttons 1606. The owner 1102 might grasp, point to, or touch the selectable button 1606 to simulate selection and actuation of a virtual button 1606 of interest. In response to a selection of one of the virtual buttons 1606, the associated supplemental information associated with the selected virtual button 1606 is retrieved and may then be optionally visually presented to the owner 1102.

For example, the owner 1102 visually sees that the descriptive identifier 1604*a* indicating "Conversation Video That Includes Owner" is colored. Therefore, the owner 1102 understands that the visiting guest 1402 looked at one or more conversation videos associated with the virtual DVD 1110*a*. If the owner 1102 selects the virtual button 1606*a*, then the particular conversation videos viewed by the visiting guest 1402 may be further identified and/or may be shown to the owner 1102.

Similarly, the owner 1102 visually sees that the descriptive identifier 1604*b* indicating "Member Dialogue video by Owner" is colored. Therefore, the owner 1102 understands that the visiting guest 1402 looked at one or more member dialogue videos associated with the virtual DVD 1110*a*. If the owner 1102 selects the virtual button 1606*b*, then the particular member dialogue videos viewed by the visiting guest 1402 may be further identified and/or may be shown to the owner 1102.

Further, the owner 1102 visually sees that the other descriptive identifiers 1604 do not have their associated virtual buttons 1606 indicating some activity by the visiting guest 1402. For example, the owner 1102 understands that the visiting guest 1402 did not view any proof videos of the owner 1102, rant videos of the owner 1102, endorsement videos of the owner 1102, community information about the owner 1102, or the title of the thematic content event (since there is no color, shading and/or fill pattern representing those particular associated virtual buttons 1606). Various embodiments may have more (and different) descriptive identifiers 1604 and associated virtual buttons 1606, and/or may omit one or more of the illustrated descriptive identifiers 1604 and their associated virtual buttons 1606. Any suitable descriptive identifier 1604 may be defined and may be associated with nay possible activity that may be done by a visiting guest 1402 during their visit to the owner's virtual environment 1400.

Further, one of the descriptive identifiers 1604 may indicate the name or other identifier of the visiting guest 1402. Here, a virtual button 1606*c* is provided such that if selected by the owner 1102, the owner is "transported" to the virtual environment 1400 of the visiting guest 1402. That is, the owner 1102 views the presented virtual environment 1400 which shows the virtual bookshelf case 1106 and the virtual DVD collection 1104 of the visiting guest 1402.

In some instances, the visiting guest 1402 may have left a note or other comment pertaining to the thematic content event (such as video or audio clips, and/or textual messages made by the visiting guest 1402) that they wish to be seen by the owner 1102. Here, the coloring of the presented virtual button 1606*d* indicates that the visiting guest 1402 has made a comment pertaining to the virtual DVD 1110*a*. When the owner 1102 selects the virtual button 1606*d*, the owner 1102 is presented the comment(s) made by the visiting guest 1402.

Figure 17:
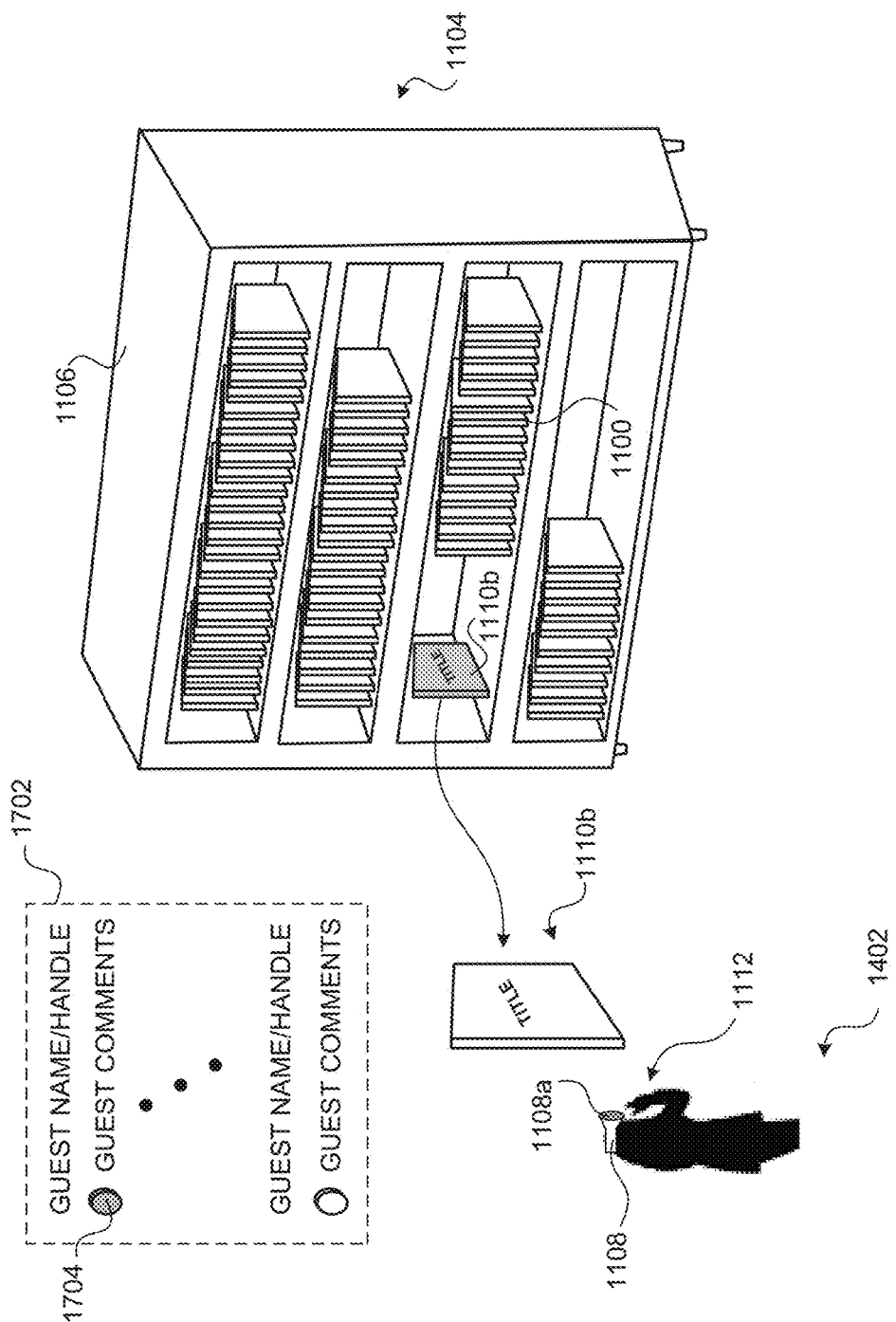
FIG. 17 conceptually illustrates an example image wherein a visiting guest "leaves" a new virtual DVD on the virtual bookshelf case of the owner.

FIG. 17 conceptually illustrates an example image that may be presented to the a visiting guest 1402 when they are viewing the virtual DVD collection 1104 of the owner, and wish to "leave" a new virtual DVD 1110*b* on the virtual bookshelf case 1106 of the owner 1102. In some embodiments, any visiting guest 1402 may leave a new virtual DVD 1110*b*, or several new virtual DVDs 1110*b*, on the virtual bookshelf case 1106. Accordingly, when the owner 1102 later returns to manage their virtual DVD collection 1104, they will see the new virtual DVD 1110*b* that was left by the visiting guest 1402.

The visiting guest 1402, in one situation, may specify a title of a thematic content event, similar to the means described herein wherein the owner 1102 specifies a new virtual DVD 1110 that is to be added into their virtual DVD collection 1104. In response to identifying the new virtual DVD 1110*b*, an example embodiment, the information and the virtual DVD 1110*b* are retrieved by the video community system 100. Then, an image of the virtual DVD 1110*b* is presented to the visiting guest 1402 on the display 1108*a* of their HMD 1108.

The visiting guest 1402 may then use their hand 1112 to virtually grasp, point to, or otherwise touch the virtual DVD 1110*b*. The guest 1402 may then move their hand 1112 to place the new virtual DVD 1110*b* onto a particular shelf at a particular location on the virtual bookshelf case 1106. Alternatively, a default location or predefined location may be reserved for a new virtual DVD 1110*b* such that when the owner 1102, they will readily recognize that the new virtual DVD 1110*b* have been added to their virtual DVD collection 1104.

Alternatively, or additionally, the visiting guest 1402 may switch from the presented virtual environment 1400 of the owner 1102 to their own virtual environment 1400. The visiting guest 1402 can then select the new virtual DVD 1110*b* from their own personal virtual DVD collection 1104, and then switch back to the presented virtual environment 1400 of the owner 1102. The visiting guest 1402 can then leave their virtual DVD 1110*a* on the virtual bookshelf case 1106 of the owner 1102.

When the visiting guest 1402 has placed the new virtual DVD 1110*b* onto the virtual bookshelf case 1106, the identity of the visiting guest 1402, and information associated with the thematic content event and the virtual DVD 1110*b*, are communicated to and stored at the owner's bookshelf case storage medium 1204 for the owner 1102. When the owner 1102 later views their virtual bookshelf case 1106 and notice the presence of the new virtual DVD 1110*b*, the owner 1102 is able to learn about the new virtual DVD 1110*b*. For example, the owner 1102 may then use their hand 1112 to virtually grasp, point to, or otherwise touch the new virtual DVD 1110*b*. As described above and as conceptually illustrated in FIG. 13, a larger size virtual image of the new virtual DVD 1110*b*, and any available supplemental information pertaining to the owner 1102 and/or the visiting guest 1402, may then be presented to the owner 1102. Further, the owner 1102 may select that new virtual DVD 1110*b* for presentation and/or for recording using their media device 112 (or any other electronic device with a display).

Additionally, or alternatively, when the owner 1102 uses their hand 1112 to virtually grasp, point to, or otherwise touch the new virtual DVD 1110*b*, the graphics 1702 may be presented. Here, the identity of the visiting guest 1402 is revealed to the owner 1102. Further, the graphics 1702 may indicate if the visiting guest 1402 has left any comments that they would like the owner 1102 to become aware of. The owner 1102 can select the virtual button 1704, and the comments (video or audio clips, and/or textual messages) made by the visiting guest 1402 will then be presented to the owner 1102.

It should be emphasized that the above-described embodiments of the video community system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for graphically presenting information about thematic content events, the method comprising:
   receiving a request, at a video community system, from an electronic device of one of an owner or a guest,
      wherein the request is received from the electronic device of the owner or the guest via a communication network that the electronic device and the video community system are communicatively coupled to, and
      wherein the request is for presentation of the owner's personal virtual digital video disc (DVD) collection on a display of the electronic device;
   communicating data corresponding to the owner's personal virtual DVD collection from the video community system to the electronic device, wherein the communicated data comprises:
      first data that is used to render an image of a virtual bookshelf case of the owner, wherein the plurality of virtual DVDs are presented on at least one shelf of the virtual bookshelf case;
      second data that is used to render an image of a plurality of individual virtual DVDs that are included in the owner's personal virtual DVD collection; and
      third data corresponding to an owner's prior community interactions within the video community system; and
   presenting an image on the display to the requesting owner or guest, wherein the presented image comprises:
      a first image corresponding to a graphical representation of the virtual bookshelf case; and
      a plurality of second images each corresponding to a graphical representation of one of a plurality of virtual DVDs in the owner's personal virtual DVD collection.

2. The method of claim 1, wherein the electronic device is a head mounted display (HMD) that is worn on a head of the owner or the guest, and wherein presenting the image comprises:

presenting a three-dimensional virtual graphical representation of the virtual bookshelf case and the plurality of virtual DVDs.

3. The method of claim 2, wherein the display of the HMD is partially transparent so that the owner views objects in a physical environment concurrently with their viewing of the virtual graphical representation of their virtual bookshelf case and the plurality of virtual DVDs, and wherein the first data that is used to render the image of the virtual bookshelf case includes location information corresponding to a pre-defined location of the virtual bookshelf case in the physical environment, the method further comprising:
  determining a current orientation of the HMD in the physical environment,
  wherein the graphical representation of the virtual bookshelf case is presented on the display of the HMD at a orientation defined by the location information.

4. The method of claim 3, wherein the first data that is used to render the image of the virtual bookshelf case includes orientation information corresponding to a pre-defined orientation of the virtual bookshelf case in the physical environment, the method further comprising:
  determining a current orientation of the HMD in the physical environment,
  wherein the graphical representation of the virtual bookshelf case is presented on the display of the HMD at the orientation defined by the orientation information.

5. The method of claim 1, wherein after presenting the image of the virtual bookshelf case on the display to the requesting owner, the method further comprises:
  receiving at the video community system an identifier of a thematic content event,
    wherein the identifier is specified by the owner, and
    wherein the identifier is communicated from the electronic device to the video community system;
  identifying, at the video community system, a new virtual DVD associated with the received identifier of the thematic content event,
    wherein the new virtual DVD is one of a plurality of virtual DVDs that are each uniquely associated with a plurality of different thematic content events, and
    wherein data is configured to graphically render images of the plurality of virtual DVDs is stored at the video community system;
  communicating fourth data corresponding to the new virtual DVD from the video community system to the electronic device, wherein the fourth data corresponding to the new virtual DVD is used to render an image of the new virtual DVD on the display;
  presenting a large size image of the new virtual DVD on the display to the owner, wherein the large size image of the new virtual DVD is larger than a size of each of the plurality of virtual DVDs that are presented on the virtual bookshelf case.

6. The method of claim 5, wherein communicating the data corresponding to the new virtual DVD further comprises:
  communicating in the third data new supplemental information corresponding to the owner's prior community interactions within the video community system with respect to the identified thematic content event; and
  concurrently presenting the new supplemental information with presentation of the large size image of the new virtual DVD,
    wherein the owner is able to concurrently view both the large size image of the new virtual DVD and the new supplemental information corresponding to the owner's prior community interactions within the video community system with respect to the identified thematic content event.

7. The method of claim 6, wherein the new supplemental information corresponding to the owner's prior community interactions within the video community system with respect to the identified thematic content event comprises information that identifies at least one selected from the group consisting of:
  a conversation video about the identified thematic content event that includes a first member dialogue video created by the owner;
  a second member dialogue video about the identified thematic content event previously created by the owner that was not used in the conversation video;
  a rant video previously created by the owner;
  an endorsement video that endorses the owner; and
  a proof video previously created by the owner.

8. The method of claim 6, wherein after presenting both the large size image of the new virtual DVD and the new supplemental information corresponding to the owner's prior community interactions within the video community system with respect to the identified thematic content event, the method further comprises:
  receiving, at the video community system, a selection from the owner to store the new virtual DVD into the owner's personal virtual DVD collection,
  associating the data corresponding to the new virtual DVD and the new supplemental information corresponding to the owner's prior community interactions within the video community system with respect to the identified thematic content event with an identifier of the owner; and
  storing the data corresponding to the new virtual DVD and the new supplemental information in a memory medium at the video community system.

9. The method of claim 8, further comprising
  ending presentation of the large size image of the new virtual DVD and the new supplemental information; and
  presenting a small size image of the new virtual DVD,
    wherein the small size image of the new virtual DVD is the same size and the other ones of the plurality of virtual DVDs, and
    wherein the small size image of the new virtual DVD located adjacent to at least one of the plurality of virtual DVDs being presented on the virtual bookshelf case.

10. The method of claim 6, wherein the new supplemental information corresponding to the owner's prior community interactions within the video community system with respect to the identified thematic content event is presented as a list of a plurality of items, and wherein after presenting both the image of the new virtual DVD and the information corresponding to the owner's prior community interactions within the video community system with respect to the identified thematic content event, the method further comprises:
  receiving, at the video community system, a selection of at least one item indicated in the presented new supplemental information,
  retrieving additional supplemental information corresponding to the selected item, wherein the additional supplemental information corresponds to a specific prior community action by the owner;
  communicating the additional supplemental information from the video community system via a communication network to the electronic device; and presenting the specific prior community action to the owner based on the received additional supplemental information.

11. The method of claim 1, wherein the received request is from the guest, and wherein receiving the request further comprises:
receiving an identifier that identifies the owner.

12. The method of claim 11,
wherein communicating the data corresponding to the owner's personal virtual DVD collection from the video community system to the electronic device of the guest further comprises:
communicating fourth data corresponding to an image of an owner's physical environment, and
wherein presenting the image on the display to the requesting guest further comprises:
presenting a background image to the guest based on the fourth data, wherein the background image shows a plurality of background objects in the owner's physical environment; and
presenting a foreground image over the background image, wherein the foreground image includes the first image corresponding to the graphical representation of the virtual bookshelf case and the plurality of second images corresponding to the plurality of virtual DVDs in the owner's personal virtual DVD collection.

13. The method of claim 12, further comprising:
determining, at the video community system, a guest access privilege right based on the identity of the guest;
selecting the background image from a plurality of background images, wherein the presented background image is selected based on the determined guest access privilege right,
wherein a first background image of a plurality of background images omits an image of a personal object of the owner's physical environment and is associated with a first level of guest access privilege rights,
wherein a second background image of the plurality of background images includes the image of the personal object and is associated with a second level of guest access privilege rights,
wherein the second level of guest access privilege rights is higher than the first level of guest access privilege rights,
wherein the first background image is selected when the determined guest access privilege right corresponds to the first level of guest access privilege rights, and
wherein the second background image is selected when the determined guest access privilege right corresponds to the second level of guest access privilege rights.

14. The method of claim 13, wherein the first background image is a solid color.

15. The method of claim 13, further comprising:
receiving, at the video community system, information from the owner that defines the guest access privilege right for an identified guest, wherein the guest is identified based on the identity of the guest; and
storing the defined guest access privilege right and the associated identifier of the guest in the data corresponding to the owner's personal virtual DVD collection.

16. The method of claim 12, further comprising:
determining, at the video community system, a guest access privilege right based on the identity of the guest, wherein the determined guest access privilege right is associated with one of a first level of guest access privilege rights and a second level of guest access privilege rights, and
wherein the second level of guest access privilege rights is higher than the first level of guest access privilege rights;
selecting a first plurality of virtual DVDs from the plurality of individual virtual DVDs that are included in the owner's personal virtual DVD collection when the determined guest access privilege right corresponds to the first level of guest access privilege rights,
selecting a second plurality of virtual DVDs from the plurality of individual virtual DVDs that are included in the owner's personal virtual DVD collection when the determined guest access privilege right corresponds to the second level of guest access privilege rights, wherein the second plurality of virtual DVDs includes the first plurality of virtual DVDs and at least one other virtual DVD that is excluded from the first plurality of virtual DVDs;
wherein the second data that is used to render an image of a plurality of individual virtual DVDs is the first plurality of virtual DVDs when the determined guest access privilege right corresponds to the first level of guest access privilege rights, and
wherein the second data that is used to render an image of the plurality of individual virtual DVDs is the second plurality of virtual DVDs when the determined guest access privilege right corresponds to the second level of guest access privilege rights.

17. The method of claim 11, further comprising:
receiving a selection by the guest of one of the plurality of virtual DVDs in the owner's personal virtual DVD collection;
presenting a large size image of the selected virtual DVD on the display to the guest, wherein the large size image of the new virtual DVD is larger than a size of each of the plurality of virtual DVDs that are presented on the virtual bookshelf case;
communicating in the third data supplemental information corresponding to the owner's prior community interactions within the video community system with respect to the selected virtual DVD; and
concurrently presenting the supplemental information with presentation of the large size image of the new virtual DVD,
wherein the guest is able to concurrently view both the large size image of the new virtual DVD and the supplemental information corresponding to the owner's prior community interactions within the video community system with respect to the identified thematic content event.

18. The method of claim 17, further comprising:
communicating fingerprint information from the electronic device of the guest to the community member system in response to the guest's selection of the virtual DVD, wherein the fingerprint information includes information that identifies the selected virtual DVD and the identity of the guest; and
storing the fingerprint information at the community member system, wherein when the owner later requests presentation of the owner's personal DVD collection on their display, the method further comprises:
communicating the fingerprint information from the community member system to the display of the owner; and changing a characteristic of the presented image of the virtual DVD identified by the fingerprint such that the owner is able to identify the virtual DVD selected by the guest from the other ones of the plurality of virtual DVDs in the owner's personal virtual DVD collection.

19. The method of claim 18, wherein the fingerprint information includes supplemental information that identifies at least one interaction of the guest with respect to the selected virtual DVD, the method further comprising:
receiving a selection by the owner of the virtual DVD selected by the guest;
presenting a large size image of the selected virtual DVD on the display to the owner, wherein the large size image of the new virtual DVD is larger than a size of each of the plurality of virtual DVDs that are presented on the virtual bookshelf case; and
concurrently presenting supplemental information with presentation of the large size image of the new virtual DVD,
wherein the owner is able to concurrently view both the large size image of the new virtual DVD and the supplemental information identifies the at least one interaction of the guest with respect to the selected virtual DVD.

20. The method of claim 1, wherein communicating data corresponding to the owner's personal virtual DVD collection further comprises:
concurrently communicating the first data, the second data and the third data to the electronic device of the owner or the guest.

21. The method of claim 11, further comprising:
receiving, at the video community system from the electronic device of the guest, an identifier of a new thematic content event specified by the guest;
identifying, at the video community system, a new virtual DVD associated with the received identifier of the thematic content event,
wherein the new virtual DVD is one of a plurality of virtual DVDs that are each uniquely associated with a plurality of different thematic content events, and
wherein data is configured to graphically render images of the plurality of virtual DVDs is stored at the video community system; and
adding the new virtual DVD into the virtual DVD collection of the owner.

\* \* \* \* \*

UNITED STATES PATENT AND TRADEMARK OFFICE
CERTIFICATE OF CORRECTION

Page 1 of 1

PATENT NO. : 9,712,862 B2
APPLICATION NO. : 15/070918
DATED : July 18, 2017
INVENTOR(S) : Nicholas Newell et al.

It is certified that error appears in the above-identified patent and that said Letters Patent is hereby corrected as shown below:

In the Claims

Column 73, Line 13, Claim 3 delete "orientation" and substitute therefor --location--.

Column 73, Line 17, Claim 3 delete "orientation" and substitute therefor --location--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*